(12) United States Patent
Carnevali

(10) Patent No.: US 7,839,118 B2
(45) Date of Patent: Nov. 23, 2010

(54) POWERED DOCKING STATION

(76) Inventor: Jeffrey D. Carnevali, 5957 Beach Dr. SW., Seattle, WA (US) 98136

( * ) Notice: Subject to any disclaimer, the term of this patent is extended or adjusted under 35 U.S.C. 154(b) by 836 days.

(21) Appl. No.: 11/789,901

(22) Filed: Apr. 26, 2007

(65) Prior Publication Data
US 2008/0270664 A1    Oct. 30, 2008

(51) Int. Cl.
*H02J 7/00* (2006.01)
(52) U.S. Cl. ....................... 320/107; 320/115
(58) Field of Classification Search ................. 320/107, 320/110, 115; 361/679.02, 679.09, 679.29
See application file for complete search history.

(56) References Cited

U.S. PATENT DOCUMENTS

| 6,061,233 | A  | * | 5/2000 | Jung | 361/679.41 |
| 6,191,943 | B1 | * | 2/2001 | Tracy | 361/679.46 |
| 6,259,601 | B1 | * | 7/2001 | Jaggers et al. | 361/690 |
| 6,264,484 | B1 | * | 7/2001 | Chien et al. | 439/152 |
| 7,110,252 | B2 | * | 9/2006 | Liang et al. | 361/679.57 |
| 2004/0123604 | A1 | * | 7/2004 | Pokharna et al. | 62/3.2 |
| 2005/0161197 | A1 | * | 7/2005 | Rapaich | 165/80.4 |
| 2007/0132288 | A1 | * | 6/2007 | Zuzga et al. | 297/217.3 |

* cited by examiner

*Primary Examiner*—Edward Tso
*Assistant Examiner*—Samuel Berhanu
(74) *Attorney, Agent, or Firm*—Charles J. Rupnick, Attorney at Law

(57) ABSTRACT

A docking station apparatus having a support tray with a support surface between opposing first and second faces and at least partially surrounded by a fence portion; a clamp with a jaw portion extended from a sled portion, the sled portion slidable relative to the support surface of the support tray between a substantially retracted position having the jaw portion substantially adjacent to the first face and a substantially expanded position having the jaw portion substantially spaced away there from; an electrical interface support with a jaw portion extended from a sled portion, the sled portion slidable relative to the support surface of the support tray between a substantially retracted position having the jaw portion substantially adjacent to the second face and a substantially expanded position having the jaw portion substantially spaced away there from; and a novel linkage mechanism mechanically linking the clamp with the electrical interface support.

41 Claims, 24 Drawing Sheets

POWERED DOCKING STATION

FIELD OF THE INVENTION

The present invention relates generally to trays for holding portable devices, and in particular to quick release docking stations for cellular telephones, portable computers and other portable electronics devices having one or more input/output (I/O) communication interface ports.

BACKGROUND OF THE INVENTION

Docking stations for cellular telephones, portable computers and other portable electronics are generally well-known and provide numerous capabilities for providing electrical power to the device and expanding the device's functions. However, known docking station apparatus are limited in their ability to provide the above expansion efficiently and reliably.

SUMMARY OF THE INVENTION

The present invention is an efficient and reliable docking station apparatus for portable electronics devices, such as cellular telephones, portable computers and other portable electronics having one or more charging or input/output (I/O) interface ports.

According to one aspect of the invention the novel docking station apparatus includes a substantially rigid support tray having a support surface between opposing first and second faces and at least partially surrounded by a fence portion; a clamp having a jaw portion extended from a sled portion, the sled portion slidable relative to the support surface of the support tray between a substantially retracted position having the jaw portion substantially adjacent to the first face and a substantially expanded position having the jaw portion substantially spaced away there from; an electrical interface support having a jaw portion extended from a sled portion, the sled portion slidable relative to the support surface of the support tray between a substantially retracted position having the jaw portion substantially adjacent to the second face and a substantially expanded position having the jaw portion substantially spaced away there from; and a novel linkage mechanism mechanically linking the clamp with the electrical interface support.

According to another aspect of the novel docking station apparatus, the novel linkage mechanism includes: a slip connector slidably coupled to the sled portion of a first one of the clamp and the electrical interface support for sliding lengthwise thereof between the jaw portion and a tail portion thereof opposite from the jaw portion, a resilient biasing mechanism operable between the slip connector and a first portion of the sled, a stop mechanism operable between the slip connector and a second portion of the sled, and a lever mechanism pivotably coupled between the slip connector and a second one of clamp and the electrical interface support.

According to another aspect of the novel docking station apparatus, the clamp and the electrical interface support are operable in three different relationships with the support tray, including: 1) a substantially expanded relationship wherein: a) the clamp is arranged in the substantially expanded position thereof, b) responsive to the substantially expanded position of the clamp, the linkage mechanism is responsively configured in a first positive driving relationship with the electrical interface support having the resilient biasing mechanism in a substantially expanded configuration between the slip connector and the first portion of the sled, and the stop mechanism substantially engaged between the slip connector the second portion of the sled, c) the lever mechanism is rotated in a substantially expanded orientation relative to the clamp and the electrical interface support, and d) the electrical interface support is arranged in the substantially expanded position thereof; 2) a substantially engaged relationship wherein: a) the clamp is arranged in the substantially retracted position thereof, b) responsive to the substantially retracted position of the clamp, the linkage mechanism is configured in a first resiliently urging relationship with the electrical interface support having the resilient biasing mechanism in a partially compressed configuration between the substantially expanded configuration and a substantially compressed configuration thereof, c) the lever mechanism is rotated in a substantially retracted orientation relative to the clamp and the electrical interface support, and d) the electrical interface support is arranged in the substantially retracted position thereof; and 3) a semi-engaged relationship wherein: a) the clamp is arranged in the substantially retracted position thereof, b) responsive to the substantially retracted position of the clamp, the linkage mechanism is configured in a second resiliently urging relationship with the electrical interface support having the resilient biasing mechanism in the substantially compressed configuration thereof between the slip connector and the first portion of the sled and the stop mechanism substantially disengaged between the slip connector the second portion of the sled, and c) the electrical interface support is resiliently arranged in the substantially expanded position thereof.

According to another aspect of the novel docking station apparatus, the slip connector is further slidably coupled to the sled portion of the clamp; the lever mechanism pivotably coupled between the slip connector and the electrical interface support; and in the semi-engaged relationship of the clamp and the electrical interface support, the lever mechanism is rotated in the substantially expanded orientation relative to the clamp and the electrical interface support.

According to another aspect of the novel docking station apparatus, the slip connector is further slidably coupled to the sled portion of the electrical interface support; the lever mechanism pivotably coupled between the slip connector and the clamp; and in the semi-engaged relationship of the clamp and the electrical interface support, the lever mechanism is rotated in the substantially retracted orientation relative to the clamp and the electrical interface support.

According to another aspect of the novel docking station apparatus, in the substantially engaged relationship of the clamp and the electrical interface support, the stop mechanism is further substantially disengaged between the slip connector the second portion of the sled.

According to another aspect of the novel docking station apparatus, the docking station also includes a resilient expansion mechanism coupled between the clamp and the support tray, wherein: in the substantially expanded relationship of the clamp and the electrical interface support, the expansion mechanism is substantially expanded between the clamp and the support tray; in the substantially engaged relationship of the clamp and the electrical interface support, the expansion mechanism is substantially compressed between the clamp and the support tray; and in the semi-engaged relationship of the clamp and the electrical interface support, the expansion mechanism is substantially compressed between the clamp and the support tray.

According to another aspect of the novel docking station apparatus, the docking station also includes a restraining mechanism coupled between the clamp and the support tray, wherein: in the substantially expanded condition of the expansion mechanism, the restraining mechanism is released and the expansion mechanism is substantially relieved between the clamp and the support tray; and in the substantially engaged condition of the expansion mechanism, the restraining mechanism is engaged between the clamp and the support tray and the expansion mechanism is substantially restrained between the clamp and the support tray.

According to another aspect of the novel docking station apparatus, the clamp and the electrical interface support are operable in a fourth semi-unclamped relationship with the support tray different from the other three relationships wherein: 1) the clamp is arranged in a semi-expanded position between the substantially retracted and substantially expanded positions thereof, and 2) responsive to the semi-expanded position of the clamp, the resilient biasing mechanism of the linkage mechanism is responsively configured in a semi-expanded configuration between the partially compressed and substantially expanded configurations thereof, and the first portion of the sled, and the stop mechanism substantially engaged between the slip connector the second portion of the sled, and 3) the electrical interface support is arranged in the substantially retracted position thereof.

According to another aspect of the novel docking station apparatus, the lever mechanism is further unevenly pivotably coupled between the slip connector and one of clamp and the electrical interface support.

According to another aspect of the novel docking station apparatus, the docking station also includes an expansion limiter structured for limiting spacing between the second face of the support tray and the jaw portion of the electrical interface support in the substantially expanded position thereof.

According to another aspect of the novel docking station apparatus, the jaw portion also includes a biasing mechanism, such as a resiliently compressible cushion formed of for example a natural or synthetic rubber pad, positioned adjacent to an inner surface thereof the clamping.

According to another aspect of the novel docking station apparatus, the docking station also includes an electrical connector structured for electrically interfacing with the device, the electrical connector being supported on the jaw portion of the electrical interface support and extended from an inner surface thereof.

According to another aspect of the novel docking station apparatus, the docking station also includes a radio frequency (RF) antenna interconnect switch positioned adjacent to the first face of the support tray, the switch having an electrical contact projected therefrom, the electrical contact being structured as a spring plunger operable substantially perpendicular to the support surface of the support tray and being structured for electrical coupled to an antenna interconnect cable.

According to another aspect of the novel docking station apparatus, the docking station also includes an antenna interconnect cable electrically coupled to the electrical contact.

According to yet another aspect of the novel docking station apparatus, the docking station also includes a radio frequency (RF) antenna electrically coupled to the antenna interconnect cable.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 2 is a perspective view showing an example of the novel quick release docking station for portable computers and the like;

DETAILED DESCRIPTION OF PREFERRED EMBODIMENT

In the Figures, like numerals indicate like elements.

Figure 1:
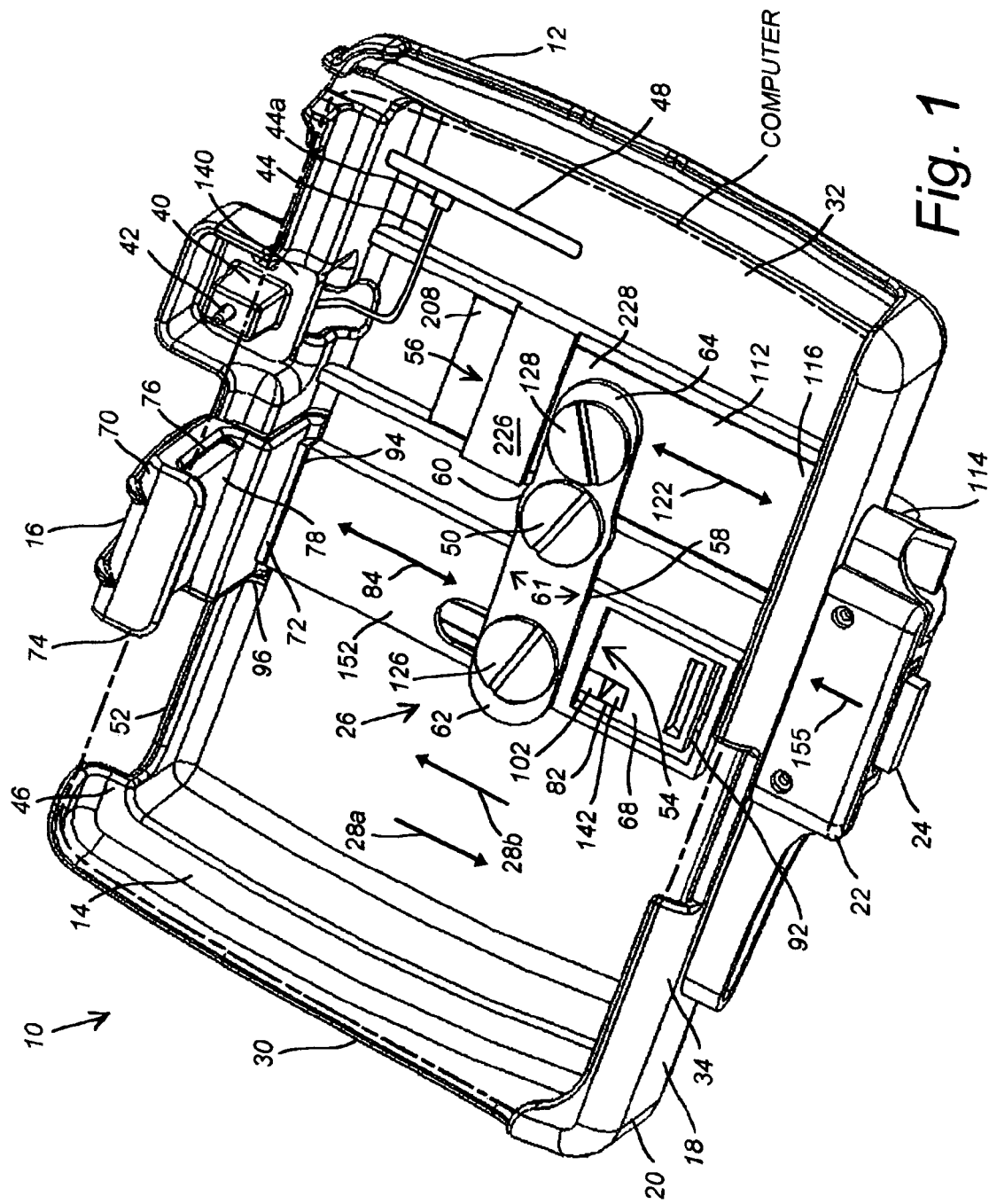
FIG. 1 is a perspective view showing an example of the novel quick release docking station for cellular telephones, portable computers and other portable electronics devices having one or more battery charging or input/output (I/O) communication ports.

FIG. 1 is a perspective view showing an example of the novel quick release docking station 10 for portable computers and other portable electronics devices (hereinafter computer) having one or more battery charging and/or input/output (I/O) communication ports. By example and without limitation, a support tray 12 of the novel quick release docking station 10 supports a portable computers or other portable electronics device on a partial interior peripheral support lip 14 formed between a mechanically latched compression clamp slide 16 and a web portion 18 adjacent to a front portion 20 of the support tray 12. A connector carrier slide 22 holds an electrical connector 24 that is structured to mate with a battery charging and/or an input/output (I/O) interface port on the computer. The connector carrier slide 22 is resiliently biased into contact with the front portion 20 of the support tray 12 for positioning the electrical connector 24 to substantially automatically connect with the computer I/O port.

The novel quick release docking station 10 operable in two different fully expanded receiving and fully retracted engaged states. In the fully retracted engaged state, illustrated here by example and without limitation, the compression clamp slide 16 and connector carrier slide 22 are both retracted into respective engaged positions adjacent to the support tray 12. In the different fully expanded receiving state, illustrated by example and without limitation in one or more subsequent Figures, the compression clamp slide 16 and connector carrier slide 22 are both expanded into respective disengaged positions spaced away from the support tray 12. Additionally, the novel quick release docking station 10 operable in an intermediate state illustrated by example and without limitation in one or more subsequent Figures. While the novel quick release docking station 10 is configured in the fully retracted engaged state having the compression clamp slide 16 latched in its retracted engaged position, the connector carrier slide 22 is withdrawn from its retracted engaged position adjacent the front portion 20 of the support tray 12, into its disengaged position spaced away from the support tray 12 and carrying the electrical connector 24 out of connection with the computer I/O port. Thus, in the intermediate state of the novel quick release docking station 10, the computer is physically secured in the support tray 12, but is disconnected from the electrical connector 24 on the connector carrier slide 22.

A novel mechanical linkage mechanism (indicated generally at 26) couples the connector carrier slide 22 to the compression clamp slide 16. When the compression clamp slide 16 is latched in its engaged position adjacent to the support tray 12, as illustrated here, the linkage mechanism 26 is structured to be decoupled or "soft" in a first direction (indicated by arrow 28a), whereby the connector carrier slide 22 can be withdrawn from its engaged position in contact with the front portion 20 of the support tray 12 for withdrawing the electrical connector 24 out of connection with the computer I/O port. However, the linkage mechanism 26 is structured to be coupled or "hard" in a second opposite direction (indicated by arrow 28b) when the compression clamp slide 16 is expanded away from the support tray 12 its disengaged position, as illustrated in one or more subsequent Figures. During expansion of the compression clamp slide 16 to its disengaged position, the coupled or "hard" aspect of the linkage mechanism 26 forcefully drives the connector carrier slide 22 away from contact with the front portion 20 of the support tray 12 into its disengaged position. The coupled or "hard"

aspect of the linkage mechanism 26 thereby forces the connector carrier slide 22 to withdraw the electrical connector 24 out of connection with the computer I/O port in response to the compression clamp slide 16 disengaging from clamping the computer. The novel quick release docking station 10 is thus configured in the fully expanded receiving state, and the connector carrier slide 22 cannot be re-engaged without also re-engaging the compression clamp slide 16. The electrical connector 24 is thus protected from inadvertent damage.

Figure 2:
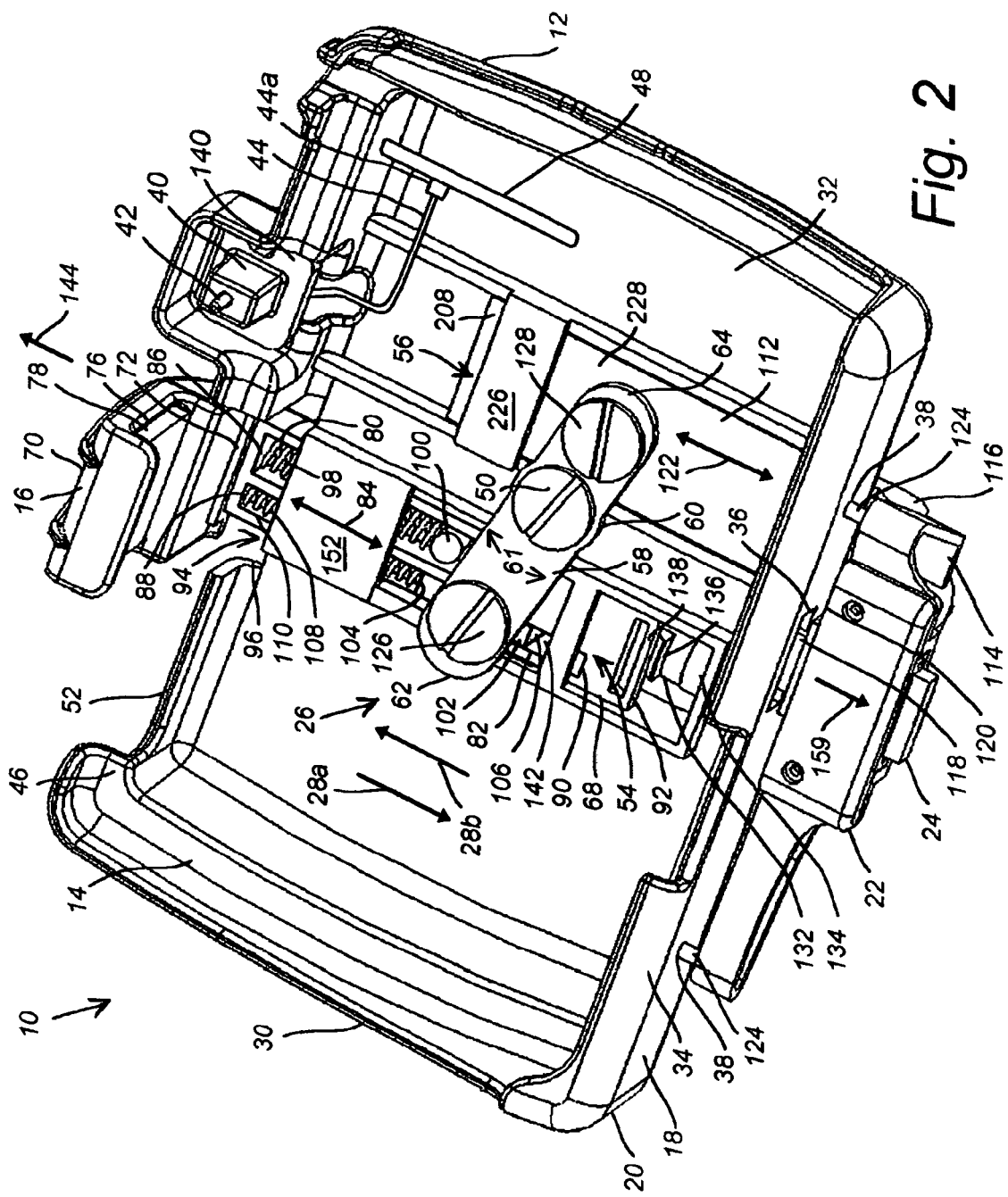

FIG. 2 is a perspective view showing an example of the novel quick release docking station 10 for portable computers and the like. Here, the support tray 12 is formed as a substantially rigid frame. The peripheral support lip 14 is partially surrounded by a fence or guard rail 30 and spaced above a floor portion 32 of the tray 12. The peripheral support lip 14 is structured a as substantially planar surface sized to receive a base peripheral edge portion of a computer and support the computer (outlined in phantom) above a floor portion 32 of the support tray 12. The guard rail portion is extended above peripheral support lip 14 to position the computer relative to the peripheral support lip 14 and retain it thereon. A partial peripheral retention lip 34 is supported by the web portion 18 of the tray 12 that is formed as an extension of the guard rail 30 and which spaces the retention lip 34 above the peripheral support lip 14 opposite from the floor portion 32. The retention lip 34 substantially opposes or overhangs the peripheral support lip 14. The retention lip 34 is structured for fitting over an upper front portion of the computer for retaining the computer on the peripheral support lip 14. When the novel quick release docking station 10 is a powered docking station, as illustrated here, the docking station 10 includes the electrical connector 24 that is structured to mate with the computer I/O port. The web portion 18 of the guard rail 30 is formed through with a clearance hole or slot 36 sized to admit the electrical connector 24 in a position corresponding to the mating I/O interface port of the computer. By example and without limitation, the web portion 18 of the guard rail 30 is also formed through with a pair of spaced apart guideways 38 arranged on opposite sides of connector clearance slot 36.

The support tray 12 optionally includes a novel radio frequency (RF) antenna interconnect switch 40. The RF antenna interconnect switch 40 includes an electrical contact 42 configured as a spring plunger that is operable substantially perpendicular (indicated by arrow 41, see, e.g., FIG. 8) to the interior support lip 14 of the support tray 12. The electrical contact 42 is electrically coupled to a RF conducting pigtail cable 44 having a coupling 44a structured to be electrically coupled to a remote RF antenna. The spring plunger electrical contact 42 portion of the interconnect switch 40 is positioned to make contact with a RF antenna connection on an overhanging portion of the computer when approached from opposite of the peripheral lip 14, i.e., when the computer is seated in the support tray 12 by first seating a front portion against the peripheral support lip 14 adjacent to the web portion 18 and under the overhanging retention lip 34, then sitting a rear base peripheral edge portion down against a rear portion 46 of the peripheral support lip 14 opposite from the web portion 18. As the rear base peripheral edge portion of the computer touches down against a rear portion 46 of the peripheral support lip 14, and a RF I/O interface port on the computer makes contact with the spring plunger electrical contact 42 of the RF antenna interconnect switch 40 to connect the RF I/O interface port with the RF conducting cable 44. The spring plunger electrical contact 42 is depressed by making electrical/mechanical contact with the RF I/O interface port on the computer. Resilience of the spring plunger electrical contact 42 ensures continued quality electrical coupling is maintained between the computer and the optional RF antenna interconnect switch 40, when present.

Optionally, the novel quick release docking station 10 includes a RF antenna 48 mounted on the support tray 12 and electrically connected to the RF I/O interface port on the computer through the RF antenna interconnect switch 40 and intervening RF conducting cable 44. As illustrated here by example and without limitation, the RF antenna 48 is optionally mounted inside the support tray 12 adjacent to the floor portion 32 and below the peripheral support lip 14 such as to avoid interference with seating the computer. Alternatively, the RF antenna 48 is mounted separately from the support tray 12.

A fulcrum mechanism portion 50 of the linkage mechanism 26 is coupled to the floor portion 32 of the support tray 12. The fulcrum mechanism 50, illustrated here by example and without limitation as a fulcrum pin, is optionally coupled to the floor portion 32 of the support tray 12 in a position spaced away from a rear portion 52 of the support tray 12 opposite from the tray front portion 20 and the web portion 18 formed therein. By example and without limitation, the fulcrum mechanism 50 is optionally positioned about midway between the front portion 20 and rear portion 52 of the support tray 12. First and second substantially parallel guide channels 54 and 56 are formed in the floor portion 32 of the support tray 12 in positions on either side of the fulcrum pin 50 and substantially aligned between the rear portion 52 of the support tray 12 and the web portion 18 opposite therefrom. The first guide channel 54 is optionally spaced further, for example about twice as far, from the fulcrum pin 50 than the second guide channel 56.

The support tray 12 also includes a substantially rigid control lever 58 formed with a pivot portion 60 pivotable about the fulcrum pin 50, as indicated by arrow 61. The control lever 58 has first and second lever arms 62 and 64 extending from the pivot portion 60. When the first and second guide channels 54 and 56 are spaced unevenly from the fulcrum pin 50, the first lever arm 62 of the control lever 58 is longer, about twice as long in the example, than the second lever arm 64.

The compression clamp slide 16 is formed of a substantially rigid. The compression clamp slide 16 has an elongate sled portion 68 sized to slide within the first guide channel 54 in the support tray's floor portion 32 and a substantially upright clamp jaw portion 70 extended adjacent to a first end 72 of the sled portion 68. The clamp jaw portion 70 is formed with a retention lip 74 spaced above and overhanging the sled portion 68. The clamp jaw portion 70 is structured for fitting over an upper rear portion of the computer for retaining the computer on the peripheral support lip 14. Optionally, an inner surface 76 of the clamp jaw portion 70 is provided with a resiliently compressible biasing mechanism 78 positioned between the sled portion 68 and the overhanging retention lip 74. By example and without limitation, the biasing mechanism 78 is illustrated here as a resiliently compressible cushion, such as a natural or synthetic rubber pad. The clamp sled 68 is formed with a first elongated major interior expansion channel 80 and a substantially parallel second elongated minor interior expansion channel 82 with both major and minor interior expansion channels 80 and 82 aligned substantially parallel with a longitudinal direction 84 of the clamp sled portion 68.

The major interior expansion channel 80 of the compression clamp slide's sled portion 68 is formed with an internal end face portion 86 positioned adjacent to the clamp jaw portion 70. As shown more clearly in subsequent Figures and discussed in more detail below, the minor interior expansion channel 82 is formed with first and second internal stop portions 88 and 90 adjacent to opposite ends thereof with the first internal stop portion 88 being positioned adjacent to the clamp jaw portion 70, and the second internal stop portion 90 being spaced away from the first stop portion 88 and adjacent to a second tail end 92 of the clamp sled portion 68 opposite from the clamp jaw portion 70. The clamp sled portion 68 is received into the first guide channel 54 through a mouth opening 94 adjacent to the rear portion 52 of the support tray 12. The clamp sled portion 68 is slidable within the first guide channel 54 between a disengaged and fully expanded receiving position with the clamp sled 68 partially extended external of the mouth opening 94 and the clamp jaw portion 70 extended external of the rear portion 46 of the peripheral support lip 14 of the support tray 12, as illustrated here by example and without limitation, and a closed and fully retracted engaged clamping position with the clamp sled 68 substantially fully retracted into the guide channel 54 and the upright clamp jaw portion 70 compressed into a position adjacent to the rear portion 43 of the support tray 12. By example and without limitation, the rear portion 52 of the support tray 12 is formed with a relief 96 wherein the mouth opening 94 into the first guide channel 54 is formed. Accordingly, the clamp jaw portion 70 is structured to retract into the relief 96 such that overall size of the novel quick release docking station 10 is minimized.

A clamp expansion spring 98 is partially compressed within the major interior expansion channel 80 of clamp sled portion 68. The clamp expansion spring 98 is operable for pressing against the internal end face portion 86 of the major interior expansion channel 80 for urging the clamp sled portion 68 to exit the first guide channel 54 through the mouth opening 94. By example and without limitation, the clamp expansion spring 98 is partially compressed between the internal end face portion 86 of the major interior expansion channel 80 adjacent to the clamp jaw portion 70 and a stop portion 100 of the tray floor portion 32 that is spaced away from the relief 96 in the rear portion 52 of the support tray 12.

A short slip connector block 102 is slidable within the elongated minor interior expansion channel 82 substantially along the longitudinal direction 84 of the clamp sled portion 68. The slip connector block 102 is formed having a nominal block shape sized to partially fill a portion of the minor expansion channel 82. The slip connector block 102 nominally resides within the minor interior expansion channel 82 adjacent to the second internal stop portion 90 thereof adjacent to the second tail end 92 of the clamp sled portion 68. The nominal block shape of the slip connector 102 is formed having a first reaction portion 104 facing toward and spaced away from the first internal stop portion 88 of the minor interior expansion channel 82 adjacent to the upright clamp jaw portion 70 of the compression clamp slide 16, and a second reaction portion 106 opposite from the first reaction portion 104 and facing toward the second internal stop portion 90 of the minor interior expansion channel 82 adjacent to the second tail end 92 of the clamp sled portion 68.

A nominal return spring gap 108 is formed in the minor interior expansion channel 82 of the clamp sled portion 68 in the space between the first reaction portion 104 of the slip connector block 102 and the first internal stop portion 88 adjacent to the clamp jaw portion 70 of the compression clamp slide 16. A partially compressed connector return spring 110 resides within the return spring gap 108 of the minor interior expansion channel 82 of the clamp sled portion 68 between the first reaction portion 104 of the slip connector block 102 and the first internal stop portion 88 adjacent to the clamp jaw portion 70.

The connector carrier slide 22 is formed of a substantially rigid material. The substantially rigid connector carrier slide 22 has an elongate carrier sled portion 112 sized to slide within the second guide channel 56 in the tray floor portion 32. As more clearly illustrated in FIG. 8, the carrier sled portion 112 is received into the second guide channel 56 through a mouth opening 113 adjacent to the front portion 20 of the support tray 12. Optionally, the first and second guide channels 54 and 56 are incorporated into a single guide channel incorporating the two mouth openings 94 and 113 adjacent to respective rear and front portions 52 and 20 of the support tray 12. The single guide channel is sized to accommodate both the clamp sled portion 68 and the carrier sled portion 112, optionally with the clamp sled portion 68 and the carrier sled portion 112 each providing an inner guide rail for the other to run against.

A substantially upright jaw portion 114 of the connector carrier slide 22 is extended adjacent to a first end 116 of the carrier sled portion 112. The electrical connector 24 is mounted on the upright jaw portion 114 of the connector carrier slide 22 with its electrical interconnect portion 118 extended from an inner surface 120 of the connector carrier slide jaw portion 114 toward the support tray 12 along a longitudinal direction 122 of the connector carrier sled portion 112. A pair of guides 124, illustrated here by example and without limitation as guide pins, are projected from the inner surface 120 of the connector carrier slide jaw portion 114 and extended therefrom toward the support tray 12 along the longitudinal direction 122 of the connector carrier sled portion 112. The guides 124 are sized to slip into the guide ways 38 in the web portion 18 of the support tray's guard rail 30 and are arranged in spaced apart positions on opposite sides of the electrical connector 24 corresponding to the spaced apart guide ways 38 arranged on either side of connector clearance slot 36. The guides 124 are extended further than the electrical interconnect portion 118 of the electrical connector 24 from the inner surface 120 of the connector carrier slide's upright jaw portion 114. Accordingly, the guides 124 slip into and engage the guide ways 38 in the web portion 18 of the support tray guard rail 30 before the electrical interconnect portion 118 of the electrical connector 24 enters the clearance hole or slot 36 in the web portion 18, which ensures the web portion 18 does not interfere with the electrical interconnect portion 118. Furthermore, the guides 124 are sized in combination with the guide ways 38 to ensure the electrical interconnect portion 118 of the electrical connector 24 is properly positioned relative to the support tray guard rail 30 to mate with the I/O interface port of the computer. Thus, the guides 124 operate in combination with the guide ways 38 as one or more guide mechanisms structured between the connector carrier slide 22 and the support tray 12 for guiding the electrical interconnect portion 118 of the electrical connector 24 through the clearance hole or slot 36 in the web portion 18 and, ultimately, into connection with the computer I/O port.

Accordingly, the carrier sled portion 112 of the connector carrier slide 22 is received into the second guide channel 56 in the support tray's floor portion 32 and is structured to be slidable therein between a fully expanded and disengaged receiving position with the connector carrier sled portion 112 partially extended external of the second guide channel 56 and having the upright jaw portion 114 partially extended external of the web portion 18 of the support tray guard rail 30 with the electrical connector 24 and its electrical interconnect portion 118 substantially fully retracted relative to, i.e., into or through, the clearance hole or slot 36 in the web portion 18 and the guides 124 partially withdrawn from but still engaged with the spaced apart guide ways 38, as illustrated here by example and without limitation, and a closed and fully retracted engaged position with the connector carrier sled portion 112 of the connector carrier slide 22 substantially fully retracted into the second guide channel 56 and the upright jaw portion 114 compressed into a position adjacent to the support tray 12 and in substantial contact with the web portion 18 of the guard rail 30 with the spaced apart guides 124 received into the spaced apart guide ways 38 and the electrical interconnect portion 118 of the electrical connector 24 extended through the clearance hole or slot 36.

A first drive pin 126 is rotatably coupled between the first longer lever arm 62 of the control lever 58 and the slip connector block 102 within the minor interior expansion channel 82 of the clamp sled portion 68. A second drive pin 128 rotatably couples the second shorter lever arm 64 of the control lever 58 to connector carrier sled portion 112. Accordingly, rotation of the interconnecting control lever 58 about the fulcrum pin 50 transfers expansion and retraction motions of the compression clamp slide 16 to the connector carrier slide 22 through the drive pins 126 and 128.

Accordingly, the compression clamp slide 16 and connector carrier slide 22 are mutually operable relative to the support tray 12 in the two different fully expanded receiving and fully retracted engaged states of the novel quick release docking station 10. The fully expanded receiving state is illustrated here by example and without limitation, wherein the clamp expansion spring 98 is substantially expanded within the major interior expansion channel 80 of the clamp sled portion 68 between the stop portion 100 of the tray floor portion 32 and the internal end face portion 86 of the major interior expansion channel 80 with the clamp sled portion 68 of the compression clamp slide 16 partially extended out of the first guide channel 54 in the tray floor portion 32 with the upright clamp jaw portion 70 spaced away from the rear portion 52 of the support tray 12 to allow retrieval of the computer. The slip connector block 102 is positioned in within the minor interior expansion channel 82 of the clamp sled portion 68 with the connector return spring 110 substantially fully expanded within the return spring gap 108 between the first reaction portion 104 of the slip connector block 102 and the first internal stop portion 88 of the minor interior expansion channel 82 of the compression clamp sled portion 68 adjacent to the upright clamp jaw portion 70. The second reaction portion 106 of the slip connector block 102 is substantially contacting the second internal stop portion 90 of the minor interior expansion channel 82 adjacent to the second tail end 92 of the compression clamp sled portion 68. The control lever 58 is rotated on the fulcrum pin 50 into a fully expanded receiving orientation with its first longer lever arm 62 coupled to the slip connector block 102 by the first drive pin 126 and rotated toward the opposite rear portion 52 of the support tray 12 and away from the front portion 20 thereof, and with its second shorter lever arm 64 coupled to carrier sled portion 112 of the connector carrier slide 22 by the second drive pin 128 and rotated oppositely of the first longer lever arm 62 toward front portion 20 of the support tray 12 and away from the opposite rear portion 52 thereof. The carrier sled portion 112 of the connector carrier slide 22 is partially extended out of the second guide channel 56 in the tray floor portion 32 with the upright jaw portion 114 spaced away from the web portion 18 of the guard rail 30 of the support tray 12 such that the electrical interconnect portion 118 of the electrical connector 24 is substantially fully retracted relative to, i.e., into or through, the connector clearance slot 36 in the web portion 18 of the guard rail 30, and the spaced apart guides 124 are partially retracted out of the spaced apart guide ways 38 but are still engaged therewith, as illustrated here by example and without limitation, so that the electrical interconnect portion 118 of the electrical connector 24 is protected from damage during retrieval of the computer.

The optional greater length of the first lever arm 62 of the control lever 58 over the second lever arm 64 permits the compression clamp slide 16 to have a correspondingly longer throw than the connector carrier slide 22. Accordingly, the throw of the connector carrier slide 22 can be limited to ensure the partially retracted guides 124 maintain engagement with the corresponding guide ways 38, while the retention lip portion 64 of the upright clamp jaw portion 70 of the compression clamp slide 16 and the resilient cushion 78 on its inner surface 76 are spaced far enough from the rear portion 52 of the support tray 12 to permit insertion of the computer into the novel quick release docking station 10, as described herein.

A lock mechanism 132 is provided on the support tray 12 for substantially automatically retaining the compression clamp slide 16 in its engaged position when the novel quick release docking station 10 is configured in the fully retracted engaged state. By example and without limitation, the lock mechanism 132 includes a substantially automatic latching mechanism 134 having a spring tooth 136 structured to engage a catch 138 formed on the second tail end 92 of the clamp sled portion 68 opposite from the clamp jaw portion 70 whenever the catch 138 is moved into position opposite from the spring tooth 136.

Figure 3:
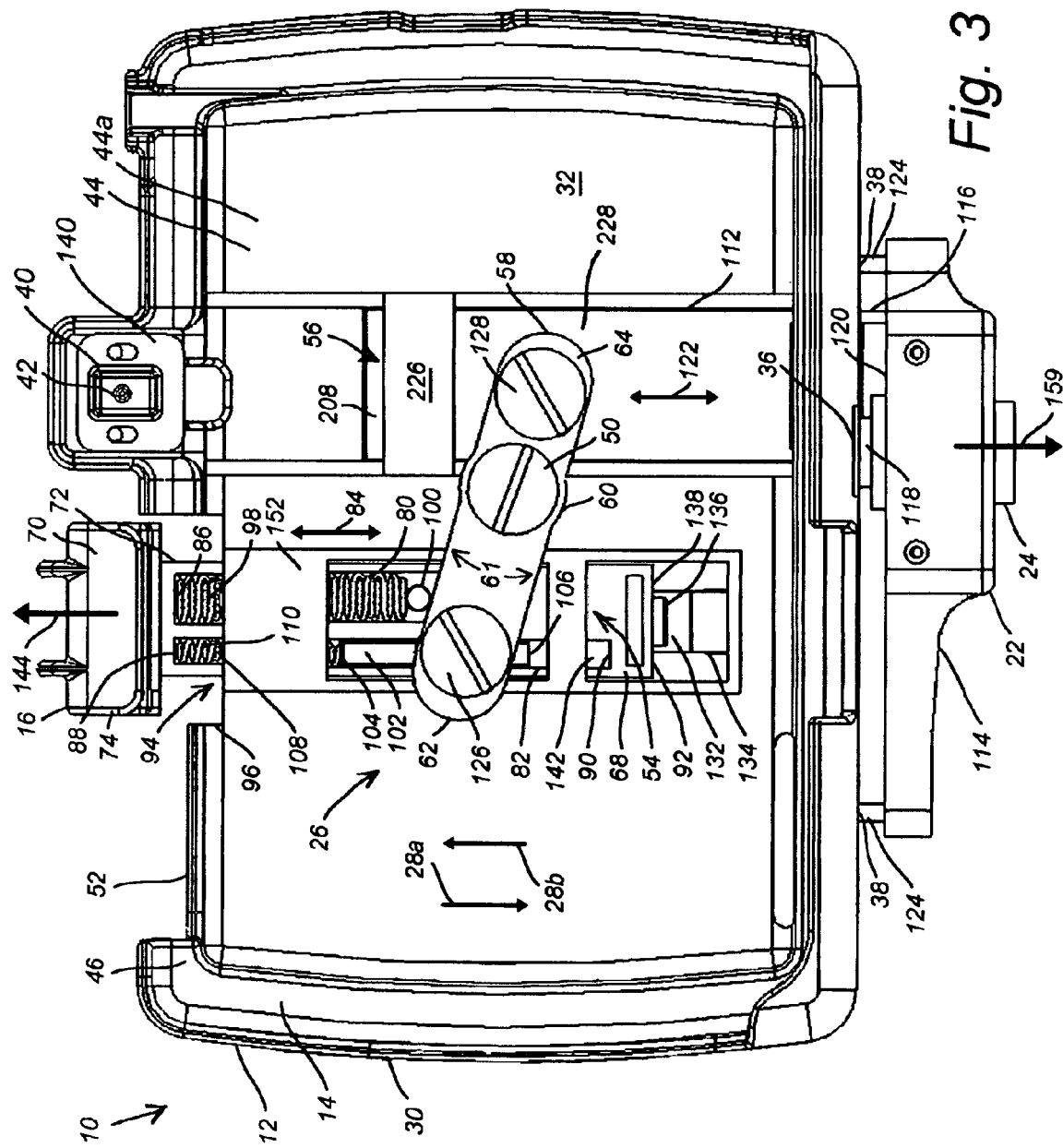
FIG. 3 is an elevation view showing an example of the novel quick release docking station in the fully expanded receiving state.

FIG. 3 is an elevation view showing an example of the novel quick release docking station 10 in the fully expanded receiving state. The RF antenna interconnect switch 40 is seated in a small shelf or balcony 140 extended from the rear portion 52 of the support tray 12. Here, the RF antenna interconnect switch 40 is shown to be adjustably positionable on the balcony 140 for accurate positioning relative to the RF antenna connection on the overhanging portion of the computer.

Here, the fully expanded receiving state is shown to cause the overhanging retention lip 74 of the upright clamp jaw portion 70 portion of the compression clamp slide 16 to be clearly moved external of the peripheral support lip 14 of the support tray 12 and the surrounding guard rail 30. The upright clamp jaw portion 70 portion of the compression clamp slide 16 is thus positioned to avoid interference with insertion of the computer into the novel quick release docking station 10.

Lever action of the control lever 58 into its fully expanded receiving orientation causes the upright jaw portion 114 of the connector carrier slide 22 to be substantially simultaneously moved away from the web portion 18 of the support tray guard rail 30 on the front portion 20 of the support tray 12, which causes the electrical interconnect portion 118 of the electrical connector 24 to be withdrawn from the connector clearance slot 36. However, operation of the control lever 58 does not move the carrier sled portion 112 of the connector carrier slide 22 so far as to completely disengage the pair of guides 124 from the guide ways 38 in the web portion 18 of the support tray guard rail 30. Thus, while the electrical interconnect portion 118 of the electrical connector 24 is withdrawn far enough from the web portion 18 of the support tray guard rail 30 as to avoid damage during insertion of the computer into the novel quick release docking station 10, the guides 124 remain sufficiently engaged with the guide ways 38 as to ensure accurate positioning of the electrical interconnect portion 118 of the electrical connector 24 relative to the position of the I/O interface port on the computer as dictated by the peripheral support lip 14 and the surrounding guard rail 30.

Figure 4:
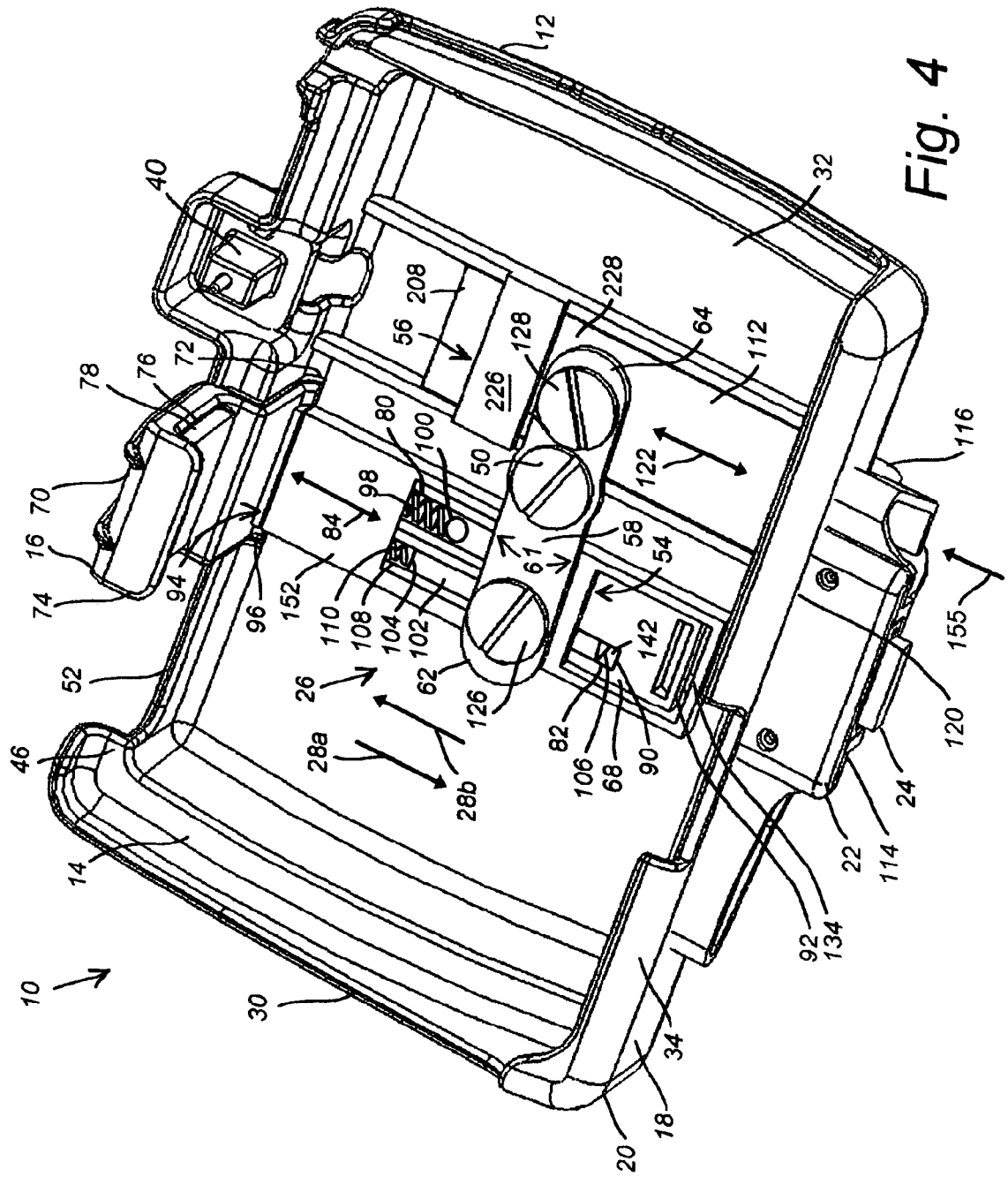
FIG. 4 is a perspective view showing an example of the novel quick release docking station in the fully retracted engaged state opposite from the fully expanded receiving state.

FIG. 4 is a perspective view showing an example of the novel quick release docking station 10 in the fully retracted engaged state opposite from the fully expanded receiving state. Here, the upright clamp jaw portion 70 of the compression clamp slide 16 is positioned adjacent to the rear portion 52 of the support tray 12 and substantially nested within the relief 96 wherein the mouth opening 94 into the first guide channel 54 is formed. The first clamp sled portion 68 is substantially fully retracted through the mouth opening 94 into the first guide channel 54 of the support tray 12. The clamp expansion spring 98 is substantially compressed within the major interior expansion channel 80 of the clamp sled portion 68 of the compression clamp slide 16 between the stop portion 100 of the tray floor portion 32 and the internal end face portion 86 of the major interior expansion channel 80. The short slip connector block 102 is positioned in within the minor interior expansion channel 82 of the clamp sled portion 68 and is substantially aligned along its longitudinal direction 84. The first reaction portion 104 of the slip connector block 102 is spaced away from the first internal stop portion 88 of the minor interior expansion channel 82 adjacent to the clamp jaw portion 70 for forming the nominal return spring gap 108 there between. The connector return spring 110 is partially compressed within the nominal return spring gap 108 adjacent to the clamp jaw portion 70. The second reaction portion 106 of the slip connector block 102 is spaced away from the second internal stop portion 90 of the minor interior expansion channel 82 of the clamp sled portion 68 and forms a small nominal clearance gap 142 there between.

The control lever 58 is rotated on the fulcrum pin 50 away from its fully expanded receiving orientation into an opposite fully retracted engaged orientation wherein its first longer lever arm 62 coupled to the slip connector block 102 by the first drive pin 126 is rotated away from the rear portion 52 of the support tray 12 and toward the opposite front portion 20 thereof, and the second shorter lever arm 64 coupled to carrier sled portion 112 of the connector carrier slide 22 by the second drive pin 128 is rotated oppositely of the first longer lever arm 62 away from front portion 20 of the support tray 12 and toward the opposite rear portion 52 thereof. The carrier sled portion 112 of the connector carrier slide 22 is substantially fully retracted into the second guide channel 56 in the floor portion 32 of the support tray 12 beside the clamp sled portion 68 of the compression clamp slide 16. The upright jaw portion 114 of the connector carrier slide 22 is positioned adjacent to and substantially in contact with the front portion 20 of the support tray 12. The guides 124 on the inner surface 120 of the connector carrier slide jaw portion 114 are substantially fully engaged with the spaced apart guide ways 38, and the electrical interconnect portion 118 of the electrical connector 24 is substantially nested within the connector clearance slot 36 in the front web portion 18 of the tray's guard rail 30 in a position to mate with the I/O interface port of the computer.

The lock mechanism 132 provided on the support tray 12 substantially automatically configures the novel quick release docking station 10 in the fully retracted engaged state, as illustrated here by example and without limitation. For example, the spring tooth 136 of the substantially automatic latching mechanism 134 substantially automatically engages the catch 138 formed on the second tail end 92 of the clamp sled portion 68 of the compression clamp slide 16 when the clamp expansion spring 98 is substantially compressed within the major interior expansion channel 80 of the clamp sled portion 68, which moves the catch 138 into position opposite from the spring tooth 136. The latching mechanism 134 is thus structured for substantially automatically latching the compression clamp slide 16 in its fully retracted engaged position with its clamp jaw portion 70 substantially nested within the relief 96 in the rear portion 52 of the support tray 12. Operation of the control lever 58 by the sled portion 68 of the compression clamp slide 16 within the first guide channel 54 in the tray floor portion 32 simultaneously operates the carrier sled portion 112 of the connector carrier slide 22 in the second guide channel 56. Therefore, retaining the compression clamp slide 16 as illustrated in its fully retracted engaged position thus retains the control lever 58 in its fully retracted engaged orientation, which effectively simultaneously causes the connector carrier slide 22 to assume its fully retracted engaged position in which its upright jaw portion 114 is substantially contacting the front portion 20 of the support tray 12 with the guides 124 on its inner surface 120 substantially fully engaged with the spaced apart guide ways 38, and the electrical interconnect portion 118 of the electrical connector 24 substantially nested within the connector clearance slot 36 in the front web portion 18 of the tray's guard rail 30 in a position to mate with the I/O interface port of the computer.

Figure 5:
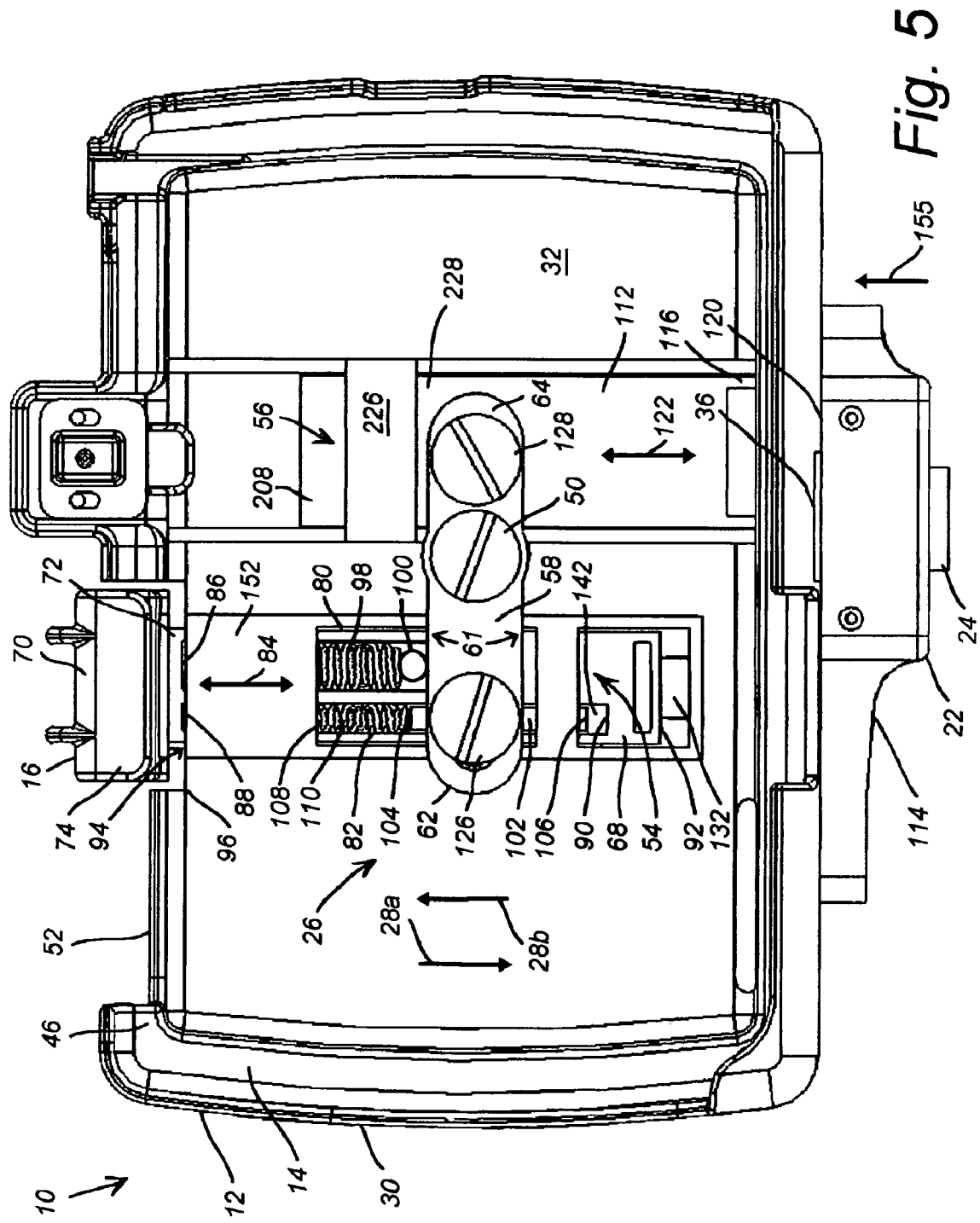
FIG. 5 is an elevation view showing an example of the novel quick release docking station in the fully retracted engaged state.

FIG. 5 is an elevation view showing an example of the novel quick release docking station 10 in the fully retracted engaged state. The connector carrier slide 22 is seated substantially against the front portion 20 of the support tray 12 with the guides 124 on its inner surface 120 substantially fully engaged with the spaced apart guide ways 38. The connector carrier slide 22 positions the electrical interconnect portion 118 of the electrical connector 24 substantially nested within the connector clearance slot 36 in the front web portion 18 of the tray's guard rail 30 in a position to mate with the I/O interface port of the computer. The upright clamp jaw portion 70 of the compression clamp slide 16 is manually forced into the relief 96 against the rear portion 52 of the support tray 12 by substantial compression of the clamp expansion spring 98 within the major interior expansion channel 80 of the clamp sled portion 68.

Operation of the lock mechanism 132 substantially automatically configures the novel quick release docking station 10 in the fully retracted engaged state, as illustrated here by example and without limitation. For example, by substantially automatically engaging the latching of the spring tooth 136 of the latching mechanism 134 with the catch 138 formed on the second tail end 92 of the clamp sled portion 68 of the compression clamp slide 16 when the catch 138 is move into position opposite from the spring tooth 136.

Figure 6:
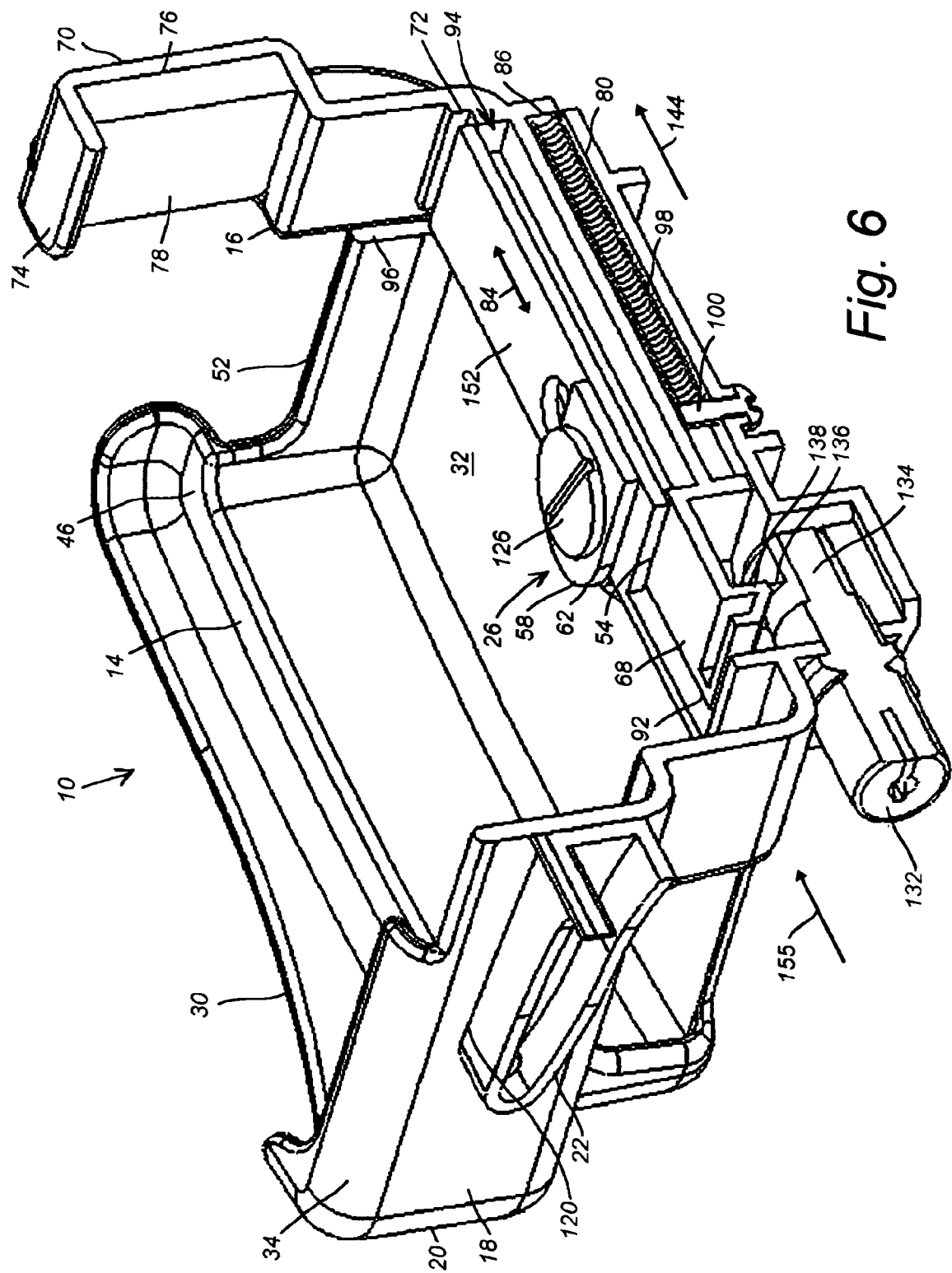
FIG. 6 is a perspective view of the novel quick release docking station showing a cross-section through the major interior expansion channel of the clamp sled portion of the compression clamp slide that illustrates operation of the lock mechanism for configuring the novel quick release docking station in the fully retracted engaged state.

FIG. 6 is a perspective view of the novel quick release docking station 10 showing a cross-section through the major interior expansion channel 80 of the clamp sled portion 68 of the compression clamp slide 16 that illustrates operation of the lock mechanism 132 for configuring the novel quick release docking station 10 in the fully retracted engaged state, as illustrated here by example and without limitation. For example, the latching of the spring tooth 136 of the latching mechanism 134 is engaged with the catch 138 formed on the second tail end 92 of the clamp sled portion 68 of the compression clamp slide 16. The lock mechanism 132 resists urging (indicated by arrow 144) of the compressed clamp expansion spring 98 operating within the major interior expansion channel 80 of the clamp sled portion 68 to urge the compression clamp slide 16 to substantially automatically expand into its disengaged and fully expanded receiving position partially extended out of the first guide channel 54 in the tray floor portion 32 with the upright clamp jaw portion 70 spaced away from the rear portion 52 of the support tray 12. Thus, operation of the lock mechanism 132 to retract the spring tooth 136 of the latching mechanism 134 away from the catch 138 will permit the compressed clamp expansion spring 98 to substantially automatically expand within the major interior expansion channel 80 of the clamp sled portion 68 and urge the compression clamp slide 16 to substantially automatically expand into its disengaged and fully expanded receiving position partially extended out of the first guide channel 54, which substantially automatically drives the connector carrier sled portion 112 of the connector carrier slide 22 substantially simultaneously automatically expand into its disengaged and fully expanded receiving position partially extended out of the second guide channel 56, whereby the novel quick release docking station 10 assumes its fully disengaged and fully expanded receiving state.

Figure 7:
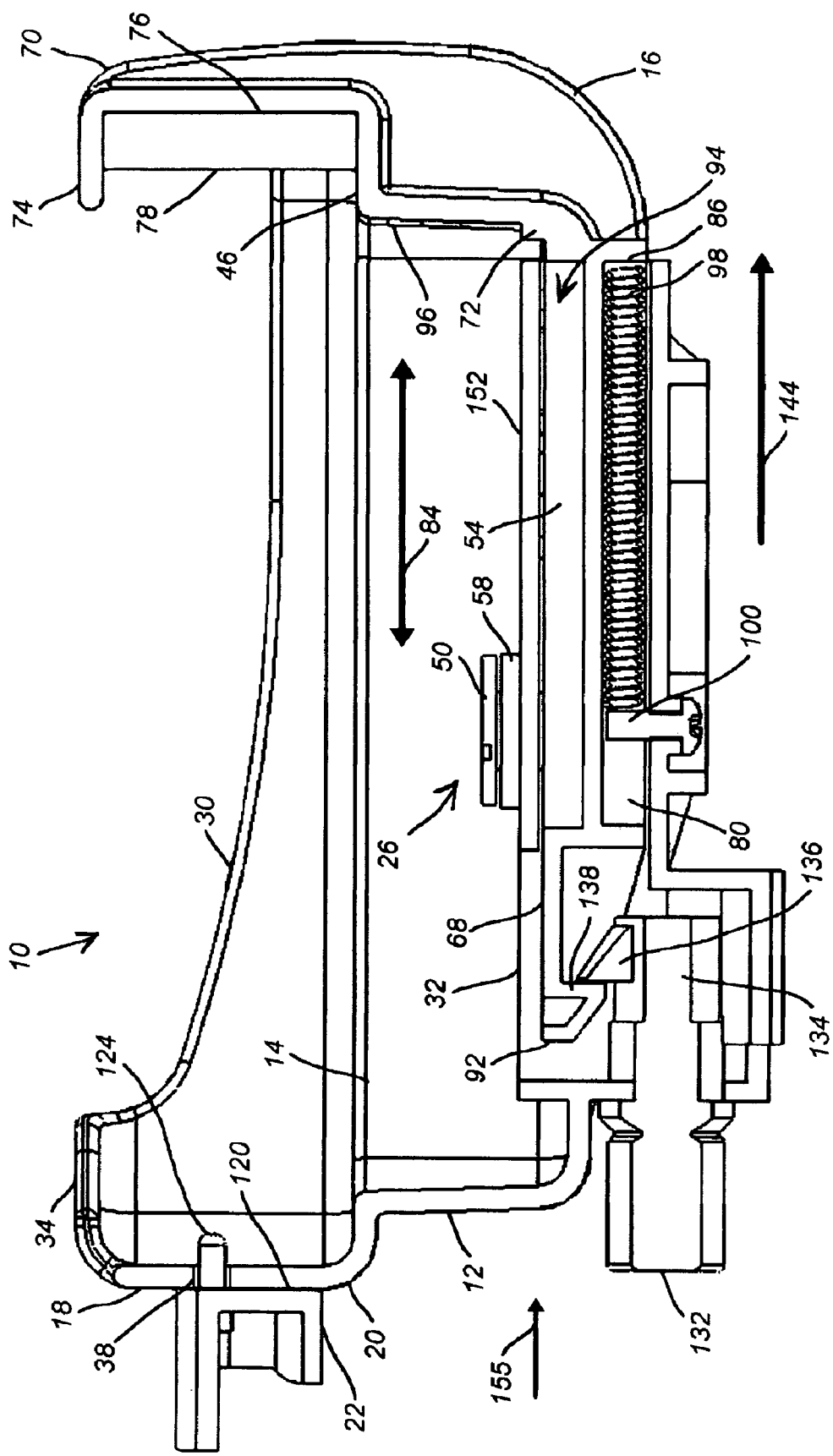
FIG. 7 is another cross-section view through the major interior expansion channel of the clamp sled portion of the compression clamp slide of the novel quick release docking station that illustrates operation of the lock mechanism for configuring the novel quick release docking station in the fully retracted engaged state.

FIG. 7 is another cross-section view through the major interior expansion channel 80 of the clamp sled portion 68 of the compression clamp slide 16 of the novel quick release docking station 10 that illustrates operation of the lock mechanism 132 for configuring the novel quick release docking station 10 in the fully retracted engaged state, as illustrated here by example and without limitation. For example, the latching of the spring tooth 136 of the latching mechanism 134 is engaged with the catch 138 on the second tail end 92 of the clamp sled portion 68 for retaining the compression clamp slide 16 in the fully retracted engaged position against urging (indicated by arrow 144) of the compressed clamp expansion spring 98 that tends to urge the compression clamp slide 16 to substantially automatically expand into its disengaged and fully expanded receiving position. Thus, operation of the lock mechanism 132 to release the catch 138 permits the compressed clamp expansion spring 98 to substantially automatically expand between the stop portion 100 of the tray floor portion 32 and the internal end face portion 86 of the major interior expansion channel 80 with the compression clamp sled portion 68, as describe herein.

Here, by example and without limitation, the stop portion 100 of the tray floor portion 32 is illustrated as a pin or screw through the tray floor portion 32. Accordingly, the stop portion 100 can be moved or removed to adjust the length of the major interior expansion channel 80 of the clamp sled portion 68. Accordingly, spring rate of the clamp expansion spring 98 can be adjusted, or one clamp expansion spring 98 can be substituted for another of greater or lesser length.

Figure 8:
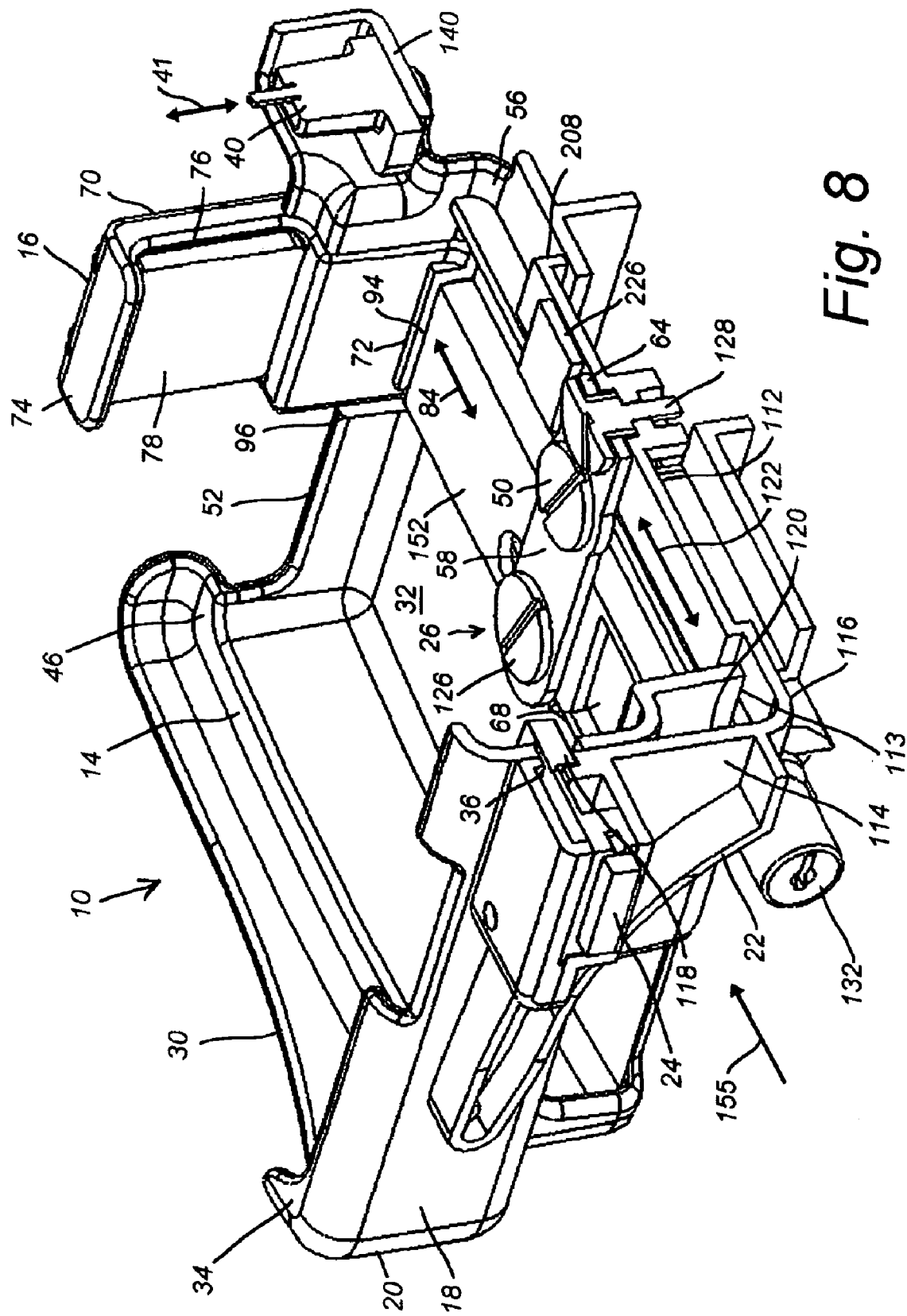
FIG. 8 is a perspective view of the novel quick release docking station showing a cross-section through the connector carrier slide and the connected second drive pin that illustrates, by example and without limitation, operation of the control lever on the fulcrum pin for retracting the connector carrier slide into its fully retracted engaged position and configuring the novel quick release docking station in the fully retracted engaged state.

FIG. 8 is a perspective view of the novel quick release docking station 10 showing a cross-section through the connector carrier slide 22 and the connected second drive pin 128 that illustrates, by example and without limitation, operation of the control lever 58 on the fulcrum pin 50 for retracting the connector carrier slide 22 into its fully retracted engaged position and configuring the novel quick release docking station 10 in the fully retracted engaged state, as illustrated here by example and without limitation. The compression clamp slide 16 is forced inward toward the rear portion 52 of the support tray 12 against the outward urging of the clamp expansion spring 98, as discussed herein. The control lever 58 is driven by its connection through the first drive pin 126 and the slip connector block 102 to rotate in reverse on the fulcrum pin 50 from its fully expanded receiving orientation into its opposite fully retracted engaged orientation. Reversal of the control lever 58 from its fully expanded receiving orientation into its opposite fully retracted engaged orientation causes the second drive pin 128 to drive the connector carrier slide 22 inward toward the front portion 20 of the support tray 12.

The compression clamp slide 16 is forced against the outward urging of the clamp expansion spring 98 until it is substantially compressed within the major interior expansion channel 80 of the clamp sled portion 68, as discussed herein. When the clamp expansion spring 98 is forced into substantially compression, and the catch 138 formed on the second tail end 92 of the clamp sled portion 68 reaches the vicinity of the lock mechanism 132, the spring tooth 136 of the latching mechanism 134 substantially automatically engages the catch 138. Engagement of the spring tooth 136 of the latching mechanism 134 with the catch 138 effectively retains the compression clamp slide 16 in its fully retracted engaged position against spring pressure exerted by the substantially compressed clamp expansion spring 98. Retention of the compression clamp slide 16 effectively retains the control lever 58 rotated in its fully retracted engaged orientation. In turn, the control lever 58 operates through its second lever arm 64 and the second drive pin 128 to retain the connector carrier slide 22 in its fully retracted engaged position against the front portion 20 of the support tray 12. Thus, operation of the latching mechanism 134 portion of the lock mechanism 132 additionally effectively retains the connector carrier slide 22 in its fully retracted engaged position, which simultaneously retains the electrical interconnect portion 118 of the electrical connector 24 in its fully retracted engaged position extended from an inner surface 120 of the connector carrier slide jaw portion 114.

Figure 9:
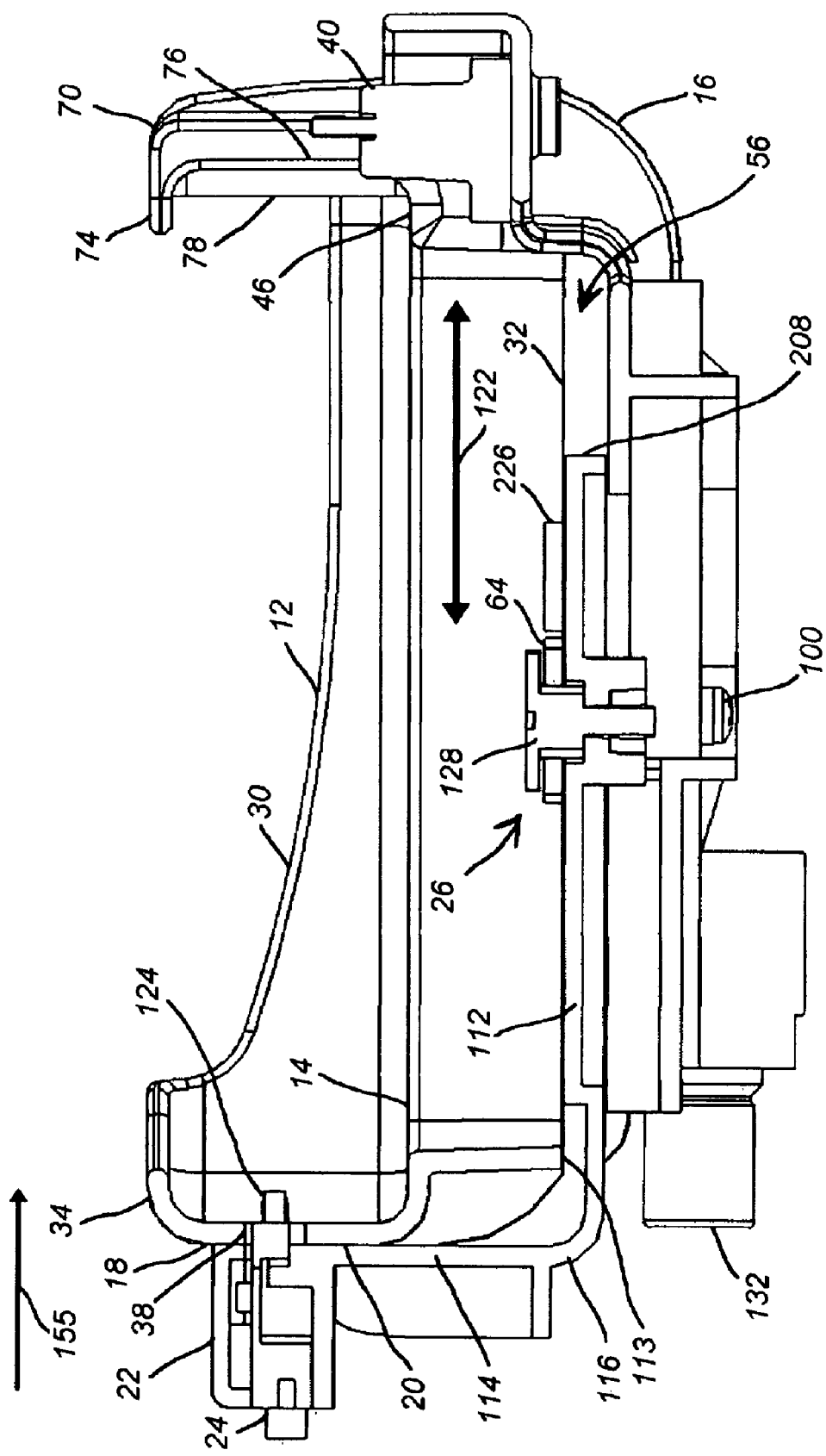
FIG. 9 is a cross-section view through the connector carrier slide and the connected second drive pin that illustrates, by example and without limitation, the fully retracted engaged state of the novel quick release docking station.

FIG. 9 is a cross-section view through the connector carrier slide 22 and the connected second drive pin 128 that illustrates, by example and without limitation, the fully retracted engaged state of the novel quick release docking station 10, as described herein.

Figure 10:
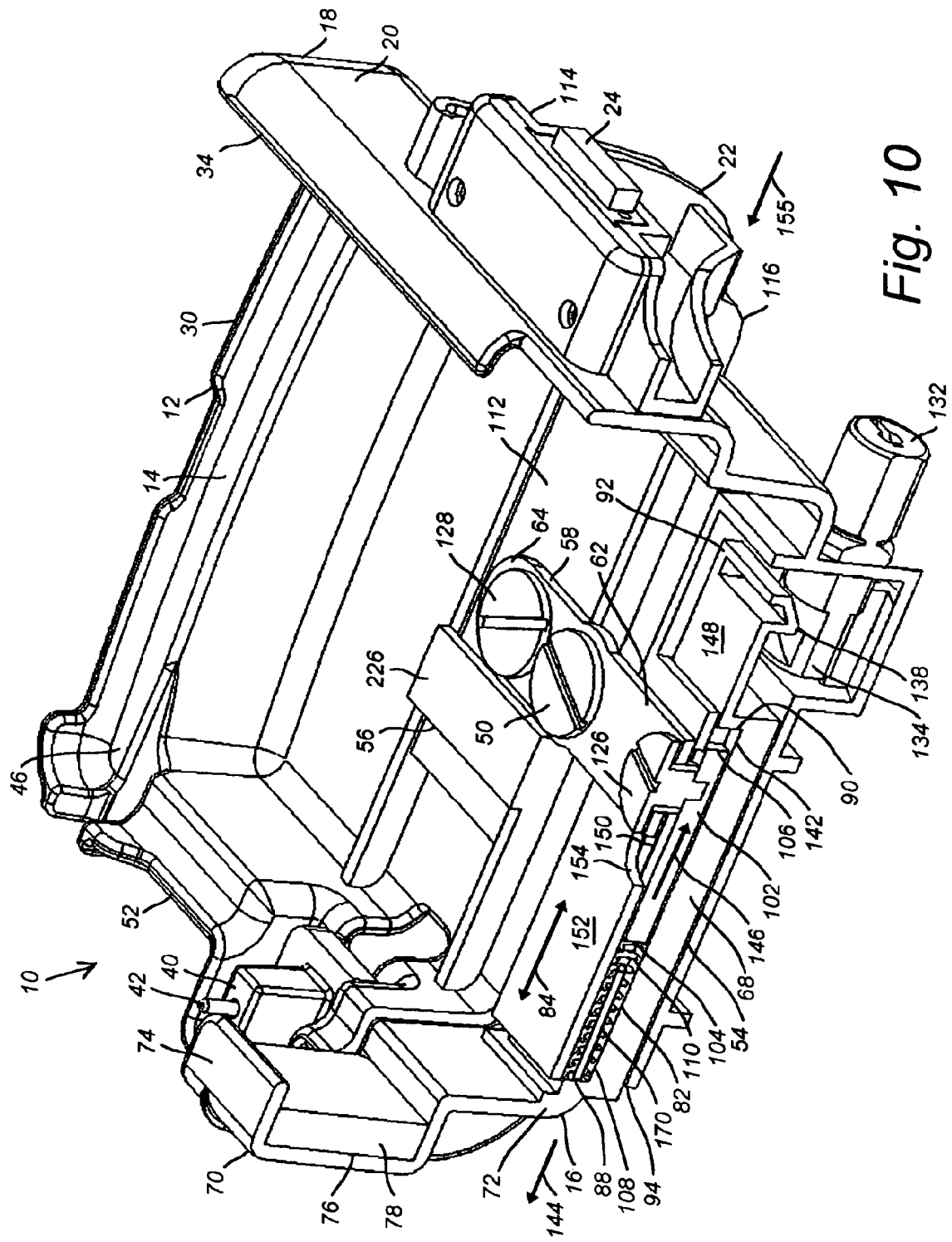
FIG. 10 is a cross-section view through the minor interior expansion channel of the clamp sled portion of the compression clamp slide portion shown in perspective that, by example and without limitation, illustrates another aspect of the novel quick release docking station.

FIG. 10 is a cross-section view through the minor interior expansion channel 82 of the clamp sled portion 68 of the compression clamp slide 16 portion shown in perspective that, by example and without limitation, illustrates another aspect of the novel quick release docking station 10. Here, the novel quick release docking station 10 is shown in its fully retracted engaged state having the compression clamp slide 16 and the connector carrier slide 22 both illustrated in their respective fully retracted engaged positions with the control lever 58 illustrated in its fully retracted engaged orientation. Engagement of the spring tooth 136 of the latching mechanism 134 with the catch 138 effectively retains the compression clamp slide 16 in its fully retracted engaged position against spring pressure exerted by the substantially compressed clamp expansion spring 98. The compression clamp slide 16 is thus effectively fixed in its fully retracted engaged position.

The connector return spring 110 is partially compressed within the nominal return spring gap 108 formed in the space between the first reaction portion 104 of the slip connector block 102 of the linkage mechanism 26 and the first internal stop portion 88 of the minor interior expansion channel 82 adjacent to the clamp jaw portion 70. Accordingly, the decoupled or "soft" aspect of the linkage mechanism 26 urges the connector carrier slide 22 into its fully retracted engaged position relative to the front portion 20 of the support tray 12. As illustrated here, the partially compressed connector return spring 10 presses against the first internal stop portion 88 of the minor interior expansion channel 82 of the compression clamp slide 16 which is effectively fixed in the fully retracted engaged position by the latching mechanism 134. Therefore, the partially compressed connector return spring 110 presses against the first reaction portion 104 of the slip connector block 102 to urge (indicated by arrow 146) the second reaction portion 106 toward the second internal stop portion 90 of the minor interior expansion channel 82 and into the nominal clearance gap 142. The expansion pressure of the partially compressed connector return spring 110 against the first reaction portion 104 of the slip connector block 102 is transmitted through the first drive pin 126. The slip connector block 102 is structured to slide smoothly through the minor interior expansion channel 82 along the longitudinal direction 84.

The sliding motion of the slip connector block 102 is transmitted through the first drive pin 126, so that it also moves along the longitudinal direction 84. At least a portion of an upper surface 148 of the clamp sled portion 68 provides an opening 150 into the minor expansion channel 82 along the longitudinal direction 84 for accommodating the motion of the first drive pin 126. Here, by example and without limitation, the opening 150 is formed along substantially the entire length of the minor expansion channel 82. However, the opening 150 need only be long enough to accommodate motion of the first drive pin 126 that operates there through. A roof portion 152 of the first guide channel 54 is formed with an opening 154 positioned over the opening 150 and aligned along the longitudinal direction 84 of the minor expansion channel 82 also for accommodating the motion of the first drive pin 126. Here, the opening 154 in the roof portion 152 of the first guide channel 54 is illustrated, by example and without limitation, as being a slot sized to accommodate motion of the first drive pin 126 as it is driven by the sliding motion of the slip connector block 102.

The sliding motion of the slip connector block 102 is transmitted through the first drive pin 126 into the longer first lever arm 62 of the control lever 58, which tends to rotate about the fulcrum pin 50 toward its fully retracted engaged orientation. The expansion force of the partially compressed connector return spring 110 is transmitted through the longer first lever arm 62 of the control lever 58 into the shorter second lever arm 64, and through the second drive pin 128 into the carrier sled portion 112 to urge the connector carrier slide 22 into its fully retracted engaged position. Thus, the decoupled or "soft" aspect of the linkage mechanism 26 results in the expansion spring force of the partially compressed connector return spring 110 operating through the control lever 58 and interconnecting first and second drive pins 126 and 128 to urge (indicated by arrow 155) the connector carrier slide 22 into its fully retracted engaged position.

Due to the decoupled or "soft" aspect of the linkage mechanism 26, the latching mechanism 134 does not immovably fix the connector carrier slide 22 in its fully retracted engaged position. Rather, the latching mechanism 134 retains the compression clamp slide 16 in its fully retracted engaged position, and spring pressure of the partially compressed connector return spring 110 urges the connector carrier slide 22 into its fully retracted engaged position relative to the support tray 12. The spring pressure of the partially compressed connector return spring 110 operates against the slip connector block 102, which drives the longer first lever arm 62 of the control lever 58 into its fully retracted engaged orientation through the first drive pin 126. The shorter second lever arm 64 of the control lever 58 is rotated away from the front portion 20 of the support tray 12, which causes the second drive pin 128 to slide the connector carrier sled portion 112 of the connector carrier slide 22 into its fully retracted engaged position within the second guide channel 56 in the tray floor portion 32, as illustrated here. Retraction of the connector carrier sled portion 112 pulls the connector carrier slide 22 toward the front portion 20 of the support tray 12 and into its fully retracted engaged position. The connector carrier slide 22 stops with the inner surface 120 of the jaw portion 114 substantially against the web portion 18 of the guard rail 30 at the front portion 20 of the tray 12.

When the jaw portion 114 of the connector carrier slide 22 stops against the front portion 20 of the tray 12, the connector carrier slide 22 operates through the second drive pin 128 to stop the control lever 58 in its fully retracted engaged orientation relative to the floor portion 32 of the tray 12. The control lever 58 in turn operates through the first drive pin 126 to stop the slip connector block 102 in the minor interior expansion channel 82 of the clamp sled portion 68 in a position for forming the nominal return spring gap 108 between its first reaction portion 104 and the first internal stop portion 88 adjacent to the compression clamp jaw portion 70 with the connector return spring 110 partially compressed therein, and simultaneously forming the nominal clearance gap 142 between its second reaction portion 106 and the second internal stop portion 90 of the minor interior expansion channel 82 adjacent to the second tail end 92 of the clamp sled portion 68, as illustrated here.

Both the nominal return spring gap 108 and the nominal clearance gap 142 between opposite reaction portions 104 and 106 of the slip connector block 102 and the corresponding first and second internal stop portions 88 and 90 of the minor interior expansion channel 82 permit the clamp sled portion 68 to move slightly into and out of the first guide channel 54 without imparting a corresponding rotation to the control lever 58. Thus, the decoupled or "soft" aspect of the linkage mechanism 26 permits the compression clamp slide 16 to move slightly relative to the support tray 12 without affecting the connector carrier slide 22 or the seating of the electrical connector 24 with the computer. For example, significant shock or vibration inputs may cause the computer to momentarily shift along the longitudinal direction 84. While such minor events are substantially absorbed over time by the cushion 78 on the inner surface 76 of the clamp jaw portion 70, instantaneous movements of the compression clamp slide 16 may occur. The return spring gap 108 and clearance gap 142 together operate to disconnect such instantaneous movements of the compression clamp slide 16 from the connector carrier slide 22 and the support tray 12 in general so that support of the computer and coupling of the electrical connector 24 with the mating I/O communication interface port are not compromised.

Figure 11:
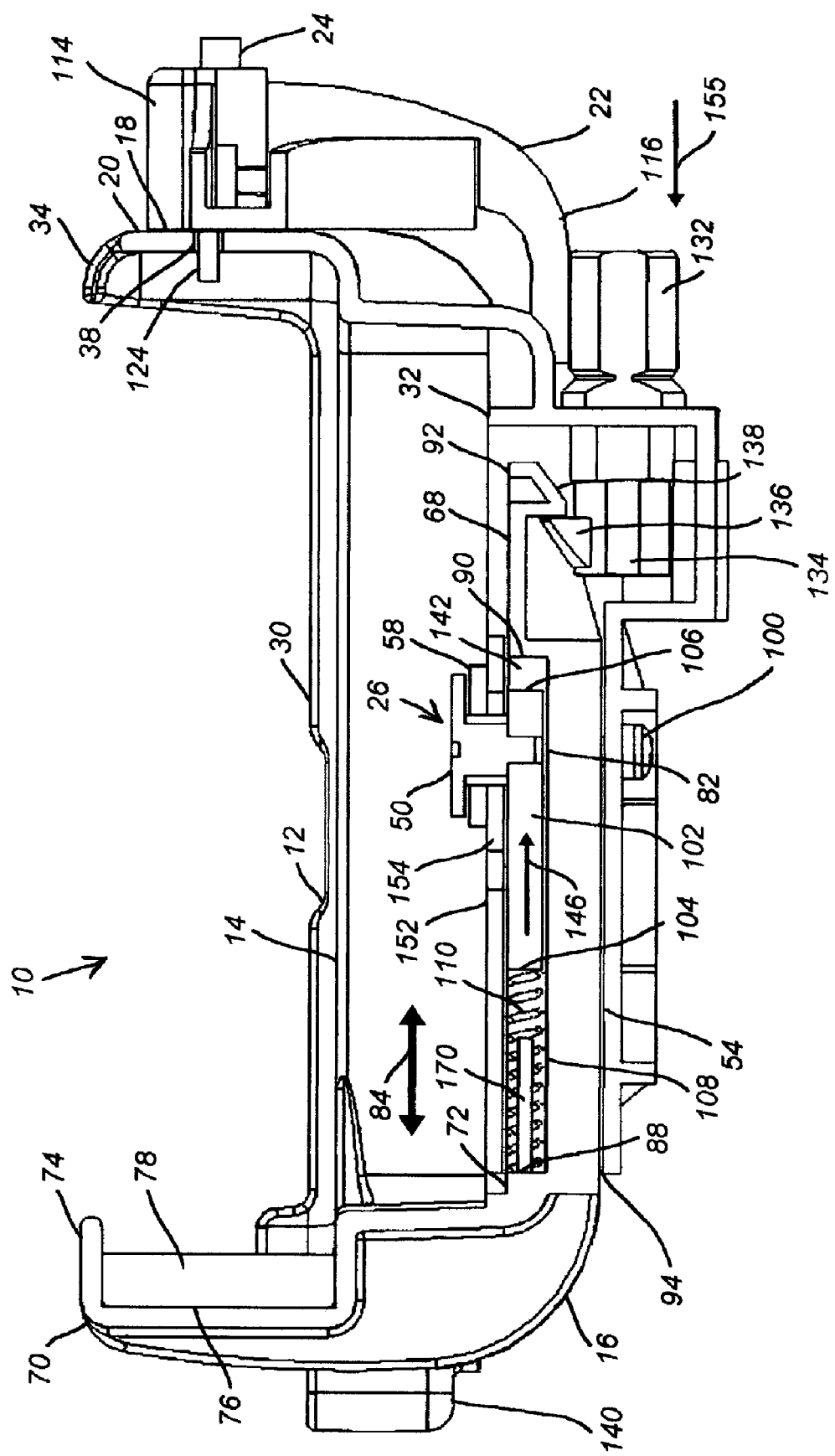
FIG. 11 is a cross-section view of the novel quick release docking station through the minor interior expansion channel of the clamp sled portion of the compression clamp slide portion that, by example and without limitation, illustrates the decoupled or "soft" aspect of the novel linkage mechanism.

FIG. 11 is a cross-section view of the novel quick release docking station 10 through the minor interior expansion channel 82 of the clamp sled portion 68 of the compression clamp slide 16 portion that, by example and without limitation, illustrates the decoupled or "soft" aspect of the linkage mechanism 26. Here, the slip connector block 102 is positioned in the minor interior expansion channel 82 of the clamp sled portion 68 by operation of the connector carrier slide 22 acting through the control lever 58 when the compression clamp slide 16 is in its fully retracted engaged position relative to the support tray 12, as describe herein.

Figure 12:
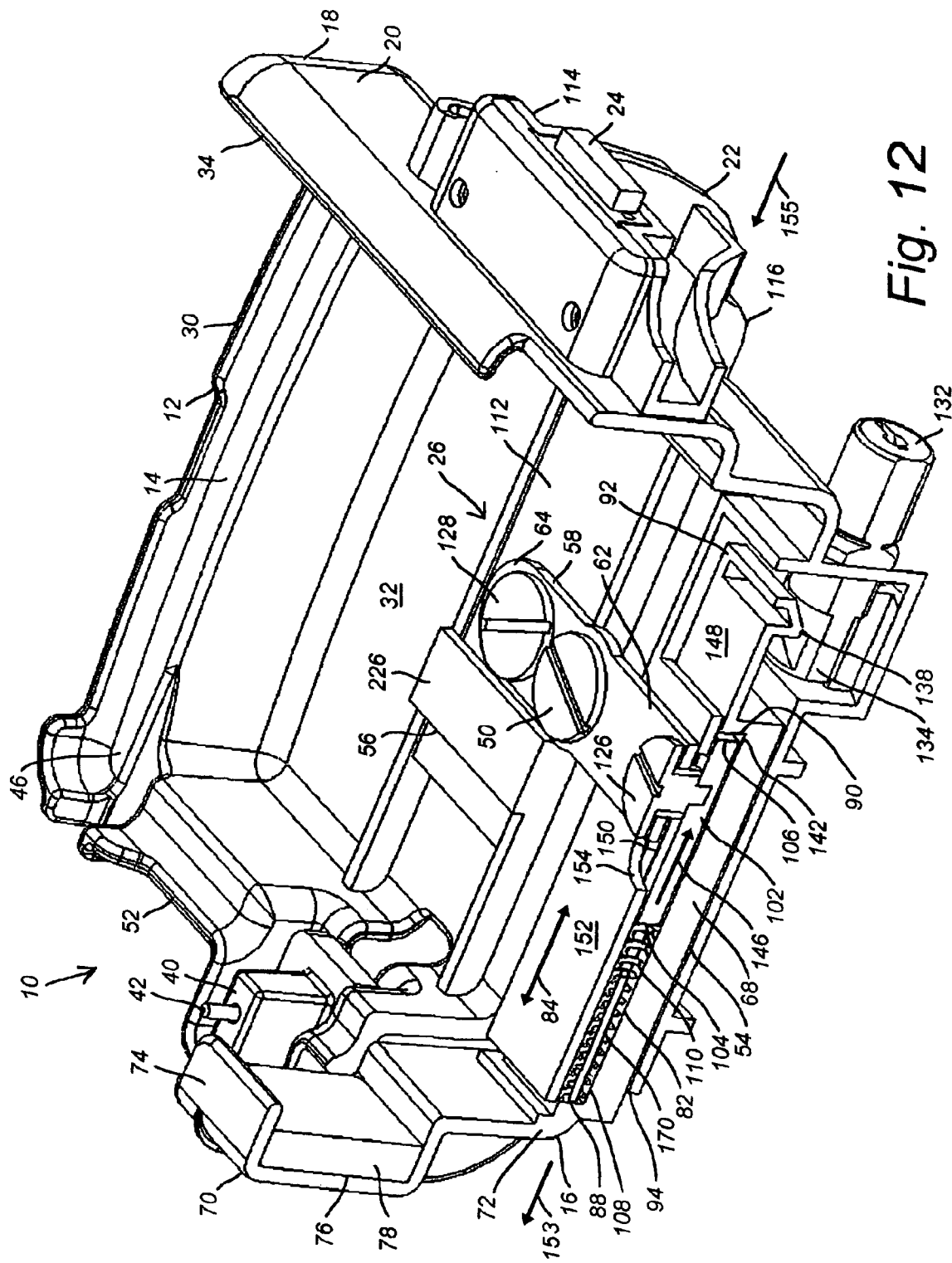
FIG. 12 illustrates by example and without limitation another decoupled or "soft" aspect of the novel linkage mechanism.

FIG. 12 illustrates by example and without limitation another decoupled or "soft" aspect of the linkage mechanism 26. As discussed herein, the nominal return spring gap 108 between the first reaction portion 104 of the slip connector block 102 and the corresponding first internal stop portion 88 of the minor interior expansion channel 82 and the nominal clearance gap 142 between the second reaction portion 106 of the slip connector block 102 and the corresponding second internal stop portion 90 of the minor interior expansion channel 82 both permit the clamp sled portion 68 to move slightly into and out of the first guide channel 54 without imparting a corresponding rotation to the control lever 58. Thus, the decoupled or "soft" aspect of the linkage mechanism 26 permits the compression clamp slide 16 to move slightly relative to the support tray 12, for example in response to significant shock or vibration inputs to the computer, without affecting the connector carrier slide 22 or the seating of the electrical connector 24 with the computer. Here, the clamp sled portion 68 of the compression clamp slide 16 is illustrated as being shifted (indicated by arrow 153) along the longitudinal direction 84 toward the rear portion 52 of the support tray 12. The clearance gap 142 permits the second internal stop portion 90 of the minor interior expansion channel 82 to approach the corresponding second reaction portion 106 of the slip connector block 102, even to the point of touching, without making immediate operational contact. Simultaneously, the partially compressed connector return spring 110 automatically partially expands within the return spring gap 108, which maintains constant spring pressure on the first reaction portion 104 of the slip connector block 102. The spring pressure on the first reaction portion 104 urges (indicated by arrow 146) the slip connector block 102 to pressure the first drive pin 126 to retain the rotation of the control lever 58 on the fulcrum pin 50 in its fully retracted engaged orientation. The control lever 58 in turn operates through the second drive pin 128 coupled to the carrier sled portion 112 to urge (indicated by arrow 155) the connector carrier slide 22 to remain its fully retracted engaged position. Thus, according to the decoupled or "soft" aspect of the linkage mechanism 26, the return spring gap 108 and clearance gap 142 together operate to disconnect or de-couple such instantaneous movements of the compression clamp slide 16 from the connector carrier slide 22 and the support tray 12 in general so that support of the computer and coupling of the electrical connector 24 with the mating I/O communication interface port are not compromised. This disconnecting or de-coupling aspect of the linkage mechanism 26 also permits other voluntary or involuntary small movements of the compression clamp slide 16 to occur without compromising mating of the electrical connector 24 with the computer's I/O interface port.

Figure 13:
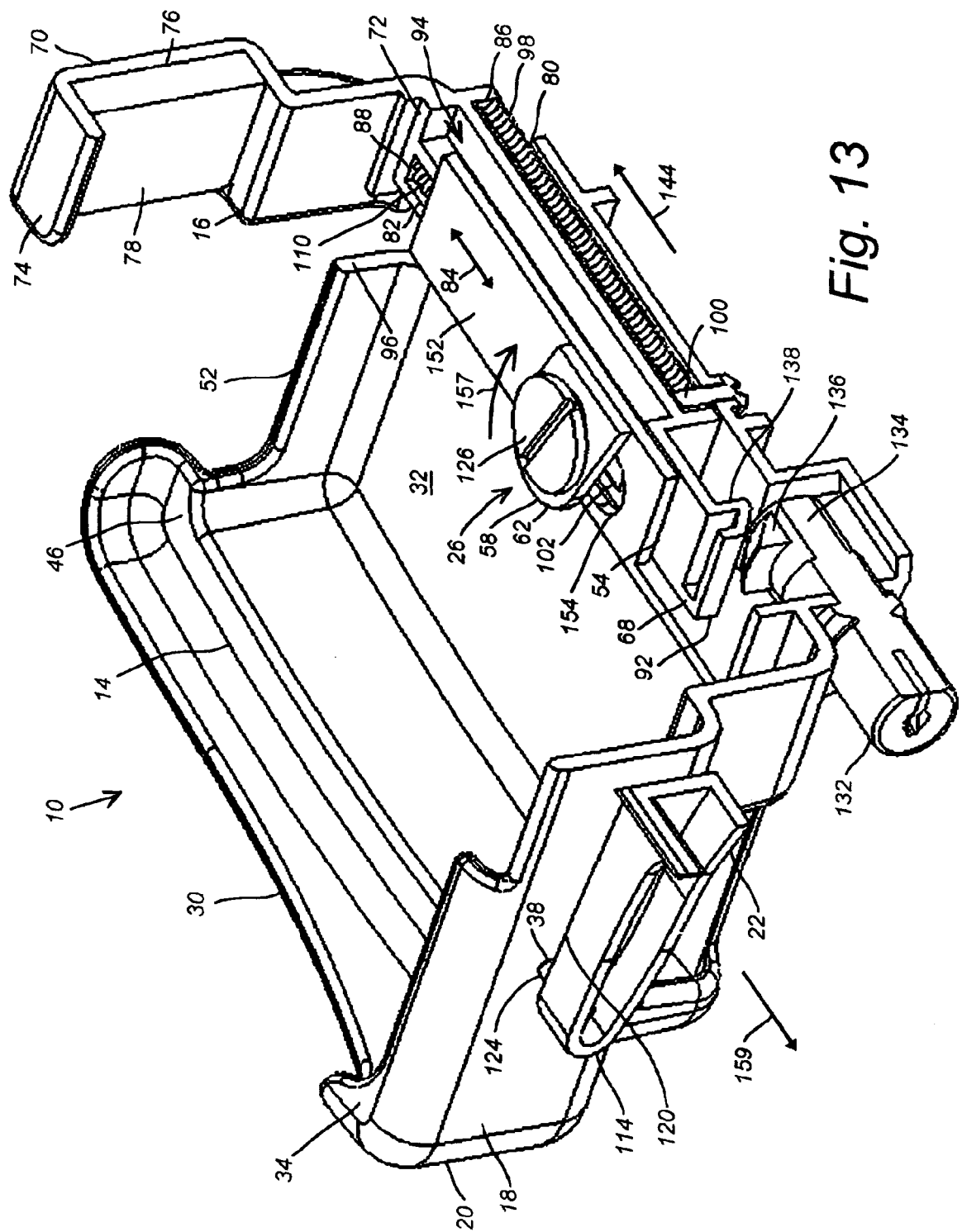
FIG. 13 is a perspective view of the novel quick release docking station showing a cross-section through the major interior expansion channel of the clamp sled portion of the compression clamp slide that, by example and without limitation, illustrates operation of the clamp expansion spring for urging the compression clamp slide to substantially automatically expand into its disengaged and fully expanded receiving position relative to the support tray.

FIG. 13 is a perspective view of the novel quick release docking station 10 showing a cross-section through the major interior expansion channel 80 of the clamp sled portion 68 of the compression clamp slide 16 that, by example and without limitation, illustrates operation of the clamp expansion spring 98 for urging the compression clamp slide 16 to substantially automatically expand into its disengaged and fully expanded receiving position relative to the support tray 12. Here, operation of the lock mechanism 132 disengages the spring tooth 136 of the latching mechanism 134 from the catch 138. Disengagement of lock mechanism 132 permit the compressed clamp expansion spring 98 to substantially automatically expand within the major interior expansion channel 80 of the clamp sled portion 68. Expansion of the clamp expansion spring 98 (indicated by arrow 144) urges the compression clamp slide 16 to substantially automatically expand into its disengaged and fully expanded receiving position in which it is partially extended out of the first guide channel 54 of the support tray floor portion 32. The upright clamp jaw portion 70 is thus spaced away from the rear portion 52 of the support tray 12 to permit insertion of the computer. Expansion of the compression clamp slide 16 substantially automatically drives the connector carrier slide 22 to substantially simultaneously automatically expand into its disengaged and fully expanded receiving position in which its connector carrier sled portion 112 is partially extended out of the second guide channel 56, whereby the electrical interconnect portion 118 of the electrical connector 24 is substantially retracted relative to the clearance hole or slot 36 in the web portion 18 on the front portion 20 of the support tray 12. Thus, the novel quick release docking station 10 assumes its fully disengaged and fully expanded state for receiving the computer.

Figure 14:
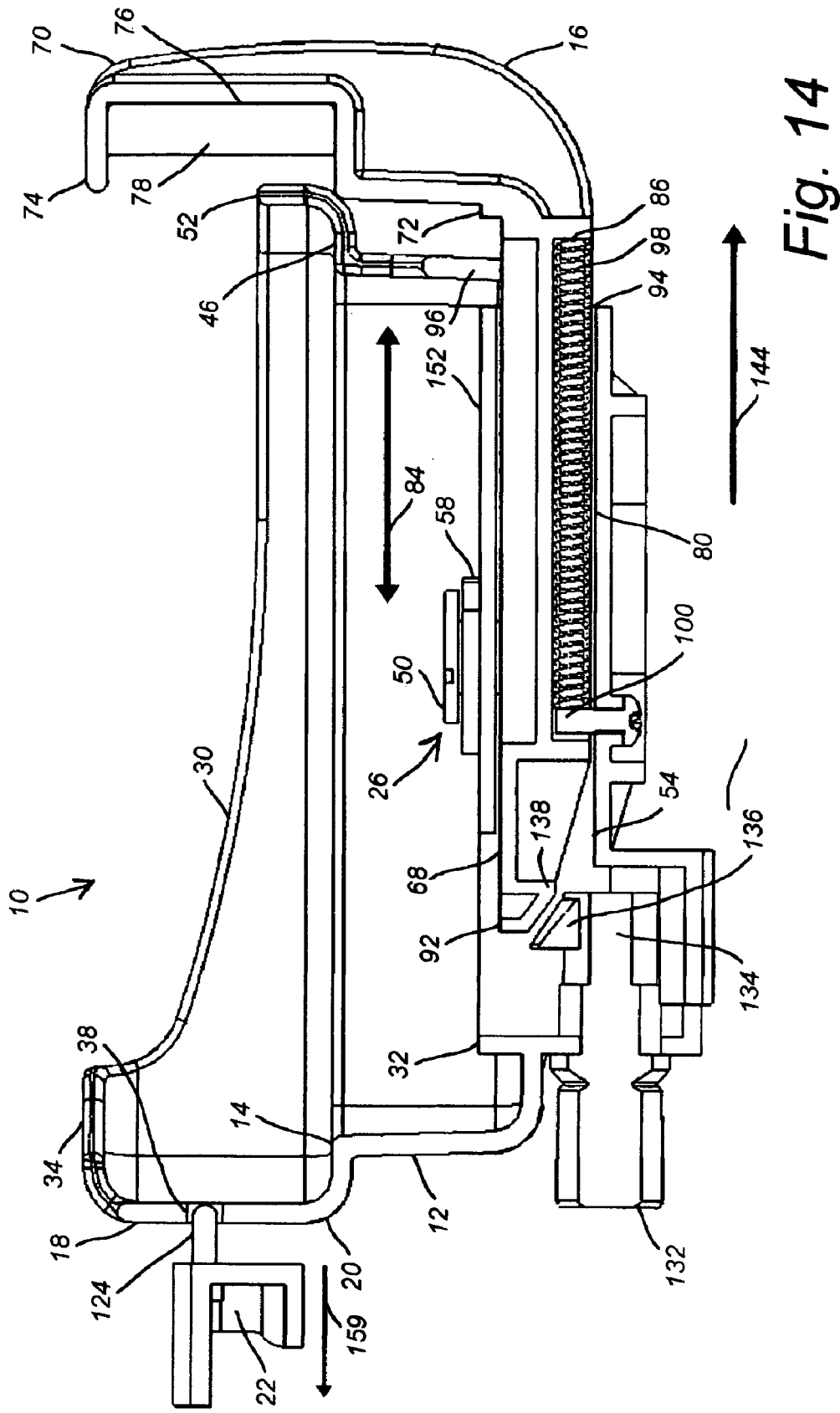
FIG. 14 is a cross-section view of the novel quick release docking station through the major interior expansion channel of the clamp sled portion of the compression clamp slide portion that, by example and without limitation, illustrates operation of the clamp expansion spring for urging the compression clamp slide to substantially automatically expand into its disengaged and fully expanded receiving position relative to the support tray along the arrow direction.

FIG. 14 is a cross-section view of the novel quick release docking station 10 through the major interior expansion channel 80 of the clamp sled portion 68 of the compression clamp slide 16 portion that, by example and without limitation, illustrates operation of the clamp expansion spring 98 for urging the compression clamp slide 16 to substantially automatically expand into its disengaged and fully expanded receiving position relative to the support tray 12 along the arrow direction 144, as describe herein.

Figure 15:
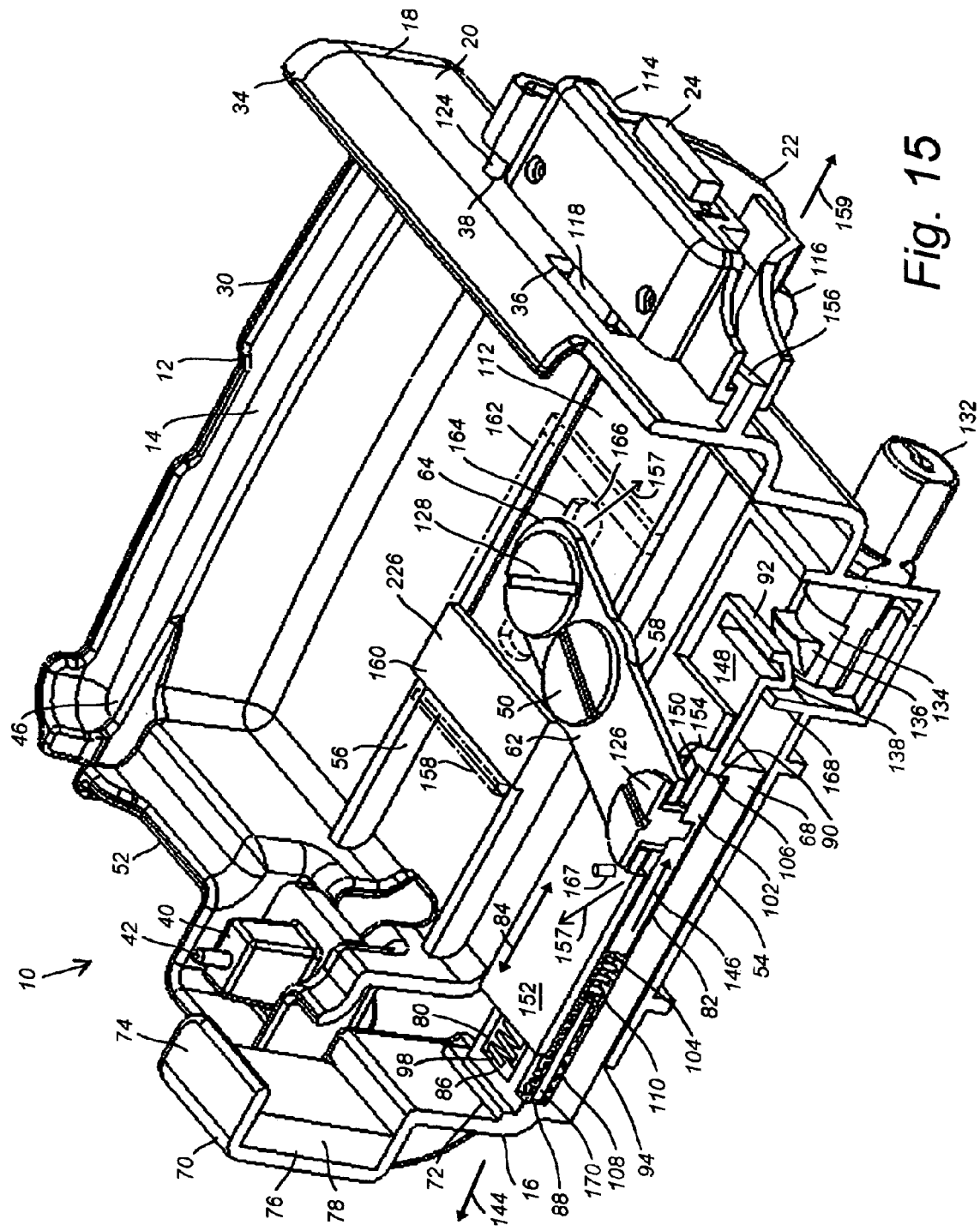
FIG. 15 is a cross-section view of the novel quick release docking station through the minor interior expansion channel of the clamp sled portion of the compression clamp slide portion that, by example and without limitation, illustrates the coupled or "hard" aspect of the novel linkage mechanism.

FIG. 15 is a cross-section view of the novel quick release docking station 10 through the minor interior expansion channel 82 of the clamp sled portion 68 of the compression clamp slide 16 portion that, by example and without limitation, illustrates the coupled or "hard" aspect of the linkage mechanism 26. Here, coupled or "hard" operation of the linkage mechanism 26 is illustrated during expansion of the novel quick release docking station 10 to its fully expanded receiving state, as describe herein. Here, the compression clamp slide 16 and connector carrier slide 22 are both in their respective fully expanded receiving positions relative to the support tray 12, as describe herein. As illustrated in previous Figures, the clamp expansion spring 98 is substantially fully expanded for urging the clamp sled portion 68 of the compression clamp slide 16 out of the first guide channel 54, which moves the upright clamp jaw portion 70 out of the nest relief 96 and spaces its overhanging retention lip 74 away from the rear portion 46 of the support tray's peripheral support lip 14 for receiving the computer. As the lock mechanism 132 is operated for disengaging the spring tooth 136 of the latching mechanism 134 from the catch 138 of the clamp sled portion 68 of the compression clamp slide 16, the clamp expansion spring 98 begins to expand between the stop portion 100 of the support tray floor portion 32 and the internal end face portion 86 of the major interior expansion channel 80 for urging the clamp sled portion 68 to exit the first guide channel 54 of the support tray 12 through the mouth opening 94. The slip connector block 102 is positioned in the minor interior expansion channel 82 of the clamp sled portion 68 with the connector return spring 110 in the return spring gap 108 between the first reaction portion 104 of the slip connector block 102 and the first internal stop portion 88 of the minor expansion channel 82 adjacent to the clamp jaw portion 70. As the clamp expansion spring 98 begins to expand, the partially compressed connector return spring 110 begins to expand in the return spring gap 108. Expansion of the connector return spring 110 exerts spring pressure against the first reaction portion 104 of the slip connector block 102 which causes it to slide through the minor expansion channel 82 along the longitudinal direction 84. As discussed above, due to the coupled or "hard" aspect of the linkage mechanism 26, the sliding motion of the slip connector block 102 is transmitted through the first drive pin 126. The sliding motion of the slip connector block 102 drives the first drive pin 126 to move along the longitudinal direction 84 through the slot opening 150 of the minor expansion channel 82 and the slot opening 154 in the roof portion 152 of the first guide channel 54, both being structured to accommodate motion of the first drive pin 126 along the longitudinal direction 84.

The sliding motion of the slip connector block 102 in the minor expansion channel 82 along the longitudinal direction 84 operates through the first drive pin 126 for rotating (indicated by arrows 157) the control lever 58 about the fulcrum pin 50 into its fully retracted engaged orientation relative to the support tray 12. In turn, the control lever 58 operates through the second drive pin 128 to urge the connector carrier slide 22 to remain in its fully retracted and engaged position with its carrier sled portion 112 substantially fully retracted into the second guide channel 56 in the floor portion 32 of the support tray 12 and its upright jaw portion 114 positioned adjacent to and substantially in contact with the support tray's front portion 20. Thus, the connector carrier slide 22 remains substantially fully retracted and engaged, even while the compression clamp slide 16 is beginning to disengage.

As expansion of the clamp expansion spring 98 increases, the nominal clearance gap 142 begins to narrow as the second internal stop portion 90 of the minor interior expansion channel 82 approaches the second reaction portion 106 of the slip connector block 102 opposite from the now partially expanded connector return spring 110. Continued expansion of the clamp expansion spring 98 brings the second internal stop portion 90 of the minor interior expansion channel 82 through the nominal clearance gap 142 and into contact with the second reaction portion 106 of the slip connector block 102, thereby substantially closing the clearance gap 142 previously formed there between and maximizing the return spring gap 108 which maximizes expansion of the connector return spring 110 residing therein. With the clearance gap 142 substantially closed and expansion of the clamp expansion spring 98 continuing to increase in the major interior expansion channel 80 for urging the clamp sled portion 68 further out of the first guide channel 54 of the support tray 12, the second internal stop portion 90 of the minor interior expansion channel 82 pushes against the second reaction portion 106 of the slip connector block 102, thereby engaging the control lever 58 through the first drive pin 126 coupled there between.

Continued expansion of the clamp expansion spring 98 within the major interior expansion channel 80 urges the clamp sled portion 68 yet further out of the first guide channel 54 of the support tray 12.

Additionally, the spring pressure of the continued expansion of the clamp expansion spring 98 is transmitted to the control lever 58 through the contact between the second internal stop portion 90 of the minor interior expansion channel 82 and the second reaction portion 106 of the slip connector block 102, which operates the control lever 58 through the connection between the first longer lever arm 62 and the first drive pin 126. Continued expansion of the clamp expansion spring 98 urges the first drive pin 126 to slide along the longitudinal direction 84 of the clamp sled portion 68, which pulls on the longer first lever arm 62 to rotate the control lever 58 from its fully retracted engaged orientation (see, e.g., FIG. 10) toward its expanded receiving orientation, as illustrated here. Rotation of the control lever 58 toward its expanded receiving orientation operates the connector carrier slide 22 through the second drive pin 128 coupled between the second shorter lever arm 64 and the carrier sled portion 112 of the connector carrier slide 22. Accordingly, as the clamp expansion spring 98 continues to expand, the carrier sled portion 112 of the connector carrier slide 22 is forced in the opposite direction (indicated by arrow 159) to slide out of its home in the second guide channel 56 in the tray floor portion 32, and the upright jaw portion 114 carrying the electrical connector 24 is driven into its fully expanded receiving position spaced away from the front portion 20 of the support tray 12, as illustrated here. Thus, the coupled or "hard" aspect of the linkage mechanism 26 effectively transmits the expansion spring pressure of the clamp expansion spring 98 from the compression clamp slide 16 to the connector carrier slide 22 to configure the novel quick release docking station 10 in its fully expanded receiving state.

The connector carrier slide 22 is optionally driven only so far as the pair of guides 124 remain at least partially engaged with the corresponding spaced apart guide ways 38 in the web portion 18 of the support tray's guard rail 30. Accordingly, several mechanisms are available for arresting expansion of the connector carrier slide 22, either directly or indirectly. In one example, an optional control clasp 156 is provided between the support tray 12 and the connector carrier slide 22, for example between the upright jaw portion 114 and the web portion 18 of the support tray's guard rail 30, which directly arrests expansion of the connector carrier slide 22. In another example, an optional control lip (shown) or pin 158 on the connector carrier sled portion 112 encounters an optional retainer portion 160 of the second guide channel 56 positioned between the rear portion 52 of the support tray 12 and the second drive pin 128, whereby expansion of the connector carrier slide 22 is directly arrested.

Optionally, the second guide channel 56 includes a second retainer portion 162 situated between the second drive pin 128 and the front portion 20 of the support tray 12. The second retainer portion 162 is positioned so as to interfere with the second shorter lever arm 64 during rotation of the control lever 58 and indirectly arrests expansion of the connector carrier slide 22. In another example, the second drive pin 128 operates in a control slot 164 optionally formed in the retainer portion 160 of the second guide channel 56, and interference between an end portion 166 of the control slot 164 and the second drive pin 128 indirectly arrests expansion of the connector carrier slide 22. Else, the slot opening 154 in the roof portion 152 of the first guide channel 54 interferes with the first drive pin 126, which interferes with rotation of the control lever 58 and thereby indirectly arrests expansion of the connector carrier slide 22. Alternatively, an optional control lip or pin (shown) 167 on the roof portion 152 of the first guide channel 54 directly interferes with rotation of the control lever 58 and thereby indirectly arrests expansion of the connector carrier slide 22.

In yet another example, an optional control tab 168 of the support tray 12 interferes with continued expansion of the compression clamp slide 16 external of the support tray 12. For example, the control tab 168 is situated to encounter the catch 138 formed on the second tail end 92 of the clamp sled portion 68 during expansion of the clamp expansion spring 98, whereby expansion of the connector carrier slide 22 is indirectly arrested. These and other means for either directly or indirectly arresting expansion of the connector carrier slide 22 are also contemplated and may be substituted without deviating from the scope and intent of the present invention.

When the compression clamp slide 16 and connector carrier slide 22 are expanded to their respective fully expanded receiving positions, the novel quick release docking station 10 is rendered in its fully expanded receiving state, as describe herein, for receiving the computer.

Figure 16:
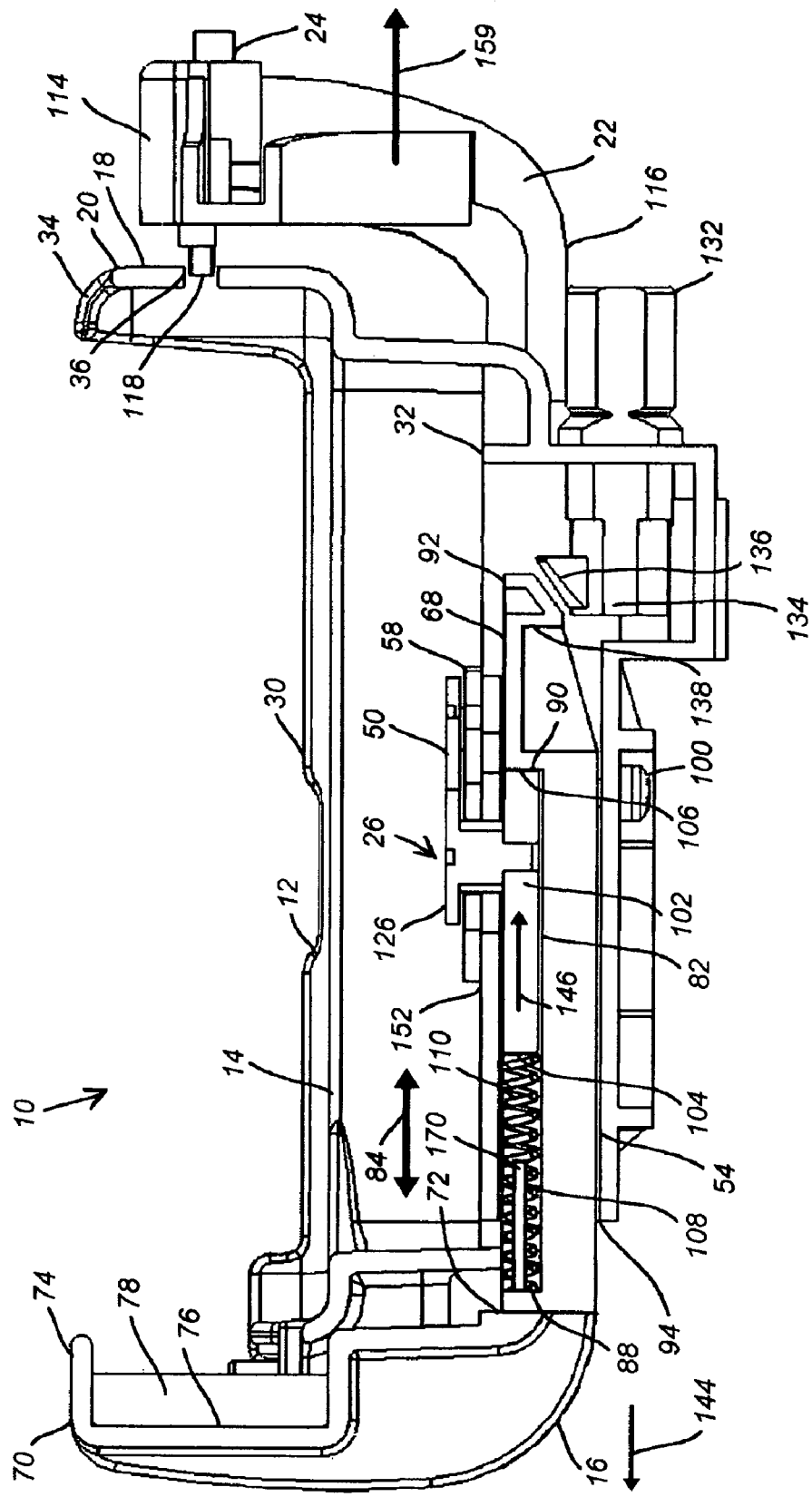
FIG. 16 is a cross-section view of the novel quick release docking station through the minor interior expansion channel of the clamp sled portion of the compression clamp slide portion that, by example and without limitation, illustrates the coupled or "hard" aspect of the novel linkage mechanism.

FIG. 16 is a cross-section view of the novel quick release docking station 10 through the minor interior expansion channel 82 of the clamp sled portion 68 of the compression clamp slide 16 portion that, by example and without limitation, illustrates the coupled or "hard" aspect of the novel linkage mechanism 26. The slip connector block 102 is illustrated positioned in the minor interior expansion channel 82 of the clamp sled portion 68 for operating the connector carrier slide 22 through the control lever 58 during expansion of the compression clamp slide 16 from its fully retracted engaged position relative to the support tray 12, as describe herein, into its fully expanded receiving position, as illustrated here and described herein.

Figure 17:
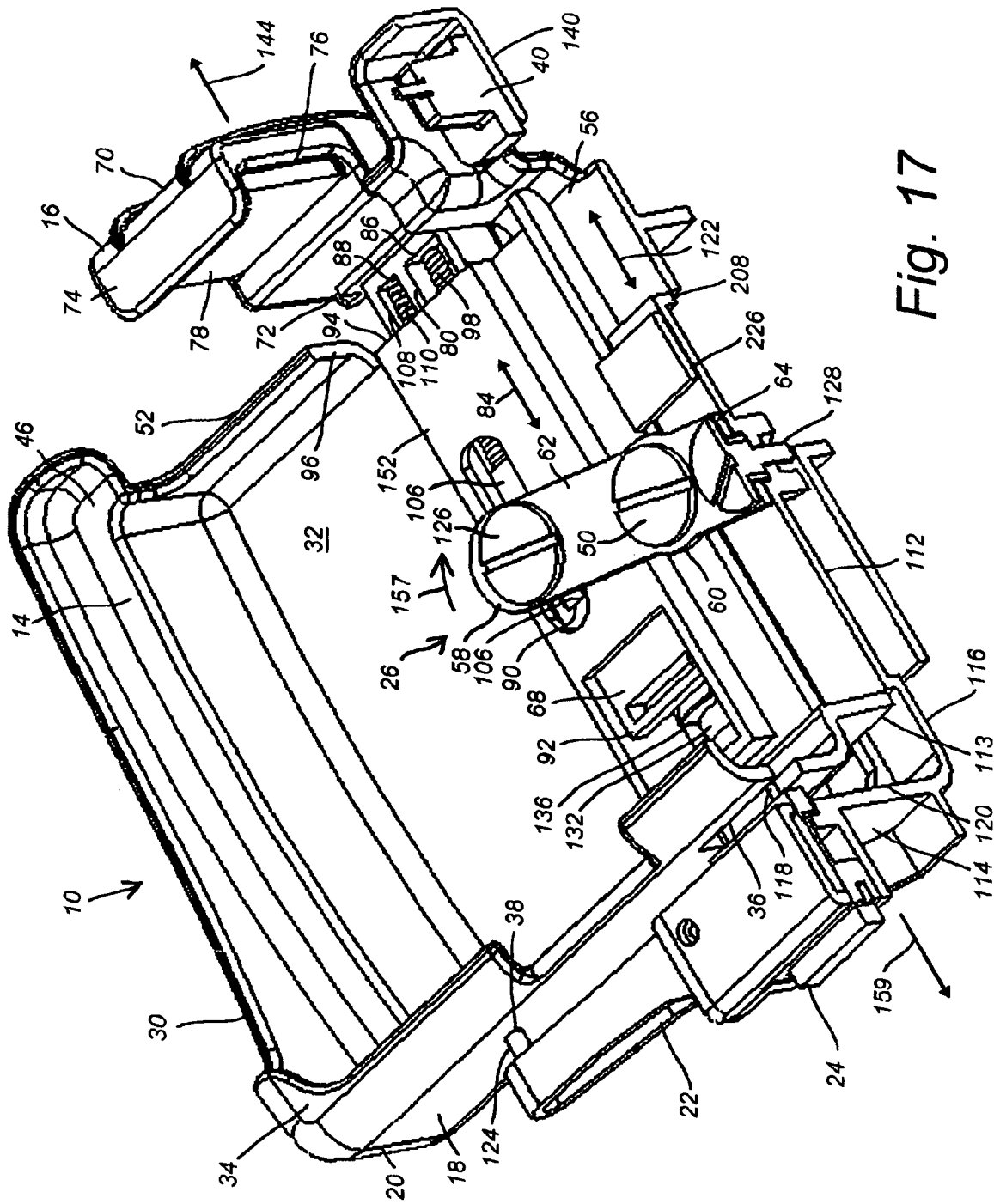
FIG. 17 is a perspective view of the novel quick release docking station showing a cross-section through the connector carrier slide and the connected second drive pin that illustrates, by example and without limitation, operation of the novel linkage mechanism for expanding both the compression clamp slide and connector carrier slide into their respective fully expanded receiving positions relative to the support tray.

FIG. 17 is a perspective view of the novel quick release docking station 10 showing a cross-section through the connector carrier slide 22 and the connected second drive pin 128 that illustrates, by example and without limitation, operation of the novel linkage mechanism 26 for expanding both the compression clamp slide 16 and connector carrier slide 22 into their respective fully expanded receiving positions relative to the support tray 12, as describe herein. Here, rotation (indicated by arrow 157) of the control lever 58 on the fulcrum pin 50 is illustrated for driving the connector carrier slide 22 into its fully expanded receiving position, as described herein.

Figure 18:
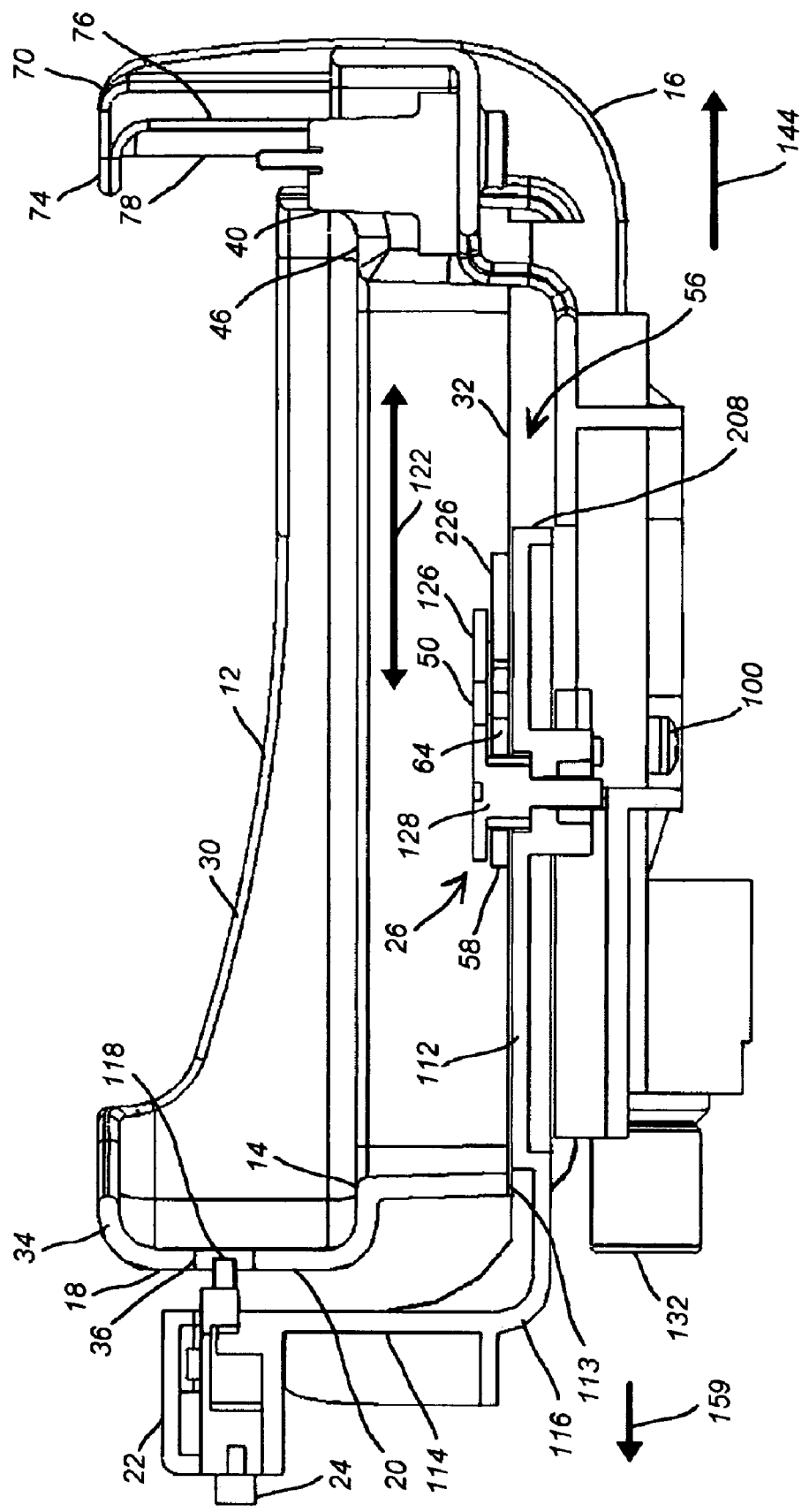
FIG. 18 is a cross-section view of the novel quick release docking station through the connector carrier slide and the connected second drive pin that illustrates, by example and without limitation, operation of the control lever on the fulcrum pin for driving the connector carrier slide into its fully expanded receiving position.

FIG. 18 is a cross-section view of the novel quick release docking station 10 through the connector carrier slide 22 and the connected second drive pin 128 that illustrates, by example and without limitation, operation of the control lever 58 on the fulcrum pin 50 for driving the connector carrier slide 22 into its fully expanded receiving position, as illustrated here and described herein.

Figure 19:
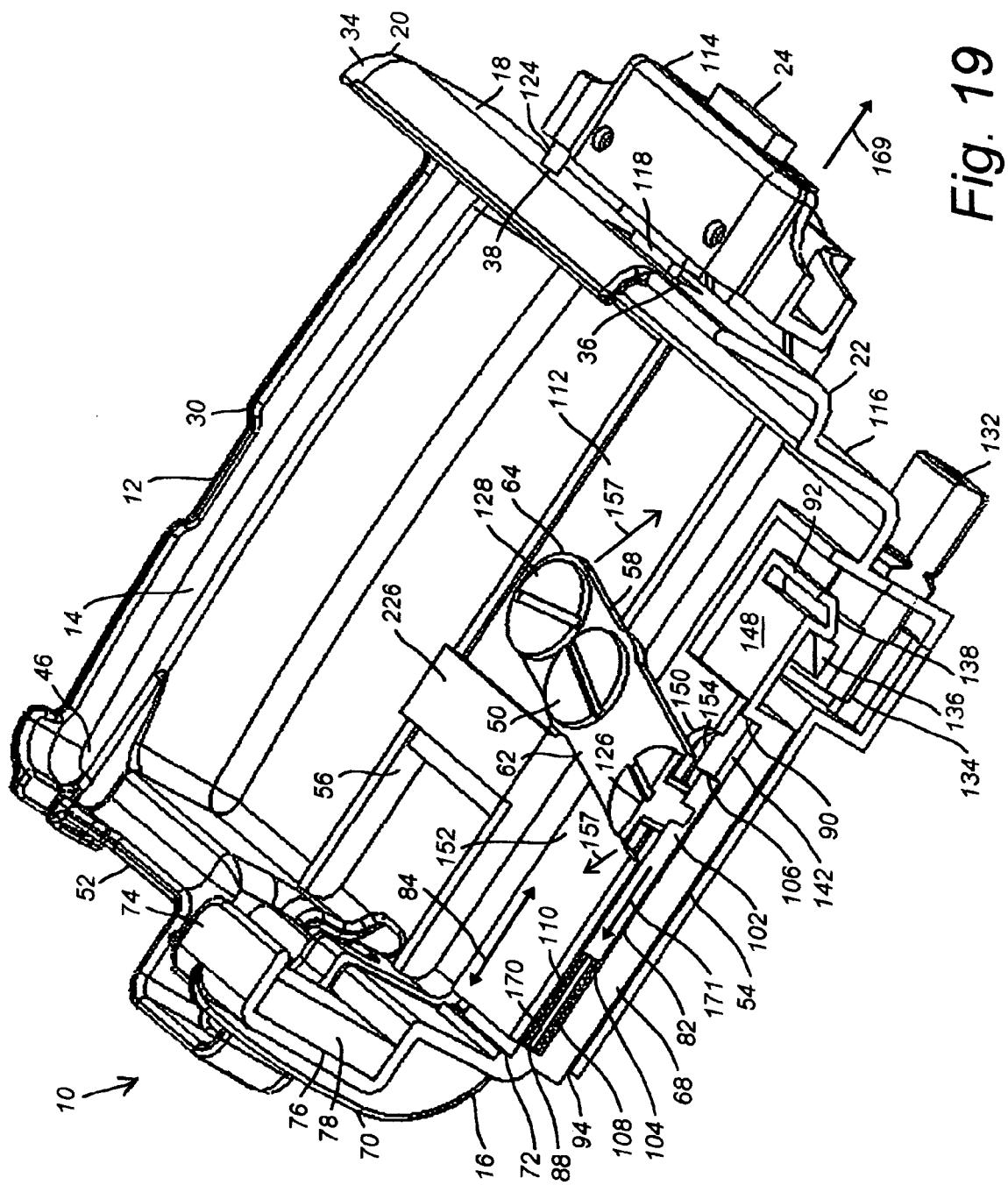
FIG. 19 illustrates operation of the novel linkage mechanism for rendering the novel quick release docking station in the intermediate electrically disconnected state having the compression clamp slide in its fully retracted engaged position relative to the support tray, while the connector carrier slide is fully disengaged relative to the web portion of the guard rail at the front portion of the tray and rendered in its fully expanded receiving position.

FIG. 19 illustrates operation of the novel linkage mechanism 26 for rendering the novel quick release docking station 10 in the intermediate electrically disconnected state having the compression clamp slide 16 in its fully retracted engaged position relative to the support tray 12, while the connector carrier slide 22 is fully disengaged relative to the web portion 18 of the guard rail 30 at the front portion 20 of the tray 12 and rendered in its fully expanded receiving position. Here, the view is a cross-section of the novel quick release docking station 10 through the minor interior expansion channel 82 of the clamp sled portion 68 of the compression clamp slide 16 portion that, by example and without limitation, illustrates the decoupled or "soft" aspect of the linkage mechanism 26 by illustrating operation of the slip connector block 102 in the minor interior expansion channel 82 of the clamp sled portion 68 during expansion of the connector carrier slide 22 to its fully disengaged and fully expanded receiving position, while the compression clamp slide 16 is retained by the lock mechanism 132 in its fully retracted engaged position relative to the support tray 12, as describe herein.

In this intermediate physically secured but electrically disconnected state of the novel quick release docking station 10, the compression clamp slide 16 is substantially retracted into its fully retracted engaged position relative to the support tray 12 having the clamp sled portion 68 substantially retracted into the first guide channel 54 in the floor portion 32 of the support tray 12. As discussed herein, the clamp expansion spring 98 is substantially compressed within the major interior expansion channel 80 of the clamp sled portion 68 between the stop portion 100 of the tray floor portion 32 and the internal end face portion 86 of the major interior expansion channel 80. See, e.g., FIGS. 6 and 7. The upright clamp jaw portion 70 of the compression clamp slide 16 is in its substantially nested position within the relief 96 formed in the rear portion 52 of the support tray 12.

Due to the decoupled or "soft" aspect of the linkage mechanism 26, the connector carrier slide 22, on the other hand, is resiliently expanded (indicated by arrow 169) independently of the engaged compression clamp slide 16 into its fully expanded receiving position with its carrier sled portion 112 partially extended out of the second guide channel 56 in the tray floor portion 32 and its upright jaw portion 114 spaced away from the web portion 18 of the guard rail 30. Accordingly, the electrical interconnect portion 118 of the electrical connector 24 is substantially fully retracted relative to, i.e., into or through, the connector clearance slot 36.

According to the decoupled or "soft" aspect of the linkage mechanism 26, expansion of the connector carrier slide 22 partially extends the carrier sled portion 112 out of the second guide channel 56, which pulls the coupled second drive pin 128 toward the front 20 of the support tray 12. Pulling the second drive pin 128 toward the front 20 of the support tray 12 in turn operates the second shorter lever arm 64 to rotate the control lever 58 on the fulcrum pin 50 toward its fully expanded receiving orientation relative to the support tray 12, as illustrated here. Rotation of the control lever 58 drives the first longer lever arm 62 relative to the first guide channel 54 along the longitudinal direction 84 of the clamp sled portion 68. The first longer lever arm 62 of the control lever 58 is coupled through the first drive pin 126 to the short slip connector block 102 within the minor interior expansion channel 82 of the clamp sled portion 68 of the compression clamp slide 16. The compression clamp slide 16 is restrained from moving in the first guide channel 54 by the lock mechanism 132. However, the slip connector block 102 is free to slide (indicated by arrow 171) within the minor interior expansion channel 82 of the restrained clamp sled portion 68 along the longitudinal direction 84, and the first drive pin 126 is free to follow through the track of the accommodating slot opening 150 of the minor expansion channel 82 and the slot opening 154 in the roof portion 152 of the first guide channel 54. Therefore, even when the compression clamp slide 16 is secured to the support tray 12, as illustrated here, the control lever 58 is free to rotate (indicated by arrows 157) on the fulcrum pin 50 toward its fully expanded receiving orientation relative to the support tray 12, and the connector carrier slide 22 is free to expand into its fully expanded receiving position because the slip connector block 102 operates to disconnect rotation of the control lever 58 and expansion of the connector carrier slide 22 from the compression clamp slide 16.

Expansion of the connector carrier slide 22 is limited such that the spaced apart guides 124 are partially retracted out of the corresponding guide ways 38 but are still partially engaged therewith as a means for accurately guiding the electrical connector 24 mounted on the upright jaw portion 114 and its electrical interconnect portion 118 relative to the support tray 12, and ultimately, the computer I/O port. For example, one of the direct expansion arresting mechanisms discussed herein is provided for directly limiting expansion of the connector carrier slide 22. Alternatively, an appropriate one of the indirect expansion arresting mechanisms discussed herein that does not operate on the compression clamp slide 16 is provided for indirectly limiting expansion of the connector carrier slide 22.

The slip connector block 102 is slid within the minor expansion channel 82 of the clamp sled portion 68 with connector return spring 110 substantially fully compressed within the return spring gap 108 between the first reaction portion 104 of the slip connector block 102 and the first internal stop portion 88 of the minor expansion channel 82. The second reaction portion 106 of the slip connector block 102 is spaced away from the second internal stop portion 90 of the minor expansion channel 82 and expanding the clearance gap 142 there between.

Another indirect expansion arresting mechanism is optionally provided by a travel limiter 170 positioned between the slip connector block 102 and the compression clamp slide 16. By example and without limitation, the travel limiter 170 is provided in the return spring gap 108 of the minor interior expansion channel 82 of the clamp sled portion 68 between its first internal stop portion 88 and the first reaction portion 104 of the slip connector block 102. For example, the travel limiter 170 is formed as a substantially rigid pin or rod sized to fit inside the connector return spring 110 without interfering with its operation. The optional pin or rod type travel limiter 170 is sized to limit motion of the slip connector block 102 toward the first internal stop portion 88 adjacent to the clamp jaw portion 70 of the compression clamp slide 16. Because the travel limiter 170 in the minor interior expansion channel 82 depends on position of the clamp sled portion 68, it is operable only when the compression clamp slide 16 is situated in its fully retracted engaged position relative to the support tray 12, as illustrated here.

Figure 20:
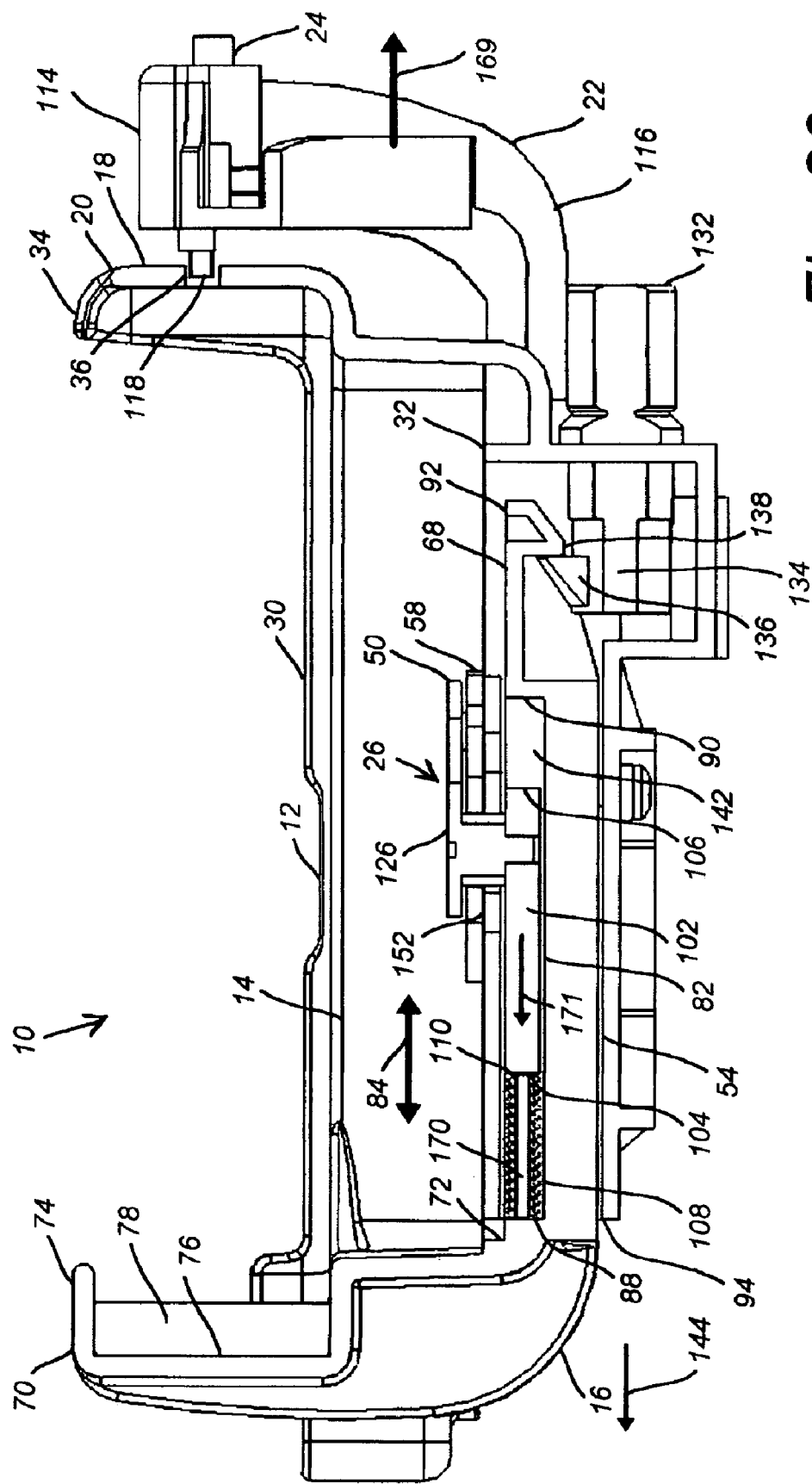
FIG. 20 is a cross-section view through the minor interior expansion channel of the clamp sled portion of the compression clamp slide portion that illustrates operation of the novel linkage mechanism for rendering the novel quick release docking station in the intermediate physically secured but electrically disconnected state.

FIG. 20 is a cross-section view through the minor interior expansion channel 82 of the clamp sled portion 68 of the compression clamp slide 16 portion that illustrates operation of the novel linkage mechanism 26 for rendering the novel quick release docking station 10 in the intermediate physically secured but electrically disconnected state, as discussed herein. Here, by example and without limitation, the slip connector block 102 of the linkage mechanism 26 is positioned in the minor interior expansion channel 82 of the clamp sled portion 68 when the compression clamp slide 16 is substantially retracted into its fully retracted engaged position relative to the support tray 12. The clamp sled portion 68 is substantially retracted into the first guide channel 54 in the floor portion 32 of the support tray 12. As discussed herein, the clamp expansion spring 98 is substantially compressed within the major interior expansion channel 80 of the clamp sled portion 68 between the stop portion 100 of the tray floor portion 32 and the internal end face portion 86 of the major interior expansion channel 80. See, e.g., FIGS. 6 and 7. The upright clamp jaw portion 70 of the compression clamp slide 16 is in its substantially nested position within the relief 96 formed in the rear portion 52 of the support tray 12.

According to the decoupled or "soft" aspect of the linkage mechanism 26, the connector carrier slide 22 is simultaneously expanded independently of the engaged compression clamp slide 16 into its fully expanded receiving position with its carrier sled portion 112 partially extended out of the second guide channel 56 in the tray floor portion 32 and its upright jaw portion 114 spaced away from the web portion 18 of the guard rail 30. Accordingly, the electrical interconnect portion 118 of the electrical connector 24 is substantially fully retracted relative to, i.e., into or through, the connector clearance slot 36.

The linkage mechanism 26 causes the slip connector block 102 to slide within the minor expansion channel 82 of the clamp sled portion 68 into a stop position with the optional pin or rod type travel limiter 170 positioned between its first reaction portion 104 and the first internal stop portion 88 the minor interior expansion channel 82 of the clamp sled portion 68. The connector carrier slide 22 is thus effectively restrained from expanding beyond its fully expanded receiving position with respect to the web portion 18 of the guard rail 30 at the front portion 20 of the support tray 12 so that the pair of guides 124 continuously remain at least partially engaged with the corresponding guide ways 38.

The connector return spring 110 is substantially fully compressed within the return spring gap 108 between the first reaction portion 104 of the slip connector block 102 and the first internal stop portion 88 of the minor expansion channel 82. The second reaction portion 106 of the slip connector block 102 is spaced away from the second internal stop portion 90 of the minor expansion channel 82 and the clearance gap 142 there between is substantially expanded.

Figure 21:
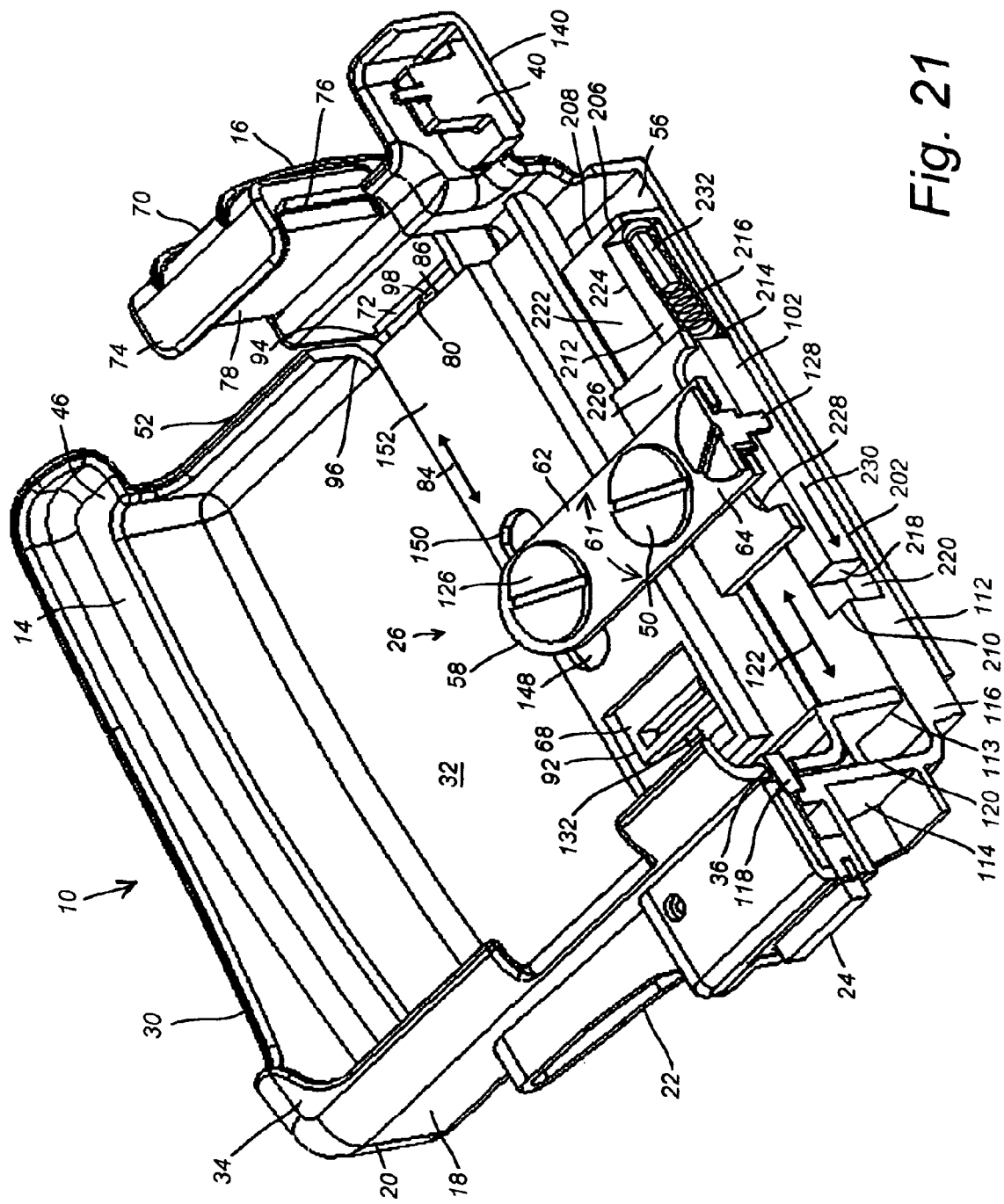
FIG. 21 is a perspective view of the novel quick release docking station showing a cross-section through the connector carrier slide and the connected second drive pin that illustrates, by example and without limitation, operation of an alternative mechanism for retracting the connector carrier slide into its fully retracted engaged position.

FIG. 21 is a perspective view of the novel quick release docking station 10 showing a cross-section through the connector carrier slide 22 and the connected second drive pin 128 that illustrates, by example and without limitation, operation of an alternative mechanism for retracting the connector carrier slide 22 into its fully retracted engaged position. Here, the novel mechanical linkage mechanism 26 again includes the control lever 58, the short slip connector block 102 and the first and second drive pins 126 and 128. However, here the first drive pin 126 rotatably couples the longer lever arm 62 to the clamp sled portion 68 of the compression clamp slide 16.

The second drive pin 128 rotatably couples the shorter lever arm 64 to the slip connector block 102. The novel mechanical linkage mechanism 26 is illustrated as having the short slip connector block 102 slidable instead within an elongated interior expansion channel 202 formed within the connector carrier sled portion 112 of the connector carrier slide 22. The interior expansion channel 202 is formed substantially along the longitudinal direction 122 of the connector carrier sled portion 112 of the connector carrier slide 22 with a first internal stop portion 206 adjacent to a tail end 208 of the connector carrier sled portion 112, and a second spaced apart internal stop portion 210 adjacent to the upright the jaw portion 114 of the connector carrier slide 22.

The interior expansion channel 202 is longer than the short slip connector block 102 such that the slip connector block 102 is slidable between the spaced apart first and second internal stop portions 206 and 210. The short slip connector block 102 forms a nominal return spring gap 212 between its first reaction portion 214 and the first internal stop portion 206 of the elongated interior expansion channel 202 adjacent to the tail end 208 of the connector carrier sled portion 112. A partially compressed connector return spring 216 resides within the return spring gap 212 of the interior expansion channel 202 between the first reaction portion 214 of the slip connector block 102 and the first internal stop portion 206 adjacent to the sled portion's tail end 208.

A second reaction portion 218 of the slip connector block 102 is spaced away from the second internal stop portion 210 of the elongated interior expansion channel 202 and forms a small nominal clearance gap 220 there between. At least a portion of an upper surface 222 of the clamp sled portion 68 provides an opening 224 into the expansion channel 202 along the longitudinal direction 122 for accommodating the second drive pin 128 during motion of the slip connector block 102. Here, by example and without limitation, the opening 224 is formed along substantially the entire length of the expansion channel 202. However, the opening 224 need only be long enough to accommodate motion of the second drive pin 128 that operates there through. A roof portion 226 of the second guide channel 56 is formed with an opening 228 positioned over the opening 224 and aligned along the longitudinal direction 122 of the expansion channel 202 also for accommodating the motion of the second drive pin 128. Here, the opening 228 is illustrated, by example and without limitation, as being a slot in the roof portion 226 sized to accommodate motion of the second drive pin 128 as it is driven by the sliding motion of the slip connector block 102.

In the fully retracted engaged state of the novel quick release docking station 10, as illustrated here, the compression clamp slide 16 is substantially fully retracted into in its fully retracted position, wherein its sled portion 68 is substantially fully retracted into the first guide channel 54 with the clamp jaw portion 70 substantially nested in the relief 96 having the mouth opening 94 into the first guide channel 54 formed therein. The catch 138 adjacent to the tail end 92 of the clamp sled portion 68 is engaged by the spring tooth 136 of the latching mechanism 134 such that the compression clamp slide 16 is substantially restrained in its fully retracted position.

As discussed herein, rotation of the interconnecting control lever 58 about the fulcrum pin 50 transfers expansion and retraction motions of the compression clamp slide 16 to the connector carrier slide 22 through the drive pins 126 and 128. Accordingly, when the compression clamp slide 16 is substantially fully retracted into in its fully retracted position, as illustrated here, rotation of the interconnecting control lever 58 about the fulcrum pin 50 is effectively restrained through the first drive pin 126. In turn, the second drive pin 128 effectively restrains sliding motion of the slip connector block 102 within the interior expansion channel 202. The slip connector block 102 is thus effectively restrained relative to the floor portion 32 of the support tray 12. Thus restrained, the slip connector block 102 effectively forms a temporarily fixed stop portion of the tray floor portion 32.

The partially compressed connector return spring 216 expands within the return spring gap 212 of the interior expansion channel 202 and presses the first reaction portion 214 of the slip connector block 102 away from the first internal stop portion 206 adjacent to the sled portion's tail end 208. The slip connector block 102 is effectively fixed relative to the tray floor portion 32. Therefore, expansion spring pressure of the connector return spring 216 presses against the first internal stop portion 206 to urge (indicated by arrow 230) the sled portion's tail end 208 toward the rear portion 52 of the support tray 12. The slip connector block 102 is structured to slide smoothly through the interior expansion channel 202 along the longitudinal direction 122 as the expansion spring pressure of the connector return spring 216 against the first internal stop portion 206 of the connector carrier's interior expansion channel 202 drives the connector carrier sled portion 112 substantially into its fully retracted engaged position within the second guide channel 56 in the tray floor portion 32, as illustrated here. Retraction of the connector carrier sled portion 112 pulls the connector carrier slide 22 toward the front portion 20 of the support tray 12 and into its fully retracted engaged position. The connector carrier slide 22 stops with the inner surface 120 of the jaw portion 114 substantially against the web portion 18 of the guard rail 30 at the front portion 20 of the tray 12.

The slip connector block 102 and the connector carrier's interior expansion channel 202 are relatively sized such that, when the connector carrier sled portion 112 substantially into its fully retracted engaged position within the second guide channel 56, the second reaction portion 218 of the slip connector block 102 is slightly spaced away from the second internal stop portion 210 of the elongated interior expansion channel 202 and forms the small nominal clearance gap 220 there between.

As discussed herein, significant shock or vibration inputs may cause the computer to momentarily shift along the longitudinal direction 122. The compression clamp slide 16 is permitted to move slightly relative to the support tray 12 without affecting the connector carrier slide 22 or the seating of the electrical connector 24 with the computer. For example, While such minor events are substantially absorbed over time by the cushion 78 on the inner surface 76 of the clamp jaw portion 70, instantaneous movements of the compression clamp slide 16 may occur. The return spring gap 212 and clearance gap 220 together operate to disconnect such instantaneous movements of the compression clamp slide 16 from the connector carrier slide 22 and the support tray 12 in general so that support of the computer and coupling of the electrical connector 24 with the mating I/O communication port are not compromised.

The clamp sled portion 68 is permitted to move slightly into and out of the first guide channel 54 and thereby impart a corresponding slight rotation to the control lever 58. The corresponding slight rotation to the control lever 58 operates through the second drive pin 128 to move the slip connector block 102 within the interior expansion channel 202 of the connector carrier sled portion 112 of the connector carrier slide 22. However, both the nominal return spring gap 212 and the nominal clearance gap 220 between opposite end faces 214 and 218 of the slip connector block 102 and the corresponding first and second internal stop portions 206 and 210 of the interior expansion channel 202 permit the slip connector block 102 to move through the interior expansion channel 202 along the longitudinal direction 122, without imparting a corresponding motion to the connector carrier sled portion 112. Rather, the partially compressed connector return spring 216 is slightly expanded or further compressed within the nominal return spring gap 212 against the first reaction portion 214 of the slip connector block 102, while the nominal clearance gap 220 is merely slightly expanded or contracted, all without affecting the connector carrier slide 22 or the seating of the electrical connector 24 with the computer.

Figure 22:
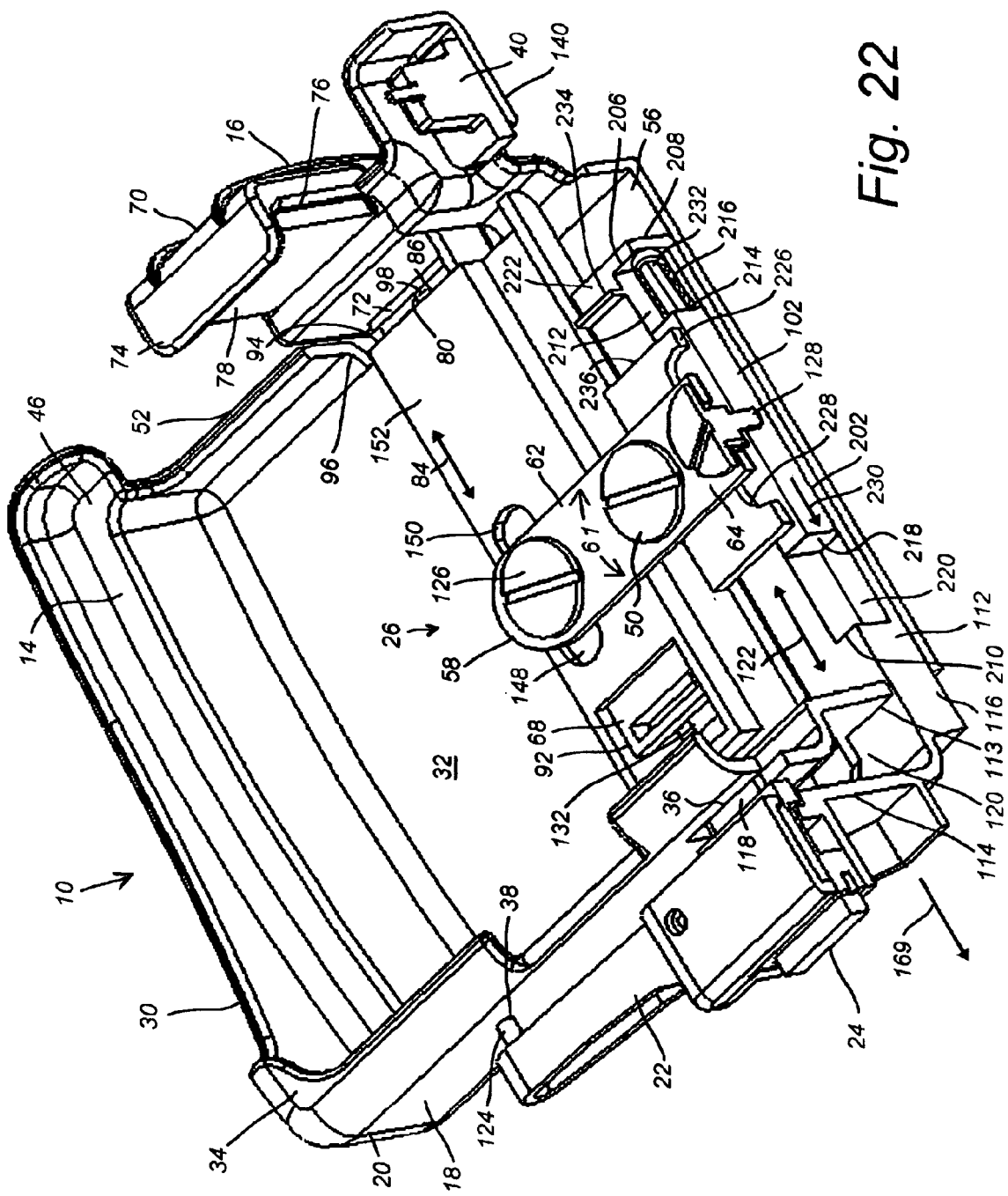
FIG. 22 illustrates the novel quick release docking station configured in the intermediate electrically disconnected state having the compression clamp slide in its fully retracted engaged position relative to the support tray, while the connector carrier slide is fully expanded in its fully disengaged receiving position relative to the web portion 18 of the guard rail at the front portion of the tray.

FIG. 22 illustrates the novel quick release docking station 10 configured in the intermediate electrically disconnected state having the compression clamp slide 16 in its fully retracted engaged position relative to the support tray 12, while the connector carrier slide 22 is fully expanded in its fully disengaged receiving position relative to the web portion 18 of the guard rail 30 at the front portion 20 of the tray 12. Here, the view is a cross-section of the novel quick release docking station 10 through the interior expansion channel 202 of the connector carrier sled portion 112 of the connector carrier slide 22 portion that, by example and without limitation, illustrates operation of the slip connector block 102 within the interior expansion channel 202 of the connector carrier sled portion 112 during expansion of the connector carrier slide 22 to its fully disengaged and fully expanded receiving position, while the compression clamp slide 16 is retained by the lock mechanism 132 in its fully retracted engaged position relative to the support tray 12, as describe herein.

In this intermediate physically secured but electrically disconnected state of the novel quick release docking station 10, the compression clamp slide 16 is substantially retracted into its fully retracted engaged position relative to the support tray 12 having the clamp sled portion 68 substantially retracted into the first guide channel 54 in the floor portion 32 of the support tray 12. As discussed herein, the clamp expansion spring 98 is substantially compressed within the major interior expansion channel 80 of the clamp sled portion 68 between the stop portion 100 of the tray floor portion 32 and the internal end face portion 86 of the major interior expansion channel 80. See, e.g., FIGS. 5 and 6. The upright clamp jaw portion 70 of the compression clamp slide 16 is in its substantially nested position within the relief 96 formed in the rear portion 52 of the support tray 12.

The decoupled or "soft" aspect of the linkage mechanism 26 permits the connector carrier slide 22, on the other hand, to be expanded independently of the engaged compression clamp slide 16 into its fully expanded receiving position. The connector carrier slide 22 is thus configured here with its carrier sled portion 112 partially extended out of the second guide channel 56 in the tray floor portion 32 and its upright jaw portion 114 spaced away from the web portion 18 of the guard rail 30. Accordingly, the electrical interconnect portion 118 of the electrical connector 24 is substantially fully retracted relative to, i.e., into or through, the connector clearance slot 36.

Expansion of the connector carrier slide 22 partially extends the carrier sled portion 112 out of the second guide channel 56. The tail end 208 of the connector carrier sled portion 112 is pulled toward the front portion 20 of the tray 12. The novel mechanical linkage mechanism 26 is illustrated as restraining the slip connector block 102 within the elongated interior expansion channel 202 by operation of the restrained compression clamp slide 16. Accordingly, rotation of the interconnecting control lever 58 about the fulcrum pin 50 is effectively restrained through the first drive pin 126. The control lever 58 operates through the interconnecting first and second drive pins 126 and 128 to restrain the slip connector block 102. Accordingly, the slip connector block 102 cannot move relative to the floor portion 32 of the support tray 12.

Therefore, manually expanding the connector carrier sled portion 112 outward of the second guide channel 56 draws the tail portion 208 thereof toward the slip connector block 102. The connector carrier sled portion 112 slides relative to the support tray's floor portion 32 within the second guide channel 56 along the longitudinal direction 122, and the interior expansion channel 202 perforce slides over the restrained slip connector block 102. Expanding the connector carrier sled portion 112 causes the first internal stop portion 206 of the connector carrier's interior expansion channel 202 to approach the first reaction portion 214 of the slip connector block 102.

In approaching the first reaction portion 214 of the slip connector block 102, the first internal stop portion 206 of the interior expansion channel 202 reduces the nominal return spring gap 212 there between. The second internal stop portion 210 of the elongated interior expansion channel 202 simultaneously withdraws away from the second reaction portion 218 of the slip connector block 102, thereby expanding the nominal clearance gap 220. Reduction of the nominal return spring gap 212 further compresses the partially compressed connector return spring 216 between the first internal stop portion 206 of the interior expansion channel 202 and the first reaction portion 214 of the slip connector block 102. Further compression of the already partially compressed connector return spring 216 further urges the connector carrier slide 22 to spring back toward the front 20 of the support tray 12 and return to its fully retracted engaged position, as described herein.

A direct expansion arresting mechanism is optionally provided by a travel limiter 232 structured for limiting expansion of the connector carrier slide 22 so that, during expansion of the connector carrier slide 22, the guides 124 are partially retracted out of the corresponding guide ways 38 but are still partially engaged therewith as a means for accurately guiding the electrical connector 24 mounted on the upright jaw portion 114 and its electrical interconnect portion 118 relative to the support tray 12, and ultimately, the computer I/O port. As illustrated by example and without limitation in FIG. 21, the travel limiter 232 is positioned between the slip connector block 102 and the sled portion 112 of the connector carrier slide 22 for limiting extension of the sled portion 112 out of the second guide channel 56. By example and without limitation, the travel limiter 232 is provided in the return spring gap 212 of the interior expansion channel 202 of the connector carrier sled portion 112 between its first internal stop portion 206 and the first reaction portion 214 of the slip connector block 102. For example, the travel limiter 232 is formed as a substantially rigid pin or rod sized to fit inside the connector return spring 216 without interfering with its operation. The optional pin or rod type travel limiter 232 is sized to limit motion of the slip connector block 102 toward the first internal stop portion 206 adjacent to the tail end 208 of the sled portion 112. Alternatively, in another example, an optional control lip (shown here) or pin (see FIG. 23) 234 on the connector carrier sled portion 112 encounters an optional retainer portion 236 of the second guide channel 56, whereby expansion of the connector carrier slide 22 is directly arrested.

Figure 23:
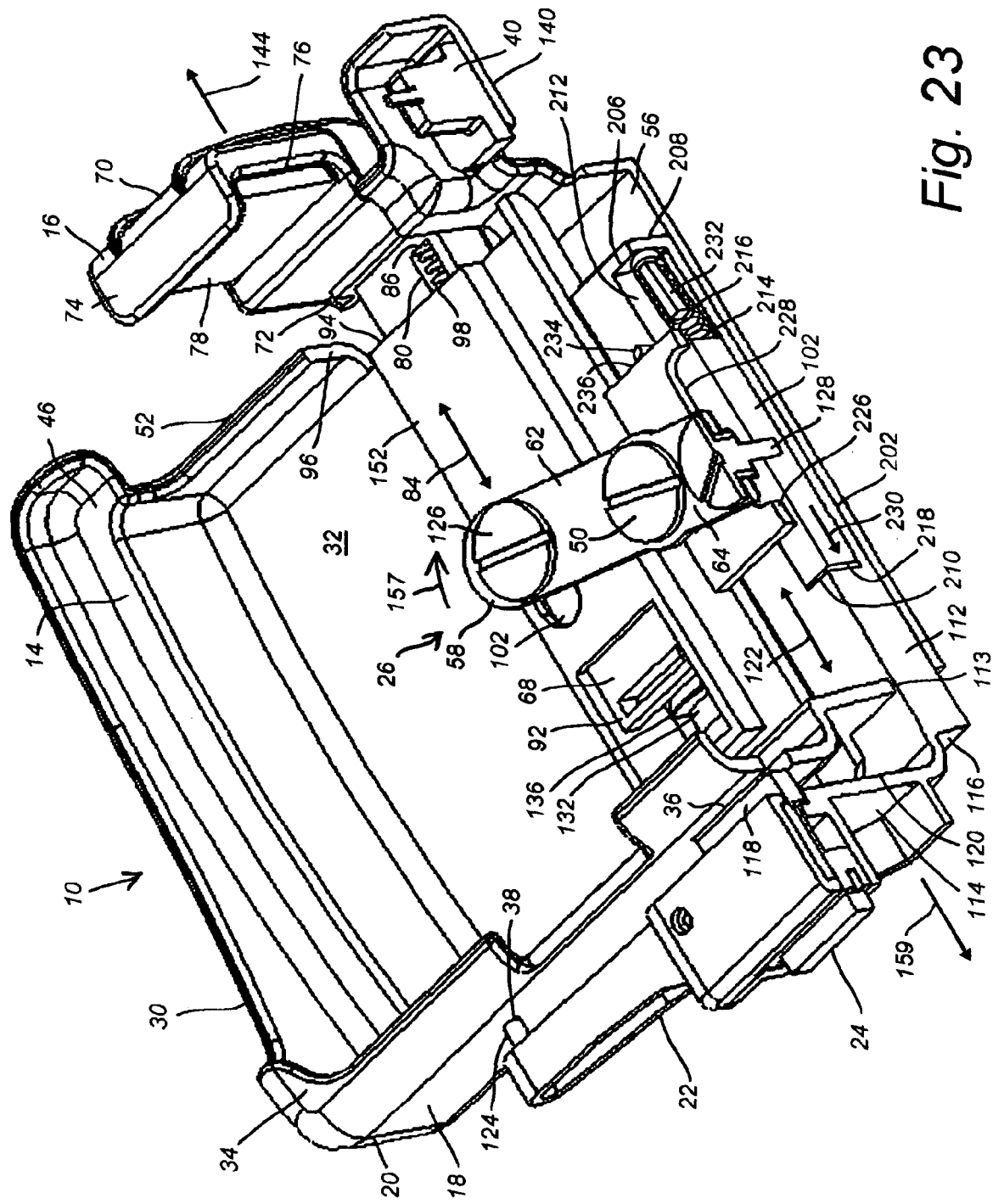
FIG. 23 illustrates the novel quick release docking station configured in its fully expanded receiving state, as describe herein, having both the compression clamp slide and the connector carrier slide each in its respective fully expanded receiving position relative to the support tray.

FIG. 23 illustrates the novel quick release docking station 10 configured in its fully expanded receiving state, as describe herein, having both the compression clamp slide 16 and the connector carrier slide 22 each in its respective fully expanded receiving position relative to the support tray 12. Here, the view is a cross-section of the novel quick release docking station 10 through the interior expansion channel 202 of the connector carrier sled portion 112 of the connector carrier slide 22 portion that, by example and without limitation, illustrates the coupled or "hard" aspect of the linkage mechanism 26. Here, expansion of the compression clamp slide 16, as describe herein, operates the slip connector block 102 of the linkage mechanism 26 within the interior expansion channel 202 of the connector carrier sled portion 112 for enforced expansion of the connector carrier slide 22 to its fully disengaged and fully expanded receiving position.

As illustrated in previous Figures, see, e.g., FIGS. 13 and 14, the clamp expansion spring 98 is substantially fully expanded for urging the clamp sled portion 68 of the compression clamp slide 16 out of the first guide channel 54, which moves the upright clamp jaw portion 70 out of the nest relief 96 and spaces its overhanging retention lip 74 away from the rear portion 46 of the support tray's peripheral support lip 14 for receiving the computer. As the lock mechanism 132 is operated for disengaging the spring tooth 136 of the latching mechanism 134 from the catch 138 of the clamp sled portion 68 of the compression clamp slide 16, the clamp expansion spring 98 begins to expand between the stop portion 100 of the support tray floor portion 32 and the internal end face portion 86 of the major interior expansion channel 80 for urging the clamp sled portion 68 to exit the first guide channel 54 of the support tray 12 through the mouth opening 94.

The sliding motion of the clamp sled portion 68 of the compression clamp slide 16 in the first guide channel 54 along the longitudinal direction 122 operates through the first drive pin 126 for urging the control lever 58 to rotate (indicated by arrow 157) about the fulcrum pin 50 into its fully retracted engaged orientation relative to the support tray 12. In turn, the control lever 58 operates through the second drive pin 128 to urge the slip connector block 102 to move in the opposite direction toward the front portion 20 of the tray 12. Initially, the second reaction portion 218 of the slip connector block 102 is slightly spaced away from the second internal stop portion 210 of the elongated interior expansion channel 202 and forms the small nominal clearance gap 220 there between. Upon expansion of the clamp sled portion 68 of the compression clamp slide 16 and subsequent rotational actuation of the control lever 58, the second drive pin 128 is actuated to operate the slip connector block 102 to slide along the elongated interior expansion channel 202 of the connector carrier sled portion 112 toward contact with the second internal stop portion 210 thereof.

Continued expansion of the expansion spring 98 operates through the clamp sled portion 68 of the compression clamp slide 16 and the novel mechanical linkage mechanism 26 to drive the slip connector block 102 toward the front portion 20 of the tray 12, which drives the second reaction portion 218 of the slip connector block 102 into the small nominal clearance gap 220 between the second reaction portion 218 and the second internal stop portion 210 of the elongated interior expansion channel 202 adjacent to the upright jaw portion 114 of the connector carrier slide 22. The clearance gap 220 is sufficiently small relative to the throw of the compression clamp slide 16 that only partial expansion of the expansion spring 98 effectively completely closes the clearance gap 220. Upon complete closure of the clearance gap 220, the second reaction portion 218 of the slip connector block 102 presses with the force of the continuously expanding expansion spring 98 against the second internal stop portion 210 of the interior expansion channel 202. The expanding expansion spring 98 thus operates on the connector carrier slide 22 through the clamp sled portion 68, the novel mechanical linkage mechanism 26 and the slip connector block 102 for driving the connector carrier slide 22 into its fully expanded receiving position relative to the front portion 20 of the support tray 12.

The partially compressed connector return spring 216 begins to expand in the return spring gap 212 between the first reaction portion 214 of the slip connector block 102 and the first internal stop portion 206 of the minor expansion channel 202 adjacent to the clamp jaw portion 70. Expansion of the connector return spring 216 exerts spring pressure against the first reaction portion 214 of the slip connector block 102 which causes it to slide through the minor expansion channel 202 along the longitudinal direction 122. As discussed above, the sliding motion of the slip connector block 102 is transmitted through the first drive pin 126, so that it also moves along the longitudinal direction 122 through The slot opening 224 of the minor expansion channel 202 and the slot opening 228 in the roof portion 226 of the first guide channel 54 are both structured to accommodate this expansion motion of the second drive pin 128 along the longitudinal direction 122. Here, the travel limiter 232 operates for arresting expansion of the connector carrier slide 22 so that, during expansion of the connector carrier slide 22, the guides 124 are partially retracted out of the corresponding guide ways 38 but are still partially engaged therewith as a means for accurately guiding the electrical connector 24 mounted on the upright jaw portion 114 and its electrical interconnect portion 118 relative to the support tray 12, and ultimately, the computer I/O port. The travel limiter 232 can be used to indirectly control expansion of the compression clamp slide 16 through the novel mechanical linkage mechanism 26. Else, another travel limiter of one of the configurations disclosed herein, or another appropriate configuration, can be used to directly control expansion of the compression clamp slide 16.

When the compression clamp slide 16 and connector carrier slide 22 are expanded to their respective fully expanded receiving positions, the novel quick release docking station 10 is rendered in its fully expanded receiving state, as describe herein, for receiving the computer.

Figure 24:
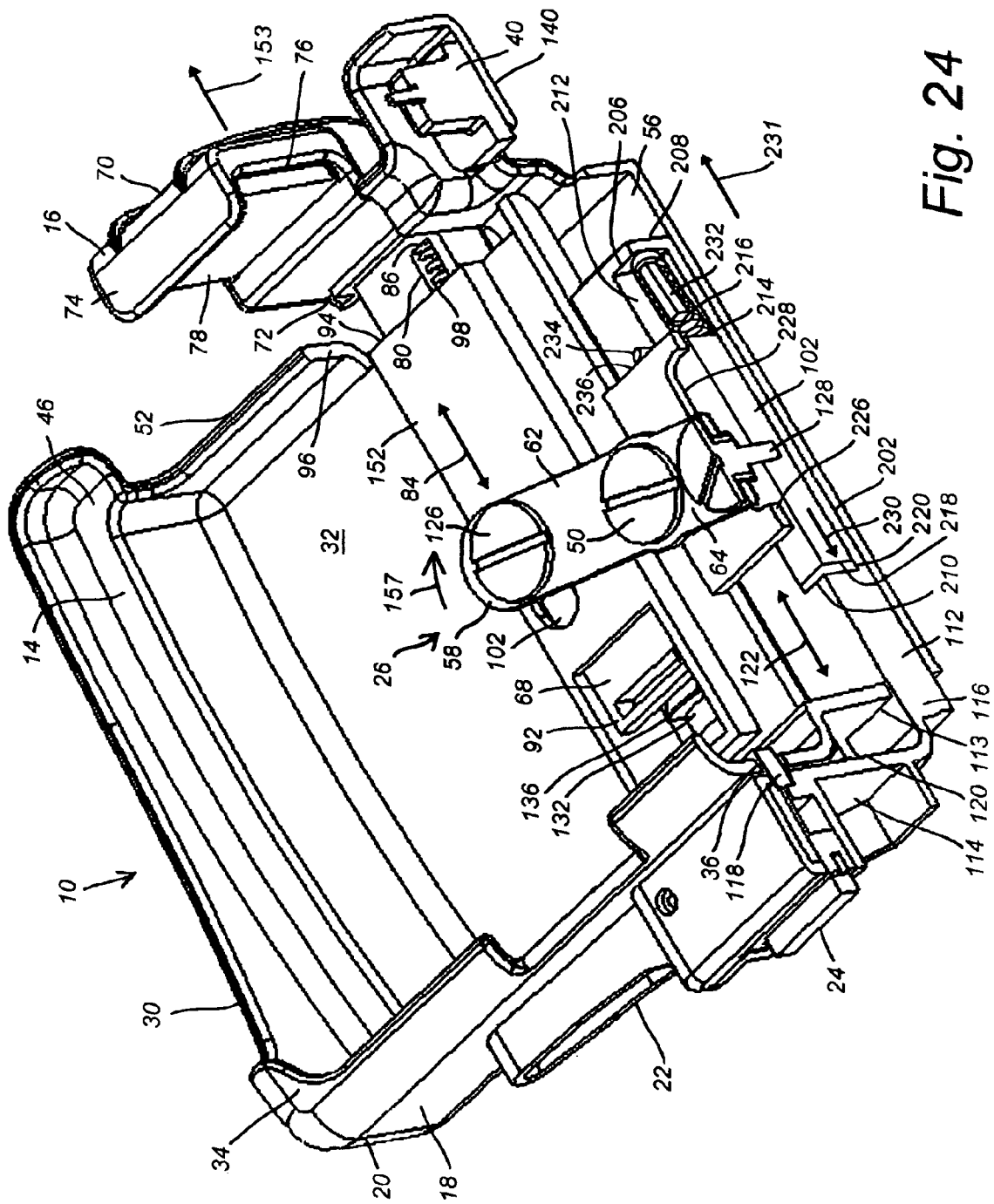
FIG. 24 illustrates by example and without limitation another decoupled or "soft" aspect of the novel linkage mechanism according to the alternative mechanism for retracting the connector carrier slide into its fully retracted engaged position.

FIG. 24 illustrates by example and without limitation another decoupled or "soft" aspect of the novel linkage mechanism 26 according to the alternative mechanism for retracting the connector carrier slide 22 into its fully retracted engaged position. As discussed herein, the nominal return spring gap 212 between the first reaction portion 214 of the slip connector block 102 and the corresponding first internal stop portion 206 of the interior expansion channel 202 and the nominal clearance gap 220 between the second reaction portion 218 of the slip connector block 102 and the corresponding second internal stop portion 210 of the interior expansion channel 202 both permit the clamp sled portion 68 to move slightly into and out of the first guide channel 54 without imparting a corresponding motion of the carrier sled portion 112. The control lever 58 is permitted to rotate slightly in response to slight movements of the clamp sled portion 68. Thus, the decoupled or "soft" aspect of the linkage mechanism 26 permits the compression clamp slide 16 to move slightly relative to the support tray 12, for example in response to significant shock or vibration inputs to the computer, without affecting the connector carrier slide 22 or the seating of the electrical connector 24 with the computer. Here, the clamp sled portion 68 of the compression clamp slide 16 is illustrated as being shifted (indicated by arrow 153) along the longitudinal direction 84 toward the rear portion 52 of the support tray 12. The clearance gap 220 permits the second internal stop portion 210 of the interior expansion channel 202 to approach the corresponding second reaction portion 218 of the slip connector block 102, even to the point of touching, without making immediate operational contact. Simultaneously, the partially compressed connector return spring 216 automatically partially expands within the return spring gap 212, which maintains constant spring pressure on the first reaction portion 214 of the slip connector block 102. The spring pressure on the first reaction portion 214 of the slip connector block 102 urges (indicated by arrow 231) the tail end 208 of the connector carrier sled portion 112 away from expanding toward the front portion 20 of the support tray 12 so that the connector carrier sled portion 112 remains in its fully retracted engaged position. Thus, according to the decoupled or "soft" aspect of the linkage mechanism 26, the return spring gap 212 and clearance gap 220 together operate to disconnect or de-couple such instantaneous movements of the compression clamp slide 16 from the connector carrier slide 22 and the support tray 12 in general so that support of the computer and coupling of the electrical connector 24 with the mating I/O communication interface port are not compromised. This disconnecting or de-coupling aspect of the linkage mechanism 26 also permits other voluntary or involuntary small movements of the compression clamp slide 16 to occur without compromising mating of the electrical connector 24 with the computer's I/O interface port.

While the preferred and additional alternative embodiments of the invention have been illustrated and described, it will be appreciated that various changes can be made therein without departing from the spirit and scope of the invention. Therefore, it will be appreciated that various changes can be made therein without departing from the spirit and scope of the invention. Accordingly, the inventor makes the following claims.

What is claimed is:

1. A quick release docking station apparatus for portable electronics devices having one or more charging or input/output (I/O) interface ports, the docking station apparatus comprising:

a) a substantially rigid support tray having a support surface between opposing first and second faces and at least partially surrounded by a fence portion;

b) a clamp having a jaw portion extended from a clamp sled portion, the clamp sled portion being slidable relative to the support surface of the support tray between a substantially retracted position having the jaw portion of the clamp substantially adjacent to the first face and a substantially expanded position having the jaw portion of the clamp substantially spaced away there from;

c) an electrical interface support having a jaw portion extended from an electrical interface support sled portion, the electrical interface support sled portion being slidable relative to the support surface of the support tray between a substantially retracted position having the jaw portion of the electrical interface support substantially adjacent to the second face and a substantially expanded position having the jaw portion of the electrical interface support substantially spaced away there from; and d) a linkage mechanism mechanically linking the clamp with the electrical interface support, the linkage mechanism comprising:

i) a slip connector slidably coupled to the sled portion of a first one of the clamp and the electrical interface support for sliding lengthwise thereof between the jaw portion of the first one of the clamp and the electrical interface support and a tail portion thereof opposite from the jaw portion thereof, ii) a resilient biasing mechanism operable between the slip connector and a first portion of the sled, iii) a stop mechanism operable between the slip connector and a second portion of the sled, and iv) a lever mechanism pivotably coupled between the slip connector and a second one of the clamp and the electrical interface support; and e) wherein the clamp and the electrical interface support are operable in three different relationships with the support tray:

i) a substantially expanded relationship wherein:
1) the clamp is arranged in the substantially expanded position thereof,
2) responsive to the substantially expanded position of the clamp, the linkage mechanism is responsively configured in a first positive driving relationship with the electrical interface support having the resilient biasing mechanism in a substantially expanded configuration between the slip connector and the first portion of the sled, and the stop mechanism substantially engaged between the slip connector the second portion of the sled,
3) the lever mechanism is rotated in a substantially expanded orientation relative to the clamp and the electrical interface support, and
4) the electrical interface support is arranged in the substantially expanded position thereof;

ii) a substantially engaged relationship wherein:
1) the clamp is arranged in the substantially retracted position thereof,
2) responsive to the substantially retracted position of the clamp, the linkage mechanism is configured in a first resiliently urging relationship with the electrical interface support having the resilient biasing mechanism in a partially compressed configuration between the substantially expanded configuration and a substantially compressed configuration thereof,
3) the lever mechanism is rotated in a substantially retracted orientation relative to the clamp and the electrical interface support, and
4) the electrical interface support is arranged in the substantially retracted position thereof; and iii) a semi-engaged relationship wherein:
1) the clamp is arranged in the substantially retracted position thereof,
2) responsive to the substantially retracted position of the clamp, the linkage mechanism is configured in a second resiliently urging relationship with the electrical interface support having the resilient biasing mechanism in the substantially compressed configuration thereof between the slip connector and the first portion of the sled and the stop mechanism substantially disengaged between the slip connector the second portion of the sled, and
3) the electrical interface support is resiliently arranged in the substantially expanded position thereof.

2. The apparatus of claim 1 wherein the slip connector is further slidably coupled to the sled portion of the clamp; the lever mechanism pivotably coupled between the slip connector and the electrical interface support; and in the semi-engaged relationship of the clamp and the electrical interface support, the lever mechanism is rotated in the substantially expanded orientation relative to the clamp and the electrical interface support.

3. The apparatus of claim 1 wherein the slip connector is further slidably coupled to the sled portion of the electrical interface support;
the lever mechanism pivotably coupled between the slip connector and the clamp; and
in the semi-engaged relationship of the clamp and the electrical interface support, the lever mechanism is rotated in the substantially retracted orientation relative to the clamp and the electrical interface support.

4. The apparatus of claim 1 wherein, in the substantially engaged relationship of the clamp and the electrical interface support, the stop mechanism is further substantially disengaged between the slip connector the second portion of the sled.

5. The apparatus of claim 1, further comprising a resilient expansion mechanism coupled between the clamp and the support tray, wherein:
in the substantially expanded relationship of the clamp and the electrical interface support, the expansion mechanism is substantially expanded between the clamp and the support tray;
in the substantially engaged relationship of the clamp and the electrical interface support, the expansion mechanism is substantially compressed between the clamp and the support tray; and
in the semi-engaged relationship of the clamp and the electrical interface support, the expansion mechanism is substantially compressed between the clamp and the support tray.

6. The apparatus of claim 5, further comprising a restraining mechanism coupled between the clamp and the support tray, wherein:
in the substantially expanded condition of the expansion mechanism, the restraining mechanism is released and the expansion mechanism is substantially relieved between the clamp and the support tray; and
in the substantially engaged condition of the expansion mechanism, the restraining mechanism is engaged between the clamp and the support tray and the expansion mechanism is substantially restrained between the clamp and the support tray.

7. The apparatus of claim 1 wherein the clamp and the electrical interface support are operable in a fourth different semi-unclamped relationship with the support tray wherein:
1) the clamp is arranged in a semi-expanded position between the substantially retracted and substantially expanded positions thereof, and
2) responsive to the semi-expanded position of the clamp, the resilient biasing mechanism of the linkage mechanism is responsively configured in a semi-expanded configuration between the partially compressed and substantially expanded configurations thereof, and the first portion of the sled, and the stop mechanism substantially engaged between the slip connector the second portion of the sled, and
3) the electrical interface support is arranged in the substantially retracted position thereof.

8. The apparatus of claim 7 wherein the lever mechanism is further unevenly pivotably coupled between the slip connector and one of clamp and the electrical interface support.

9. The apparatus of claim 1, further comprising an expansion limiter structured for limiting spacing between the second face of the support tray and the jaw portion of the electrical interface support in the substantially expanded position thereof.

10. The apparatus of claim 1 wherein the jaw portion further comprises a biasing mechanism positioned adjacent to an inner surface thereof.

11. The apparatus of claim 1, further comprising an electrical connector structured for electrically interfacing with the device, the electrical connector being supported on the jaw portion of the electrical interface support and extended from an inner surface thereof.

12. A quick release docking station apparatus for portable electronics devices having one or more charging or input/output (I/O) interface ports, the docking station apparatus comprising:
   a substantially rigid support tray having means for supporting the device relative to opposing first and second faces thereof;
   clamping means for substantially securely clamping the device relative to the support tray;
   electrical interface means for electrically interfacing with the device;
   supporting means for securely supporting the electrical interface means relative to the second face of the support tray; and
   linking means for mechanically linking a positioning of the supporting means with a positioning of the clamping means, the linking means comprising:
      i) means for expanding the supporting means in a substantially fully expanded position spaced away from the second face of the support tray in response to expanding the clamping means in a substantially fully expanded position spaced away from the first face of the support tray,
      ii) means for retracting the supporting means into a substantially fully retracted position adjacent to the second face of the support tray in response to retracting the clamping means in a substantially fully retracted position adjacent to the first face of the support tray, and
      iii) decoupling means for decoupling the means for expanding the supporting means from the retracting of the clamping means.

13. The apparatus of claim 12, further comprising means for resiliently expanding the clamping means relative to the second face.

14. The apparatus of claim 12, further comprising a restraining means for restraining the clamping means relative to the second face.

15. The apparatus of claim 12 wherein the decoupling means further comprises means for decoupling the means for retracting the supporting means from a partial expanding of the clamping means relative to the first face between the substantially fully retracted position and the substantially fully expanded position.

16. The apparatus of claim 12 wherein the clamping means further comprises the decoupling means.

17. The apparatus of claim 12 wherein the supporting means further comprises the decoupling means.

18. The apparatus of claim 12 wherein the linking means further comprises levering means for levering the supporting means into the substantially fully expanded position in response to the expanding the clamping means into the substantially fully expanded position.

19. The apparatus of claim 18 wherein the levering means is further unevenly coupled between the clamping means and the supporting means.

20. The apparatus of claim 12, further comprising expansion limiting means for limiting the means for spacing the supporting means away from the second face.

21. The apparatus of claim 12, further comprising biasing means operable relative to an inner surface of the clamping means directed toward the first face.

22. A quick release docking station apparatus for portable computers and other portable electronics devices having one or more input/output (I/O) communication interface ports, the docking station apparatus comprising:
   a) a substantially rigid support tray structured for securely supporting the device, the support tray comprising:
      i) an interior support portion,
      ii) at least a partial guard rail extended exterior of at least a portion of the interior support portion,
      iii) a partial peripheral retention portion spaced away from and opposing at least a portion of the interior support portion adjacent to a first face of the support tray,
      iv) at least a partial web portion interconnecting the retention portion with a portion of the interior support portion, the web portion formed with clearance there through at least in a position corresponding to at least one communication interface port of the device, and
      v) first and second substantially parallel slide guides formed adjacent to the interior support portion and at least partially extended substantially between the first face of the support tray and a second face thereof opposite from the first face;
   b) a substantially rigid compression clamp slide portion comprising:
      i) an elongate clamp sled portion slidably coupled with the first slide guide for moving relative to the second face of the support tray, and
      ii) a clamp jaw portion extended adjacent to a first end of the clamp sled portion, the jaw portion formed with retention lip spaced above and substantially opposing the clamp sled portion;
   c) a clamp expansion mechanism operable between the compression clamp slide portion and a stop portion of the support tray;
   d) an electrical connector mounted on a substantially rigid connector carrier slide portion, the connector carrier slide portion comprising:
      i) an elongate carrier sled portion slidably coupled with the second slide guide for moving relative to the first face of the support tray, and
      ii) a carrier jaw portion extended adjacent to a first end of the carrier sled portion, the carrier jaw portion formed with retention lip spaced above and substantially opposing the carrier sled portion and having the electrical connector positioned thereon with an electrical interconnect portion of the electrical connector extended from an inner surface thereof along the carrier sled portion toward the support tray;
   e) a linkage mechanism coupled between the compression clamp slide portion and the connector carrier slide portion, the linkage mechanism being substantially responsive to the compression clamp slide portion;
   f) one or more guide mechanisms formed between the connector carrier slide portion and the support tray, and
   g) the compression clamp slide portion and the connector carrier slide portion operable in three different relationships with the support tray:
      i) an expanded relationship wherein:
         1) the compression clamp slide portion is arranged in a substantially expanded position relative to the support tray having the clamp sled portion extended on the first slide guide and the clamp jaw portion spaced away from the second face of the support tray,
2) the clamp expansion mechanism is substantially expanded between the compression clamp slide portion and the stop portion of the support tray,
3) the connector carrier slide portion is arranged in a substantially expanded position relative to the support tray having the carrier sled portion extended on the second slide guide, the inner surface of the carrier jaw portion spaced away from the first face of the support tray with the electrical interconnect portion of the electrical connector withdrawn relative thereto, and the guides at least partially disengaged from the corresponding guide ways in the web portion of the support tray, and
4) responsive to the substantially expanded arrangement of the compression clamp slide portion, the linkage mechanism is responsively configured in a first positive driving relationship with the connector carrier slide portion for actively arranging the connector carrier slide portion in its substantially expanded position, ii) an engaged relationship wherein:
1) the compression clamp slide portion is arranged in a substantially retracted position relative to the support tray having the clamp sled portion retracted on the first slide guide and substantially engaged therewith and the clamp jaw portion adjacent to the second face of the support tray,
2) the clamp expansion mechanism is substantially compressed between the compression clamp slide portion and a stop portion of the support tray, and
3) responsive to the substantially retracted arrangement of the compression clamp slide portion, the linkage mechanism is responsively configured in a second resiliently urging relationship with the connector carrier slide portion for resiliently urging the connector carrier slide portion toward a substantially retracted position relative to the support tray having the carrier sled portion retracted on the second slide guide and substantially engaged therewith, and the inner surface of the carrier jaw portion adjacent to the first face of the support tray with the guides substantially engaged with the guide ways in the web portion thereof and the electrical interconnect portion extended substantially through the clearance aperture thereof, and iii) a semi-engaged relationship wherein:
1) the compression clamp slide portion is arranged in the substantially retracted position relative to the support tray,
2) the clamp expansion mechanism is substantially compressed between the compression clamp slide portion and a stop portion of the support tray,
3) responsive to the substantially retracted position of the compression clamp slide portion, the linkage mechanism is responsively configured in a second resiliently urging relationship with the connector carrier slide portion for resiliently urging the connector carrier slide portion toward its substantially retracted position relative to the support tray, and
4) the connector carrier slide portion is resiliently retractably arranged in the substantially expanded position thereof relative to the support tray having the inner surface of the carrier jaw portion spaced away from the first face of the support tray with the electrical interconnect portion of the electrical connector withdrawn relative thereto, and the guides at least partially disengaged from the corresponding guide ways in the web portion of the support tray.

23. The apparatus of claim 22, further comprising a latch mechanism operable for retaining the compression clamp slide portion in the substantially retracted position relative to the support tray.

24. The apparatus of claim 22 wherein the elongate clamp sled portion of the compression clamp slide portion further comprises an expansion channel formed along a longitudinal direction thereof, the expansion channel being formed with a first internal stop portion positioned adjacent to the clamp jaw portion and a second internal stop portion spaced apart from the first internal stop portion; and
the linkage mechanism further comprises:
i) a slip connector shorter than the expansion channel and slidable therein, the slip connector having a first reaction portion facing toward and spaced away from the first internal stop portion of the expansion channel and forming a return spring gap there between, and a second reaction portion opposite from the first reaction portion and facing toward the second internal stop portion of the expansion channel;
ii) a connector return spring residing within the return spring gap;
iii) a control lever formed with a rotation portion being rotatable coupled to a fulcrum mechanism positioned adjacent to the interior support portion of the support tray between the first and second slide guides;
iv) a first pivotable coupling between the slip connector and the control lever of the fulcrum mechanism; and
v) a second pivotable coupling between the control lever and the carrier sled portion of the connector carrier slide portion.

25. The apparatus of claim 24 wherein the linkage mechanism is operable in three different relationships with the compression clamp slide portion and the connector carrier slide portion, wherein:
a) when the compression clamp slide portion and the connector carrier slide portion are in the expanded relationship with the support tray having the compression clamp slide portion and the connector carrier slide portion arranged in their respective substantially expanded positions relative to the support tray:
i) the return spring gap is substantially maximized between the first reaction portion and the first internal stop portion of the expansion channel, and the second reaction portion of the slip connector is substantially engaged in an operative relationship with the second internal stop portion of the expansion channel,
ii) the connector return spring is substantially expanded within the substantially maximized return spring gap, and
iii) the control lever is rotated in a first direction relative to the position of the fulcrum mechanism for urging the connector carrier slide portion toward its substantially expanded position relative to the support tray;
b) when the compression clamp slide portion and the connector carrier slide portion are in the semi-engaged relationship with the support tray having the compression clamp slide portion arranged in its substantially retracted position relative to the support tray and the connector carrier slide portion resiliently retractably arranged in its substantially expanded position relative to the support tray:

i) the return spring gap is substantially minimized between the first reaction portion and the first internal stop portion of the expansion channel, and the second reaction portion of the slip connector is disengaged from the second internal stop portion of the expansion channel and spaced away therefrom, ii) the connector return spring is substantially compressed within the substantially minimized return spring gap, and iii) the control lever is rotated in the first direction relative to the position of the fulcrum mechanism for tending to contract the return spring gap and compress the connector return spring therein; and c) when the compression clamp slide portion and the connector carrier slide portion are in the engaged relationship with the support tray having the compression clamp slide portion and the connector carrier slide portion arranged in their respective substantially engaged positions relative to the support tray:

i) the return spring gap is substantially normalized between the substantially maximized and substantially minimized return spring gaps, ii) the connector return spring is partially compressed within the substantially normalized return spring gap, and iii) the control lever is rotated in a second direction relative to the position of the fulcrum mechanism opposite from the first direction for tending to contract the return spring gap and partially compress the connector return spring therein.

26. The apparatus of claim 25 wherein, when the return spring gap is substantially semi-expanded between the substantially maximized and substantially normalized return spring gaps, the second reaction portion of the slip connector is further spaced away from the second internal stop portion of the expansion channel; and the linkage mechanism is further operable in a fourth different relationship with the compression clamp slide portion and the connector carrier slide portion wherein, when the connector carrier slide portion resiliently expandably arranged in the substantially retracted position thereof relative to the support tray, and the compression clamp slide portion arranged in a semi-expanded position relative to the support tray between the substantially expanded and retracted positions thereof:

i) the return spring gap is semi-expanded between the substantially normalized and substantially maximized return spring gaps, and the second reaction portion of the slip connector is disengaged from but positioned adjacent to the second internal stop portion of the expansion channel, ii) the connector return spring is semi-expanded within the semi-expanded return spring gap, and iii) the control lever is rotated in the second direction relative to the position of the fulcrum mechanism for urging the connector carrier slide portion toward the substantially engaged position thereof relative to the support tray.

27. The apparatus of claim 22 wherein the elongate carrier sled portion of the connector carrier slide portion further comprises an expansion channel formed along a longitudinal direction thereof, the expansion channel being formed with opposing first and second internal stop portions with the second internal stop portion positioned adjacent to the carrier jaw portion and the first internal stop portion spaced apart from the second internal stop portion toward a tail portion of the elongate carrier sled portion distal from the carrier jaw portion; and the linkage mechanism further comprises:

i) a slip connector shorter than the expansion channel and slidable therein, the slip connector having a first reaction portion facing toward and spaced away from the first internal stop portion of the expansion channel and forming a return spring gap there between, and a second reaction portion opposite from the first reaction portion and facing toward the second internal stop portion of the expansion channel;

ii) a connector return spring residing within the return spring gap;

iii) a control lever formed with a rotation portion being rotatable coupled to a fulcrum mechanism positioned adjacent to the interior support portion of the support tray between the first and second slide guides;

iv) a first pivotable coupling between the slip connector and the control lever of the fulcrum mechanism; and v) a second pivotable coupling between the control lever and the carrier sled portion of the connector carrier slide portion.

28. The apparatus of claim 27 wherein the linkage mechanism is operable in three different relationships with the compression clamp slide portion and the connector carrier slide portion, wherein:

a) when the compression clamp slide portion and the connector carrier slide portion are in the expanded relationship with the support tray having the compression clamp slide portion and the connector carrier slide portion arranged in their respective substantially expanded positions relative to the support tray:

i) the control lever is rotated in a first direction relative to the position of the fulcrum mechanism for urging the connector carrier slide portion toward its substantially expanded position relative to the support tray and tending to expand the return spring gap, ii) the return spring gap is substantially maximized between the first reaction portion and the first internal stop portion of the expansion channel, and the second reaction portion of the slip connector is substantially engaged in an operative relationship with the second internal stop portion of the expansion channel, and iii) the connector return spring is substantially expanded within the substantially maximized return spring gap;

b) when the compression clamp slide portion and the connector carrier slide portion are in the semi-engaged relationship with the support tray having the compression clamp slide portion arranged in its substantially retracted position relative to the support tray and the connector carrier slide portion resiliently retractably arranged in its substantially expanded position relative to the support tray:

i) the control lever is rotated in a second direction relative to the position of the fulcrum mechanism opposite from the first direction for tending to contract the return spring gap and compress the connector return spring therein, ii) the return spring gap is substantially minimized between the first reaction portion and the first internal stop portion of the expansion channel, and the second reaction portion of the slip connector is disengaged from the operative relationship with the second internal stop portion of the expansion channel and spaced away therefrom, and iii) the connector return spring is substantially compressed within the substantially minimized return spring gap; and c) when the compression clamp slide portion and the connector carrier slide portion are in the engaged relationship with the support tray having the compression clamp slide portion and the connector carrier slide portion arranged in their respective substantially engaged positions relative to the support tray:
  i) the control lever is rotated in the second direction relative to the position of the fulcrum mechanism for tending to contract the return spring gap and compress the connector return spring therein,
  ii) the return spring gap is substantially normalized between the substantially maximized and substantially minimized return spring gaps, and
  iii) the connector return spring is partially compressed within the substantially normalized return spring gap.

29. The apparatus of claim 28 wherein, when the return spring gap is substantially semi-expanded between the substantially maximized and substantially normalized return spring gaps, the second reaction portion of the slip connector is further spaced away from the second internal stop portion of the expansion channel; and
  the linkage mechanism is further operable in a fourth different relationship with the compression clamp slide portion and the connector carrier slide portion wherein, when the connector carrier slide portion resiliently expandably arranged in its substantially retracted position relative to the support tray, and the compression clamp slide portion arranged in a semi-expanded position relative to the support tray between its substantially expanded and retracted positions:
    i) the control lever is rotated in the first direction relative to the position of the fulcrum mechanism for tending to expand the return spring gap and partially relieve the connector return spring therein,
    ii) the return spring gap is semi-expanded between the substantially normalized and substantially maximized return spring gaps, and the second reaction portion of the slip connector is disengaged from but positioned adjacent to the second internal stop portion of the expansion channel, and
    iii) the connector return spring is semi-expanded within the semi-expanded return spring gap for urging the connector carrier slide portion toward its substantially engaged position relative to the support tray.

30. The apparatus of claim 22 wherein the linkage mechanism is further coupled between the support tray and each of the compression clamp slide portion and the connector carrier slide portion and is further unevenly spaced there between.

31. The apparatus of claim 22, further comprising an expansion limiting mechanism operable in the substantially expanded position of the connector carrier slide portion relative to the support tray for limiting spacing of the inner surface of the carrier jaw portion away from the first face of the support tray.

32. The apparatus of claim 22 wherein the compression clamp slide portion further comprises a biasing mechanism operable relative to an inner surface of the clamp jaw portion thereof.

33. A quick release docking station apparatus for portable computers and other portable electronics devices having one or more input/output (I/O) communication interface ports, the docking station apparatus comprising:
  a) a substantially rigid support tray structured for securely supporting the device, the support tray comprising:
    i) an interior support portion,
    ii) at least a partial guard rail extended exterior of at least a portion of the interior support portion,
    iii) a partial peripheral retention portion spaced away from and opposing at least a portion of the interior support portion adjacent to a first face of the support tray,
    iv) at least a partial web portion interconnecting the retention portion with a portion of the interior support portion, the web portion formed with a clearance aperture there through at least in a position corresponding to at least one communication interface port of the device,
    v) a pair of spaced apart guide ways formed in the web portion and arranged on opposite sides of the clearance aperture between the interior support portion and the retention portion, and
    vi) first and second substantially parallel slide guides formed adjacent to the interior support portion and at least partially extended substantially between the first face of the support tray and a second face thereof opposite from the first face;
  b) a fulcrum positioned adjacent to the interior support portion between the first and second slide guides and spaced further from first slide guide than from second slide guide;
  c) a substantially rigid compression clamp slide portion comprising:
    i) an elongate clamp sled portion slidably coupled with the first slide guide for moving relative to the second face of the support tray,
    ii) a clamp jaw portion extended adjacent to a first end of the clamp sled portion, the jaw portion formed with a retention lip spaced above and substantially opposing the clamp sled portion, and
    iii) first and second substantially parallel expansion channels formed in the clamp sled portion and substantially aligned with a longitudinal axis thereof, the first expansion channel having an internal stop portion adjacent to the clamp jaw portion, the second expansion channel having first and second internal stop portions adjacent to opposite ends thereof with the first internal stop portion being adjacent to the clamp jaw portion and the second internal stop portion being spaced away from the first stop portion;
  d) a clamp expansion spring residing within the first expansion channel of the clamp sled portion and operable between the internal stop portion thereof and a stop portion of the support tray spaced away from the second face thereof;
  e) a slip connector shorter than the second expansion channel of the clamp sled portion and slidable therein, the slip connector having a first reaction portion facing toward and spaced away from the first internal stop portion of the second expansion channel and forming a nominal return spring gap there between, and a second reaction portion opposite from the first reaction portion and facing toward the second internal stop portion of the second expansion channel;
  f) a connector return spring residing within the return spring gap formed in the second expansion channel of the clamp sled portion, and in a partially compressed state substantially filling the nominal return spring gap;
  g) an electrical connector mounted on a substantially rigid connector carrier slide portion, the connector carrier slide portion comprising:
    i) an elongate carrier sled portion slidably coupled with the second slide guide for moving relative to the first face of the support tray, and
    ii) a carrier jaw portion extended adjacent to a first end of the carrier sled portion, the carrier jaw portion formed with a retention lip spaced above and substantially opposing the carrier sled portion and having the electrical connector positioned thereon with an electrical interconnect portion of the electrical connector extended from an inner surface thereof along the carrier sled portion toward the support tray, and a pair of spaced apart carrier jaw guides arranged on opposite sides of the electrical connector in positions corresponding to the spaced apart guide ways in the web portion of the support tray and sized to enter there into;

h) a control lever formed with a rotation portion being rotatable on the fulcrum, the control lever having first and second lever arms extending from the rotation portion with the first lever arm being longer than the second lever arm;

i) a first drive pin rotatably coupling the first longer lever arm of the control lever to the slip connector within the second expansion channel of the clamp sled portion of the compression clamp slide portion;

j) a second drive pin rotatably coupling the second shorter arm of the control lever to the carrier sled portion of the connector carrier slide portion;

k) a latch mechanism operable between the compression clamp slide portion and the support tray for retaining the compression clamp slide portion relative to the support tray; and l) the compression clamp slide portion and the connector carrier slide portion being operable in three relationships with the support tray:

i) an expanded relationship wherein:
1) the latch mechanism is operatively disengaged from the compression clamp slide,
2) the compression clamp slide portion is in a substantially expanded position relative to the support tray having the clamp sled portion extended on the first slide guide and the clamp jaw portion spaced away from the second face of the support tray,
3) the clamp expansion spring is substantially expanded in the first expansion channel of the clamp sled portion between the internal stop portion thereof and the stop portion of the support tray,
4) the slip connector is positioned in within the second expansion channel of the clamp sled portion with the first reaction portion thereof spaced away from the first internal stop portion of the second expansion channel and forming the return spring gap there between, and the second reaction portion thereof substantially contacting the second internal stop portion of the second expansion channel,
5) the connector return spring is substantially expanded within the return spring gap,
6) the control lever is rotated on the fulcrum in a substantially expanded position relative to the compression clamp slide portion and the connector carrier slide portion having the first longer lever arm rotated away from the first face of the support tray and toward the opposite second face, and the second shorter lever arm rotated toward the first face of the support tray and away from the opposite second face, and
7) the connector carrier slide portion is in a substantially expanded position relative to the support tray having the carrier sled portion extended on the second slide guide, the inner surface of the carrier jaw portion spaced away from the first face of the support tray with the electrical interconnect portion of the electrical connector withdrawn relative thereto, and the carrier jaw guides at least partially disengaged from the corresponding guide ways in the web portion of the support tray;

ii) an engaged relationship wherein:
1) the compression clamp slide portion is in a substantially retracted position relative to the support tray having the clamp sled portion retracted on the first slide guide and substantially engaged therewith and the clamp jaw portion adjacent to the second face of the support tray,
2) the clamp expansion spring is substantially compressed in the first expansion channel of the clamp sled portion between the internal stop portion thereof and the stop portion of the support tray,
3) the latch mechanism is operatively engaged with the compression clamp slide,
4) the slip connector is positioned in within the second expansion channel of the clamp sled portion with the first reaction portion thereof spaced away from the first internal stop portion of the second expansion channel and forming the return spring gap there between, and the second reaction portion thereof spaced away from the second internal stop portion of the second expansion channel,
5) the connector return spring is partially compressed within the return spring gap,
6) the control lever is rotated on the fulcrum to a substantially neutral position relative to the compression clamp slide portion and the connector carrier slide portion having the first longer and second shorter lever arms each rotated to a respective neutral position between the first and second faces of the support tray, and
7) the connector carrier slide portion is in a substantially retracted position relative to the support tray having the carrier sled portion retracted on the second slide guide and substantially engaged therewith, and the inner surface of the carrier jaw portion adjacent to the first face of the support tray with the carrier jaw guides substantially engaged with the guide ways in the web portion thereof and the electrical interconnect portion extended substantially through the clearance aperture thereof; and iii) a semi-engaged relationship wherein:
1) the compression clamp slide portion is in the substantially retracted position relative to the support tray,
2) the clamp expansion spring is substantially compressed in the first expansion channel of the clamp sled portion between the internal stop portion thereof and the stop portion of the support tray,
3) the latch mechanism is operatively engaged with the compression clamp slide,
4) the slip connector is positioned in within the second expansion channel of the clamp sled portion with the first reaction portion thereof spaced away from the first internal stop portion of the second expansion channel and forming the return spring gap there between, and the second reaction portion thereof spaced away from the second internal stop portion of the second expansion channel,
5) the connector return spring is substantially compressed within the return spring gap,
6) the control lever is rotated on the fulcrum to a substantially neutral position with the first longer and second shorter lever arms each rotated to a respective neutral position between the first and second faces of the support tray, and
7) the connector carrier slide portion is in the substantially expanded position relative to the support tray having the inner surface of the carrier jaw portion spaced away from the first face of the support tray with the electrical interconnect portion of the electrical connector withdrawn relative thereto, and the carrier jaw guides at least partially disengaged from the corresponding guide ways in the web portion of the support tray.

34. The apparatus of claim 33, further comprising an expansion limiting mechanism operable in the substantially expanded position of the connector carrier slide portion relative to the support tray for limiting spacing of the inner surface of the carrier jaw portion away from the first face of the support tray.

35. The apparatus of claim 34 wherein the expansion limiting mechanism is further operable between the slip connector and the first internal stop portion of the second expansion channel for spacing the slip connector a minimum distance away from the first internal stop portion.

36. The apparatus of claim 34 wherein the compression clamp slide portion further comprises a biasing mechanism operable relative to an inner surface of the clamp jaw portion thereof.

37. The apparatus of claim 34 wherein at least one of the first and second slide guides further comprises a guide channel structured to slidingly receive thereinto one of the clamp sled portion of the compression clamp slide portion and the carrier sled portion of the connector carrier slide portion.

38. The apparatus of claim 34 wherein the support tray further comprises a radio frequency (RF) antenna interconnect switch positioned adjacent to the second face thereof, the switch having an electrical contact projected therefrom, the electrical contact being structured as a spring plunger operable substantially perpendicular to the interior support portion of the support tray and being further structured for electrical coupling to an antenna interconnect cable.

39. The apparatus of claim 38, further comprising an antenna interconnect cable electrically coupled to the electrical contact.

40. The apparatus of claim 39, further comprising a radio frequency (RF) antenna electrically coupled to the antenna interconnect cable.

41. The apparatus of claim 34 wherein the interior support portion further comprises a partial peripheral support lip spaced above a floor portion of the support tray having the first and second slide guides formed thereof.

* * * * *